US008515060B2

(12) United States Patent
Fujisaki et al.

(10) Patent No.: US 8,515,060 B2
(45) Date of Patent: Aug. 20, 2013

(54) ENCRYPTION APPARATUS, DECRYPTION APPARATUS, ENCRYPTION METHOD, DECRYPTION METHOD, SECURITY METHOD, PROGRAM, AND RECORDING MEDIUM

(75) Inventors: Eiichiro Fujisaki, Tokyo (JP); Koutarou Suzuki, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 114 days.

(21) Appl. No.: 13/263,770

(22) PCT Filed: Apr. 23, 2010

(86) PCT No.: PCT/JP2010/057271
§ 371 (c)(1),
(2), (4) Date: Oct. 10, 2011

(87) PCT Pub. No.: WO2010/123112
PCT Pub. Date: Oct. 28, 2010

(65) Prior Publication Data
US 2012/0027201 A1      Feb. 2, 2012

(30) Foreign Application Priority Data

Apr. 24, 2009   (JP) ................................ 2009-106021

(51) Int. Cl.
*H04L 29/06* (2006.01)
(52) U.S. Cl.
USPC ........................................................ 380/28
(58) Field of Classification Search
USPC ........................................................ 380/28
See application file for complete search history.

(56) References Cited

U.S. PATENT DOCUMENTS

| 5,412,729 | A * | 5/1995 | Liu ................................. 380/37 |
| 7,035,404 | B2 * | 4/2006 | Furukawa ....................... 380/28 |
| 8,111,826 | B2 * | 2/2012 | Takashima ..................... 380/28 |
| 2012/0045056 | A1 * | 2/2012 | Takashima et al. ........... 380/255 |

OTHER PUBLICATIONS

Identity Based Encryption from the Tate Pairing to Secure Email Communications Matthew Baldwin May 2002.*
Implementing the Tate pairing Steven D. Galbraith1, Keith Harrison, David Soldera Trusted E-Services Laboratory HP Laboratories Bristol Mar. 2002.*

(Continued)

*Primary Examiner* — Edan Orgad
*Assistant Examiner* — James Turchen
(74) *Attorney, Agent, or Firm* — Oblon, Spivak, McClelland, Maier & Neustadt, L.L.P.

(57) ABSTRACT

Security against CCA is improved without providing space for just improving the security against CCA in a ciphertext space. In encryption processing, a first ciphertext $C_1$ is calculated from a plaintext M and a symmetric key K; a value containing a value corresponding to the symmetric key K and a value corresponding to the first ciphertext $C_1$ is put into a collision-resistant function H to calculate a function value of the function H; and r corresponding to the function value is used to calculate second ciphertext $C_2 = r \cdot (\Sigma_{\mu=1}^{n} v_\mu \cdot b_\mu) + \rho \cdot b_{n+1} \in G_1^{n+1}$. In decryption processing, the second ciphertext $C_2 \in G_1^{n+1}$ and key information $D_1^* = \alpha \cdot (\Sigma_{\mu=1}^{n} w_\mu \cdot b_\mu^*) + b_{n+1}^* \in G_2^{n+1}$ are put into a bilinear function e to calculate a function value $S^\sim = e(C_2, D_1^*) \in G_T$; a value corresponding to the function value $S^\sim$ and the first ciphertext $C_1$ are put into the collision-resistant function H to calculate a function value of the function H; and it is judged whether $r^\sim$ corresponding to the function value satisfies $C_2 = r^\sim \cdot (\Sigma_{\mu=1}^{n} v_\mu \cdot b_\mu) + \rho^\sim \cdot b_{n+1} \in G_1^{n+1}$.

33 Claims, 14 Drawing Sheets

(56) References Cited

OTHER PUBLICATIONS

Public-Key Encryption from ID-Based Encryption Without One-Time Signature Chik How Tan OTM Workshops 2006, LNCS 4277, pp. 450-459, 2006.*

Katz, J., et al., "Predicate Encryption Supporting Disjunctions, Polynomial Equations, and Inner Products," Eurocrypt, LNCS 4965, pp. 146-162, (2008).

Abe, M., et al., "Tag-KEM/DEM A New Framework for Hybrid Encryption and a New Analysis of Kurosawa-Desmedt KEM," Eurocrypt, LNCS 3494, pp. 128-146, (2005).

Boneh, D., et al., "Identity-Based Encryption From the Weil Pairing," Crypto, LNCS 2139, pp. 213-229, (2001).

Canetti, R., et al., "Chosen-Ciphertext Security from Identity-Based Encryption," Eurocrypt, LNCS 3027, pp. 207-222, (2004).

Boneh, D., et al., "Improved Efficiency for CCCA-Secure Cryptosystems Built Using Identity-Based Encryption," CT-RSA, LNCS 3376, pp. 87-103, (2005).

"Information technology—Security techniques—Encryption algorithms—Part 2: Asymmetric ciphers," International Standard, ISO/IEC 18033-2, pp. 10-11, (2006).

Boyen, X., et al., "Identity-Based Cryptography Standard (IBCS) #1: Supersingular Curve Implementations of the BF and BB1 Cryptosystems,"Voltage Security, Network Working Group, Request for Comments: 5091, Category: Informational, total 1 page, (Dec. 2007).

Blake, I., et al., "Elliptic Curves in Cryptography," London Mathematical Society, Pearson Education Japan, pp. 32-37, (Dec. 20, 2001) (with partial English translation).

Menezes, A.J., "Elliptic Curve Public Key Cryptosystems," Kluwer Academic Publishers, pp. 61-81, (1965).

Miller, V.S., "Short Programs for functions on Curves," http://crypto.stanford.edu.millers/miller.pdf, pp. 1-7, (May 6, 1986).

Miyaji, A., et al., "New explicit conditions of elliptic curve traces for FR-reduction," IEICE Trans. Fundamentals, vol. E84-A, No. 5, pp. 1-10, (May 2001).

Barreto, P.S.L.M., et al., "Constructing Elliptic Curves with Prescribed Embedding Degrees," SCN 2002, LNCS 2576, pp. 257-267, (2003).

Dupont, R., et al., "Building curves with arbitrary small MOV degree over finite prime fields," http://eprint.iacr.org/2002/094, pp. 1-13, (Jul. 18, 2002).

Dupont, R., et al., "Building Curves with Arbitrary Small MOV Degree over Finite Prime Fields," Journal of Cryptology, vol. 18, pp. 79-89, (Oct. 21, 2004).

International Search Report issued Jun. 15, 2010 in PCT/JP10/057271 filed Apr. 23, 2010.

Extended European Search Report issued Mar. 7, 2013 in Patent Application No. 10767167.9.

Tatsuaki Okamoto et al., "Hierarchical Predicate Encryption for Inner-Products", Advances in Cryptology, XP-019134479, Dec. 6, 2009, pp. 214-231.

Ronald Cramer et al., "Design and Analysis of Practical Public-Key Encryption Schemes Secure Against Adaptive Chosen Ciphertext Attack", Internet Citation, XP-002567078, Aug. 14, 2003, pp. 1 -66, Retrieved from the Internet: URL:http://citeseerx.ist.psu.edu/viewdoc/download?doi=10.1.1.76.2565&rep=rep1&type=pdf#/u.

Jonathan Katz et al., "Predicate Encryption Supporting Disjunctions, Polynomial Equations, and Inner Products", Cryptology Eprint Archive: Report 2007/404, XP-008149983, Jul. 8, 2007, pp. 1-29, Retrieved from the Internet: URL:http://eprint.iacr.org/2007/404.pdf.

Elaine Shi et al., "Delegating Capabilities in Predicate Encryption Systems", International Association for Cryptologic Research, vol. 20080624:094506, XP-061002892, Jun. 20, 2008, pp. 1-35.

* cited by examiner

ENCRYPTION APPARATUS, DECRYPTION APPARATUS, ENCRYPTION METHOD, DECRYPTION METHOD, SECURITY METHOD, PROGRAM, AND RECORDING MEDIUM

TECHNICAL FIELD

The present invention relates to security techniques, and more specifically, to a cryptographic technique.

BACKGROUND ART

The topics that have been studied in cryptography field include a Chosen Ciphertext Attacks (CCA)-secure cryptographic scheme. Recently, the studies of the CCA-secure cryptographic scheme based on an identity-based encryption (IBE) scheme (refer to non-patent literature 1, for example), which is usually Chosen Plaintext Attacks (CPA) secure, have become active. In non-patent literature 2, for example, a CHK transformation method is proposed. In the CHK transformation method, a one-time signature scheme is used to build the CCA-secure cryptographic scheme based on the CPA-secure IBE scheme. In non-patent literature 3, for example, a BK transformation method is proposed. In the BK transformation method, a message authentication code (MAC) and a bit commitment scheme are used to build the CCA-secure cryptographic scheme based on the CPA-secure IBE scheme.

PRIOR ART LITERATURE

Non-Patent Literature

Non-patent literature 1: D. Boneh, M. Franklin, "Identity-Based encryption from the Weil pairing," Crypto 2001, Lecture Notes in Computer Science, Vol. 2139, Springer-Verlag, pp. 213-229, 2001.

Non-patent literature 2: R. Canetti, S. Halevi, J. Katz, "Chosen-Ciphertext Security from Identity-Based Encryption," Proc. of EUROCRYPT '04, LNCS 3027, pp. 207-222, 2004.

Non-patent literature 3: D. Boneh, J. Katz, "Improved Efficiency for CCA-Secure Cryptosystems Built Using Identity-Based Encryption," Proc. of CT-RSA '05, LNCS 3376, pp. 87-103, 2005.

DISCLOSURE OF THE INVENTION

Problems to be Solved by the Invention

The ciphertext on the CHK transformation method includes the encrypted text, a one-time signature of the encrypted text, and a verifying key of the one-time signature. Accordingly, the ciphertext space thereof includes not only the encrypted text space but also the one-time signature space and the verifying key space. The ciphertext generated on the BK transformation method includes the encrypted text, the MAC, and the bit commitment string. Accordingly, the ciphertext space thereof includes not only the encrypted text space but also the MAC space and the bit commitment string space. This means that the ciphertext spaces on the CHK transformation method and the BK transformation method include extra two-dimensional spaces for the CCA security. However, as the ciphertext space increases, the computation amount and the data amount increase. Therefore, the ciphertext space should be small.

In the IBE scheme, the encrypting party must specify the decrypting party's ID before encryption. It would be convenient, however, if the encrypting party can generate ciphertext without specifying the decrypting party, and a party satisfying given conditions can decrypt the ciphertext.

In view of above, the cryptographic scheme of the present invention provides high convenience and improvement of CCA security level without additional space for CCA security.

Means to Solve the Problems

Encryption processing according to the present invention includes at least the following steps: first a ciphertext $C_1$ is calculated by putting a plaintext M and a symmetric key K into a symmetric key encryption function; a function value of a collision-resistant function H is calculated by putting a value containing a value corresponding to the symmetric key K and a value corresponding to the first ciphertext $C_1$ into the function H; and a second ciphertext $C_2 = r \cdot (\Sigma_{\mu=1}^{n} v_\mu \cdot b_\mu) + \rho \cdot b_{n+1} \in G_1^{n+1}$ is calculated by using a value r corresponding to the function value of the function H, a value $\rho$ corresponding to the symmetric key K, the elements $v_\mu$ ($\mu=1, \ldots, n, n \geq 1$) of an n-dimensional vector $\vec{v} = (v_1, \ldots, v_n)$, and n+1 dimensional basis vectors $b_i \in G_1^{n+1}$ (i=1, \ldots, n+1) composed of n+1 elements of a cyclic group $G_1$.

Decryption processing corresponding to the encryption processing includes at least the following steps: a function value $S^\sim = e(C_2, D_1^*) \in G_T$ is calculated by putting the second ciphertext $C_2 \in G_1^{n+1}$ and key information $D_1^* = \alpha \cdot (\Sigma_{\mu=1}^{n} w_\mu \cdot b_\mu^*) + b_{n+1}^* \in G_2^{n+1}$ into a bilinear function e; and a function value of the collision-resistant function H is calculated by putting a value corresponding to the function value $S^\sim$ and the ciphertext $C_1$ into the function H. If the key information $D_1^*$ is correct, the value corresponding to the function value $S^\sim$ equals the value corresponding to the symmetric key K, which was put into the collision-resistant function H in the encryption processing. It is then judged whether a value $\rho^\sim$, a value $r^\sim$ corresponding to the function value of the function H, the elements $v_\mu$ of the n-dimensional vector $\vec{v}$, and the basis vectors $b_i \in G_1^{n+1}$ (i=1, \ldots, n+1) satisfy $C_2 = r^\sim \cdot (\Sigma_{\mu=1}^{n} v_\mu \cdot b_\mu) + \rho^\sim \cdot b_{n+1} \in G_1^{n+1}$.

The value r used in the encryption processing corresponds to the function value obtained by putting the value containing the value corresponding to the symmetric key K and the value corresponding to the first ciphertext $C_1$ into the collision-resistant function H. Accordingly, the value r depends on the first ciphertext $C_1$ and the symmetric key K. Even if an attacker who does not know the symmetric key K can generate first ciphertext $C_1$ from correctly obtained first ciphertext $C_1'$, the ciphertext $C_1$ being different from the ciphertext $C_1'$, the attacker cannot generate a correct value r corresponding to the generated first ciphertext $C_1$. Therefore, security against CCA can be improved by restoring a value $r^\sim$ by putting the first ciphertext $C_1$ and a value corresponding to the function value $S^\sim$ into the collision-resistant function H and judging whether $C_2 = r^\sim \cdot (\Sigma_{\mu=1}^{n} v_\mu \cdot b_\mu) + \rho^\sim \cdot b_{n+1} \in G_1^{n+1}$ is satisfied, in the decryption processing.

A value 2 corresponding to a value 1 means that the value 2 equals the value 1 or that the value 2 depends on at least the value 1.

The second ciphertext $C_2 = r \cdot (\Sigma_{\mu=1}^{n} v_\mu \cdot b_\mu) + \rho \cdot b_{n+1} \in G_1^{n+1}$ is formed just of an n dimensional space for an n-dimensional vector $\vec{v} = (v_1, \ldots, v_n)$, which is the basic component of the second ciphertext $C_2$, and a one-dimensional space for the value $\rho$ corresponding to a value containing the symmetric key K. This means that the second ciphertext $C_2$ does not require a space used just for improving security against CCA.

In an example of the encryption processing according to the present invention, the first ciphertext $C_1$ is calculated by putting the plaintext M and the symmetric key K into the symmetric key encryption function; the values r and $\rho$ are calculated by putting the symmetric key K and the first ciphertext $C_1$ into the collision-resistant function H; the function value $S=g_T^{\tau \cdot \rho} \in G_T$, where $\tau$ is a constant other than an additive identity element, is calculated; an exclusive OR value of the symmetric key K and a function value R(S) which is a binary sequence obtained by putting the function value S into an injective function R is calculated as a third ciphertext $C_3$; and second ciphertext $C_2 = r \cdot (\Sigma_{\mu=1}^{n} v_\mu \cdot b_\mu) + \rho \cdot b_{n+1} \in G_1^{n+1}$ is calculated.

In decryption processing corresponding to the encryption processing, for example, the function value $S^\sim = e(C_2, D_1^*) \in G_T$ is calculated by putting the second ciphertext $C_2 \in G_1^{n+1}$ and the key information $D_1^*$ into the bilinear function e; an exclusive OR value $K^\sim$ of the third ciphertext $C_3$ and the function value $R(S^\sim)$, which is a binary sequence obtained by putting the function value $S^\sim$ into the injective function R, is calculated; the values $r^\sim$ and $\rho^\sim$ are calculated by putting the exclusive OR value $K^\sim$ and the first ciphertext $C_1$ into the collision-resistant function H; a function value $C_2^\sim = r^\sim \cdot (\Sigma_{\mu=1}^{n} v_\mu \cdot b_\mu) + \rho^\sim \cdot b_{n+1} \in G_1^{n+1}$ is calculated; it is judged whether the function value $C_2^\sim$ equals the second ciphertext $C_2$; when the judgment indicates that the function value $C_2^\sim$ equals the second ciphertext $C_2$, a decrypted value $M^\sim$ is calculated by using the exclusive OR value $K^\sim$ as a symmetric key and putting the exclusive OR value $K^\sim$ and the ciphertext $C_1$ into a symmetric key decryption function.

In another example of the encryption processing, the value $\rho$ is selected; the function value $S=g_T^{\tau \cdot \rho} \in G_T$ is calculated, where $\tau$ is a constant other than an additive identity element; the first ciphertext $C_1$ is calculated by using the function value R(S) obtained by putting the function value S into the injective function R, as the symmetric key K, and putting the symmetric key K and the plaintext M into the symmetric key encryption function; the value r is calculated by putting the function value S and the first ciphertext $C_1$ into the collision-resistant function H; and the second ciphertext $C_2 = r \cdot (\Sigma_{\mu=1}^{n} v_\mu \cdot b_\mu) + \rho \cdot b_{n+1} \in G_1^{n+1}$ is calculated.

In decryption processing corresponding to the encryption processing, for example, the function value $S^\sim = e(C_2, D_1^*) \in G_T$ is calculated by putting the second ciphertext $C_2 \in G_1^{n+1}$ and the key information $D_1^*$ into the bilinear function e; the value $r^\sim$ is calculated by putting the function value $S^\sim$ and the ciphertext $C_1$ into the collision-resistant function H; a function value $\lambda = C_2 - r^\sim \cdot (\Sigma_{\mu=1}^{n} v_\mu \cdot b_\mu) \in G_1^{n+1}$ is calculated by using the second ciphertext $C_2$, the value $r^\sim$, and the elements $v_\mu$ ($\mu = 1, \ldots, n$) of the n-dimensional vector $v^\rightarrow$; a function value $e(\lambda, D_2^*)$ is calculated by putting the function value $\lambda$ and auxiliary key information $D_2^* = \Sigma_{\mu=1}^{n} \beta_\mu \cdot b_\mu^*$ into the bilinear function e; it is judged whether the function value $e(\lambda, D_2^*)$ satisfies $e(\lambda, D_2^*) = 1 \in G_T$; and if the judgment indicates that $e(\lambda, D_2^*) = 1 \in G_T$ is satisfied, the decrypted value $M^\sim$ is calculated by using the function value $R(S^\sim)$ obtained by putting the function value $S^\sim$ into the injective function R, as the symmetric key $K^\sim$, and by putting the symmetric key $K^\sim$ and the first ciphertext $C_1$ into the symmetric key decryption function.

Preferred examples of the injective function R and the collision-resistant function H are quasi random functions. This will improve the security level.

Effects of the Invention

As described above, the cryptographic scheme of the present invention provide high convenience and improvement of CCA security level without additional space for CCA security.

DETAILED DESCRIPTION OF THE EMBODIMENTS

Figure 1:
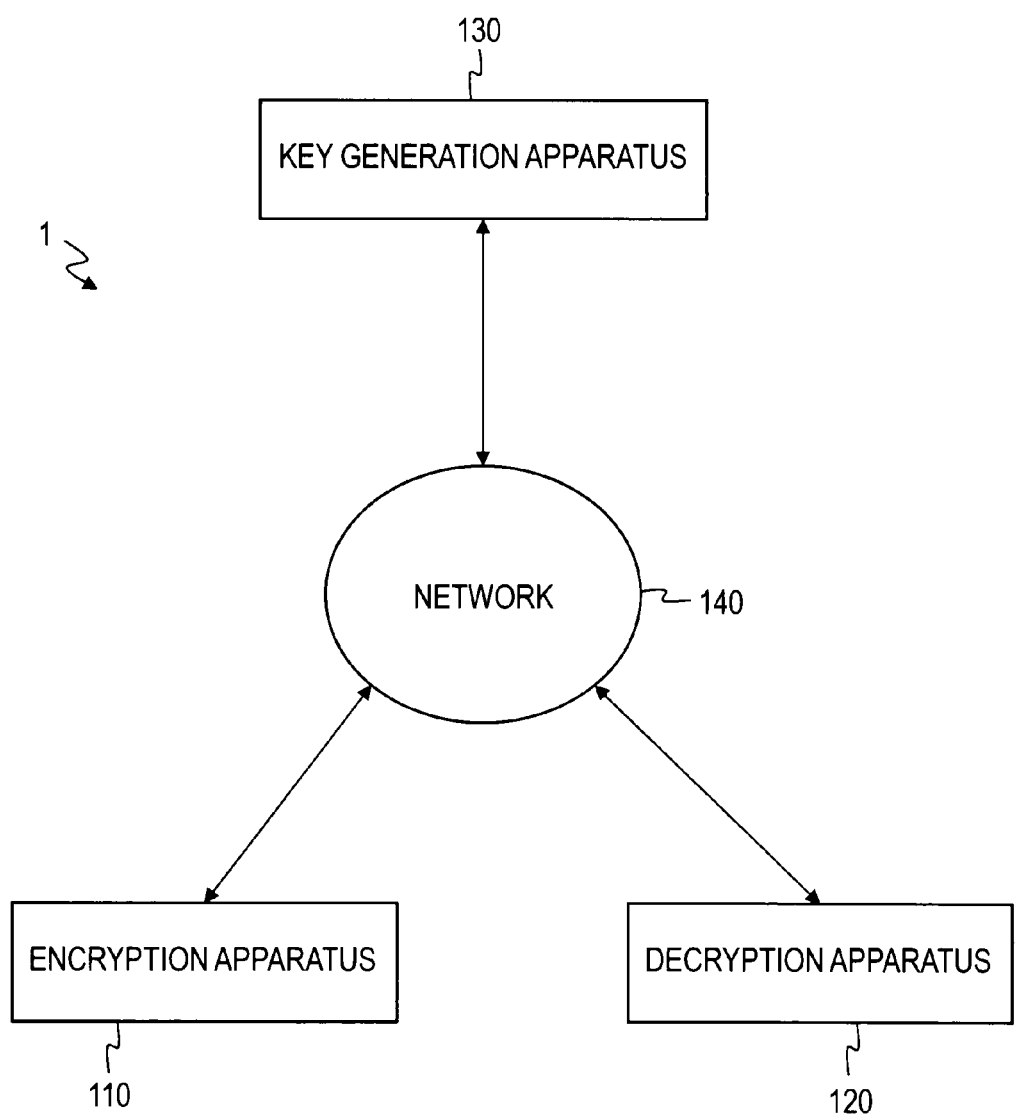
FIG. 1 is a view illustrating the structure of a cryptographic system according to a first embodiment.

Embodiments of the present invention will be described.

DEFINITIONS

Terms and symbols to be used in the embodiments will be defined first.

Matrix: A matrix represents a rectangular arrangement of elements of a set in which an operation is defined. Not only elements of a ring but also elements of a group can form the matrix.

$(\bullet)^T$: $(\bullet)^T$ represents a transposed matrix of "$\bullet$".
$(\bullet)^{-1}$: $(\bullet)^{-1}$ represents an inverse matrix of "$\bullet$".
$\wedge$: $\wedge$ represents logical AND.
$\vee$: $\vee$ represents logical OR.
Z: Z represents a set of integers.
k: k represents a security parameter ($k \in Z$, $k > 0$).
$\{0, 1\}^*$: $\{0, 1\}^*$ represents a binary sequence having a desired bit length. An example thereof is a sequence formed of integers 0 and 1. However, $\{0, 1\}^*$ is not limited to sequences formed of integers 0 and 1. $\{0, 1\}^*$ may be a finite field of order 2 or its extension field.
$\{0, 1\}^\zeta$: $\{0, 1\}^\zeta$ represents a binary sequence having a bit length $\zeta$ ($\zeta \in Z$, $\zeta > 0$). An example thereof is a sequence formed of integers 0 and 1. However, $\{0, 1\}^\zeta$ is not limited to sequences formed of integers 0 and 1. $\{0, 1\}^\zeta$ may be a finite field of order 2 (when $\zeta = 1$) or its extension field (when $\zeta > 1$).

(+): (+) represents an exclusive OR operator between binary sequences. For example, the following is satisfied: 10110011(+) 11100001=01010010.

$F_q$: $F_q$ represents a finite field of order q, where q is an integer equal to or larger than 1. For example, the order q is a prime number or a power of a prime number. In other words, the finite field $F_q$ is a prime field or an extension field over the prime field, for example. Operations in the prime finite field $F_q$ can be easily defined as modulo operations with the order q as modulus, for example. Operations in the extension filed $F_q$ can be easily defined as modulo operations with an irreducible polynomial as modulus, for example. Specific finite field $F_q$ structures are disclosed, for example, in reference literature 1, "ISO/IEC 18033-2: Information technology—Security techniques—Encryption algorithms—Part 2: Asymmetric ciphers".

$0_F$: $0_F$ represents an additive identity element of the finite field $F_q$.

$1_F$: $1_F$ represents a multiplicative identity element of the finite field $F_q$.

$\delta(i,j)$: $\delta(i,j)$ represents a Kronecker's delta function. When $i=j$, $\delta(i,j)=1_F$. When $i \neq j$, $\delta(i,j)=0_F$.

E: E represents an elliptic curve over the finite field $F_q$. E is defined as a set having a specific point O called a point at infinity and other points (x,y) of x,y∈$F_q$ that satisfy the following Weierstrass equation on affine coordinates:

$$y^2 + a_1 \cdot x \cdot y + a_3 \cdot y = x^3 + a_2 \cdot x^2 + a_4 \cdot x + a_6 \quad (1)$$

where $a_1, a_2, a_3, a_4, a_6 \in F_q$. A binary operation "+" called an elliptic curve addition can be defined for any two points on the elliptic curve E, and a unary operation "−" called an additive inverse can be defined for any one point on the elliptic curve E. It is well known that a finite set of rational points on the elliptic curve E forms a group with respect to the elliptic curve addition. It is also well known that an operation called an elliptic curve scalar multiplication can be defined with the elliptic curve addition. A specific operation method of elliptic operations such as the elliptic curve addition on a computer is also well known. (For example, see the reference literature 1, reference literature 2, "RFC 5091: Identity-Based Cryptography Standard (IBCS) #1: Supersingular Curve Implementations of the BF and BB1 Cryptosystems", and reference literature 3, Ian F. Blake, Gadiel Seroussi, and Nigel P. Smart, "Elliptic Curves in Cryptography", Pearson Education, ISBN 4-89471-431-0.)

A finite set of rational points on the elliptic curve E has a subgroup of order p ($p \geq 1$). For example, a finite set E[p] of p-division points on the elliptic curve E forms a subgroup of the rational points on the elliptic curve, where #E represents the element count of the finite set of the p-division points on the elliptic curve E and #E is divisible by the large prime p. The p-division points on the elliptic curve E are points A on the elliptic curve E which satisfy the elliptic curve scalar multiplications $p \cdot A = O$.

$G_1, G_2, G_T$: $G_1, G_2, G_T$ represent cyclic groups of order q, respectively. Examples of the cyclic groups $G_1$ and $G_2$ include the finite set E[p] of p-division points on the elliptic curve E and subgroups thereof. $G_1$ may equal $G_2$, or $G_1$ may not equal $G_2$. Examples of the cyclic group $G_T$ include a finite set forming an extension field over the finite field $F_q$. A specific example thereof is a finite set of the p-th root of 1 on the algebraic closure of the finite field $F_q$.

In the embodiments, operations defined on the cyclic groups $G_1$ and $G_2$ are expressed additively, and an operation defined on the cyclic group $G_T$ is expressed multiplicatively. More specifically, $\chi \cdot \Omega \in G_1$ for $\chi \in F_q$ and $\Omega \in G_1$ means that the operation defined in the cyclic group $G_1$ is applied to $\Omega \in G_1$, $\chi$ times, and $\Omega_1 + \Omega_2 \in G_1$ for $\Omega_1, \Omega_2 \in G_1$ means that the operation defined in the cyclic group $G_1$ is applied to $\Omega_1 \in G_1$ and $\Omega_2 \in G_1$. In the same way, $\chi \cdot \Omega \in G_2$ for $\chi \in F_q$ and $\Omega \in G_2$ means that the operation defined in the cyclic group $G_2$ is applied to $\Omega \in G_2$, $\chi$ times, and $\Omega_1 + \Omega_2 \in G_2$ for $\Omega_1, \Omega_2 \in G_2$ means that the operation defined in the cyclic group $G_2$ is applied to $\Omega_1 \in G_2$ and $\Omega_2 \in G_2$. In contrast, $\Omega^\chi \in G_T$ for $\chi \in F_q$ and $\Omega \in G_T$ means that the operation defined in the cyclic group $G_T$ is applied to $\Omega \in G_T$, $\chi$ times, and $\Omega_1 \cdot \Omega_2 \in G_T$ for $\Omega_1, \Omega_2 \in G_T$ means that the operation defined in the cyclic group $G_T$ is applied to $\Omega_1 \in G_T$ and $\Omega_2 \in G_T$.

$G_1^{n+1}$: $G_1^{n+1}$ represents a direct product of (n+1) cyclic groups $G_1$ ($n \geq 1$).

$G_2^{n+1}$: $G_2^{n+1}$ represents a direct product of (n+1) cyclic groups $G_2$.

$g_1, g_2, g_T$: $g_1, g_2, g_T$ represent generators of the cyclic groups $G_1, G_2, G_T$, respectively.

V: V represents an (n+1)-dimensional vector space formed of the direct product of the (n+1) cyclic groups $G_1$.

V*: V* represents an (n+1)-dimensional vector space formed of the direct product of the (n+1) cyclic groups $G_2$.

e: e represents a function (hereinafter referred to as "bilinear function") for calculating a non-degenerate bilinear map that maps the direct product $G_1^{n+1} \times G_2^{n+1}$ of the direct product $G_1^{n+1}$ and the direct product $G_2^{n+1}$ to the cyclic group $G_T$. The bilinear function e outputs an element of the cyclic group $G_T$ in response to input (n+1) elements $\gamma_L$ (L=1, ..., n+1) ($n \geq 1$) of the cyclic group $G_1$ and (n+1) elements $\gamma_L^*$(L=1, ..., n+1) of the cyclic group $G_2$.

$$e: G_1^{n+1} \times G_2^{n+1} \to G_T \quad (2)$$

The bilinear function e satisfies the following characteristics:

Bilinearity: The following relationship is satisfied for all $\Gamma_1 \in G_1^{n+1}$, $\Gamma_2 \in G_2^{n+1}$, and $\nu, \kappa \in F_q$ $$e(\nu \cdot \Gamma_1, \kappa \cdot \Gamma_2) = e(\Gamma_1, \Gamma_2)^{\nu \cdot \kappa} \quad (3)$$

Non-degeneracy: This function does not map all $$\Gamma_1 \in G_1^{n+1}, \Gamma_2 \in G_2^{n+1} \quad (4)$$

onto the identity element of the cyclic group $G_T$.

Computability: There exists an algorithm for efficiently calculating $e(\Gamma_1, \Gamma_2)$ for all $\Gamma_1 \in G_1^{n+1}$, $\Gamma_2 \in G_2^{n+1}$.

In the embodiments, the bilinear function e is formed with following a non-degenerate bilinear function which maps the direct product $G_1 \times G_2$ of the cyclic groups $G_1$ and $G_2$ to the cyclic group $G_T$.

$$\text{Pair}: G_1 \times G_2 \to G_T \quad (5)$$

The bilinear function e outputs an element of the cyclic group $G_T$ in response to an input (n+1)-dimensional vector ($\gamma_1, \ldots, \gamma_{n+1}$) formed of (n+1) elements $\gamma_L$ (L=1, ..., n+1) of the cyclic group $G_1$ and an input (n+1)-dimensional vector ($\gamma_1^*, \ldots, \gamma_{n+1}^*$) formed of (n+1) elements $\gamma_L^*$(L=1, ..., n+1) of the cyclic group $G_2$.

$$e = \Pi_{L=1}^{n+1} \text{Pair}(\gamma_L, \gamma_L^*) \quad (6)$$

The bilinear function Pair outputs an element of the cyclic group $G_T$ in response to an input element of the cyclic group $G_1$ and an input element of the cyclic group $G_2$, and satisfies the following characteristics:

Bilinearity: The following relationship is satisfied for all $\Omega_1 \in G_1$, $\Omega_2 \in G_2$, and $\nu, \kappa \in F_q$ $$\text{Pair}(\nu \cdot \Omega_1, \kappa \cdot \Omega_2) = \text{Pair}(\Omega_1, \Omega_2)^{\nu \cdot \kappa} \quad (7)$$

Non-degeneracy: This function does not map all $$\Omega_1 \in G_1, \Omega_2 \in G_2 \quad (8)$$

onto the identity element of the cyclic group $G_T$.

Computability: There exists an algorithm for efficiently calculating $\text{Pair}(\Omega_1, \Omega_2)$ for all $\Omega_1 \in G_1, \Omega_2 \in G_2$.

A specific example of the bilinear function Pair is a function for performing a pairing computation such as Weil pairing or Tate pairing. (See reference literature 4, Alfred. J. Menezes, "Elliptic Curve Public Key Cryptosystems", Kluwer Academic Publishers, ISBN 0-7923-9368-6, pp. 61-81, for example.) Depending on the kind of the elliptic curve E, a modified pairing function $e(\Omega_1, \text{phi}(\Omega_2))(\Omega_1 \in G_1, \Omega_2 \in G_2)$ which is a combination of a predetermined function phi and the function for pairing computation such as the Tate paring may be used as the bilinear function Pair (see reference literature 2, for example). As the algorithm for performing a pairing computation on a computer, the Miller algorithm (see reference literature 5, V. S. Miller, "Short Programs for Functions on Curves", 1986, http://crypto.stanford.edu/miller/miller.pdf) or some other known algorithm can be used. Forming methods of a cyclic group and an elliptic curve for effective pairing computation have been well known. (For example, see reference literature 2, described earlier, reference literature 6, A. Miyaji, M. Nakabayashi, and S. Takano, "New Explicit Conditions of Elliptic Curve Traces for FR-Reduction", IEICE Trans. Fundamentals, Vol. E84-A, No. 5, pp. 1234-1243, May 2001, reference literature 7, P. S. L. M. Barreto, B. Lynn, M. Scott, "Constructing Elliptic Curves with Prescribed Embedding Degrees", Proc. SCN '2002, LNCS 2576, pp. 259-267, Springer-Verlag. 2003, and reference literature 8, R. Dupont, A. Enge, F. Morain, "Building Curves with Arbitrary Small MOV Degree over Finite Prime Fields", http://eprint.iacr.org/2002/094/.)

$a_i$ ($i=1, \ldots, n+1$): $a_i$ ($i=1, \ldots, n+1$) represent $(n+1)$-dimensional basis vectors having $(n+1)$ elements of the cyclic group $G_1$ as elements. For example, each of the basis vectors $a_i$ is the $(n+1)$-dimensional vector in which i-th element is $\kappa_1 \cdot g_1 \in G_1$ and remain elements are identity elements (each of which is expressed additively as "0") of the cyclic group $G_1$. In that case, the elements of the $(n+1)$-dimensional basis vectors $a_i$ ($i=1, \ldots, n+1$) can be listed as follows:

$$a_1 = (\kappa_1 \cdot g_1, 0, 0, \ldots, 0)$$

$$a_2 = (0, \kappa_1 \cdot g_1, 0, \ldots, 0)$$

$$\ldots$$

$$a_{n+1} = (0, 0, 0, \ldots, \kappa_1 \cdot g_1) \quad (9)$$

Here, $\kappa_1$ is a constant that is an element of the finite field $F_q$ other than the additive identity element $0_F$. An example of $\kappa_1 \in F_q$ is $\kappa_1 = 1_F$. The basis vectors $a_i$ are orthogonal bases. Each $(n+1)$-dimensional vector having $(n+1)$ elements of the cyclic group $G_1$ as elements is expressed by a linear combination of the $(n+1)$-dimensional basis vectors $a_i$ ($i=1, \ldots, n+1$). That is the $(n+1)$-dimensional basis vectors $a_i$ span the vector space V, described earlier.

$a_i^*$ ($i=1, \ldots, n+1$): $a_i^*$ ($i=1, \ldots, n+1$) represent $(n+1)$-dimensional basis vectors having $(n+1)$ elements of the cyclic group $G_2$ as elements. For example, each of the basis vectors $a_i^*$ is the $(n+1)$-dimensional vector in which i-th element is $\kappa_2 \cdot g_2 \in G_2$ and remain elements are identity elements (each of which is expressed additively as "0") of the cyclic group $G_2$. In that case, the elements of the $(n+1)$-dimensional basis vectors $a_i^*$ ($i=1, \ldots, n+1$) can be listed as follows:

$$a_1^* = (\kappa_2 \cdot g_2, 0, 0, \ldots, 0)$$

$$a_2^* = (0, \kappa_2 \cdot g_2, 0, \ldots, 0)$$

$$\ldots$$

$$a_{n+1}^* = (0, 0, 0, \ldots, \kappa_2 \cdot g_2) \quad (10)$$

Here, $\kappa_2$ is a constant that is an element of the finite field $F_q$ other than the additive identity element $0_F$. An example of $\kappa_2 \in F_q$ is $\kappa_2 = 1_F$. The basis vectors $a_i^*$ are orthogonal bases. Each $(n+1)$-dimensional vector having $(n+1)$ elements of the cyclic group $G_2$ as elements is expressed by a linear combination of $(n+1)$-dimensional basis vectors $a_i^*$ ($i=1, \ldots, n+1$). That is, the $(n+1)$-dimensional basis vectors $a_i^*$ span the vector space V*, described earlier.

The basis vectors $a_i$ and the basis vectors $a_i^*$ satisfy the following expression for an element $\tau = \kappa_1 \cdot \kappa_2$ of the finite field $F_q$ other than $0_F$:

$$e(a_i, a_j^*) = g_T^{\tau \cdot \delta(i,j)} \quad (11)$$

When $i=j$, the following expression is satisfied from Expressions (6) and (7).

$$\begin{aligned}
e(a_i, a_j^*) &= \text{Pair}(\kappa_1 \cdot g_1, \kappa_2 \cdot g_2) \cdot \text{Pair}(0, 0) \cdot \ldots \cdot \text{Pair}(0, 0) \\
&= \text{Pair}(g_1, g_2)^{\kappa_1 \cdot \kappa_2} \cdot \text{Pair}(g_1, g_2)^{0 \cdot 0} \cdot \ldots \cdot \text{Pair}(g_1, g_2)^{0 \cdot 0} \\
&= \text{Pair}(g_1, g_2)^{\kappa_1 \cdot \kappa_2} \\
&= g_T^{\tau}
\end{aligned}$$

When $i \neq j$, $e(a_i, a_j^*)$ does not include $\text{Pair}(\kappa_1 \cdot g_1, \kappa_2 \cdot g_2)$ and is the product of $\text{Pair}(\kappa_1 \cdot g_1, 0)$, $\text{Pair}(0, \kappa_2 \cdot g_2)$, and $\text{Pair}(0, 0)$. In addition, the following expression is satisfied from Expression (7).

$$\text{Pair}(g_1, 0) = \text{Pair}(0, g_2) = \text{Pair}(g_1, g_2)^0$$

Therefore, when $i \neq j$, the following expression is satisfied.

$$e(a_i, a_j^*) = e(g_1, g_2)^0 = g_T^0$$

Especially when $\tau = \kappa_1 \cdot \kappa_2 = 1_F$ (for example, $\kappa_1 = \kappa_2 = 1_F$), the following expression is satisfied.

$$e(a_i, a_j^*) = g_T^{\delta(i,j)} \quad (12)$$

Here, $g_T^0 = 1$ is the identity element of the cyclic group $G_T$, and $g_T^1 = g_T$ is a generator of the cyclic group $G_T$. In that case, the basis vectors $a_i$ and the basis vectors $a_i^*$ are dual normal orthogonal bases, and the vector space V and the vector space V* are a dual vector space in which the bilinear mapping can be defined (dual pairing vector space (DPVS)).

A: "A" represents an $(n+1)$ row by $(n+1)$ column matrix having the basis vectors $a_i$ ($i=1, \ldots, n+1$) as elements. When the basis vectors $a_i$ ($i=1, \ldots, n+1$) are expressed by Expression (9), for example, the matrix A is as follows:

$$A = \begin{pmatrix} a_1 \\ a_2 \\ \vdots \\ a_{n+1} \end{pmatrix} = \begin{pmatrix} \kappa_1 \cdot g_1 & 0 & \cdots & 0 \\ 0 & \kappa_1 \cdot g_1 & & \vdots \\ \vdots & & \ddots & 0 \\ 0 & \cdots & 0 & \kappa_1 \cdot g_1 \end{pmatrix} \quad (13)$$

A*: "A*" represents an $(n+1)$ row by $(n+1)$ column matrix having the basis vectors $a_i^*$ ($i=1, \ldots, n+1$) as elements.

When the basis vectors $a_i^*$ (i=1, ..., n+1) are expressed by Expression (10), for example, the matrix $A^*$ is as follows:

$$A^* = \begin{pmatrix} a_1^* \\ a_2^* \\ \vdots \\ a_{n+1}^* \end{pmatrix} = \begin{pmatrix} \kappa_2 \cdot g_2 & 0 & \cdots & 0 \\ 0 & \kappa_2 \cdot g_2 & & \vdots \\ \vdots & & \ddots & 0 \\ 0 & \cdots & 0 & \kappa_2 \cdot g_2 \end{pmatrix} \quad (14)$$

X: X represents an (n+1) row by (n+1) column matrix having elements of the finite field $F_q$ as entries. The matrix X is used for coordinate transformation of the basis vectors $a_i$. The matrix X is as follows:

$$X = \begin{pmatrix} \chi_{1,1} & \chi_{1,2} & \cdots & \chi_{1,n+1} \\ \chi_{2,1} & \chi_{2,2} & & \vdots \\ \vdots & & \ddots & \vdots \\ \chi_{n+1,1} & \chi_{n+1,2} & \cdots & \chi_{n+1,n+1} \end{pmatrix} \quad (15)$$

where each $\chi_{i,j} \in F_q$ is the entry in the i-th row and the j-th column (i=1, ..., n+1, j=1, ..., n+1) of the matrix X.

Here, each entry $\chi_{i,j}$ of the matrix X is called as a transformation coefficient.

$X^*$: $X^*$ represents the transposed matrix of the inverse matrix of the matrix X. $X^* = (X^{-1})^T$. The matrix $X^*$ is used for coordinate transformation of the basis vectors $a_i^*$. The matrix $X^*$ is expressed as follows:

$$X^* = \begin{pmatrix} \chi_{1,1}^* & \chi_{1,2}^* & \cdots & \chi_{1,n+1}^* \\ \chi_{2,1}^* & \chi_{2,2}^* & & \vdots \\ \vdots & & \ddots & \vdots \\ \chi_{n+1,1}^* & \chi_{n+1,2}^* & \cdots & \chi_{n+1,n+1}^* \end{pmatrix} \quad (16)$$

where the entry in the i-th row and j-th column of the matrix $X^*$ is $\chi_{i,j}^* \in F_q$.

Here, each entry $\chi_{i,j}^*$ of the matrix $X^*$ is called as a transformation coefficient.

In that case, $X \cdot (X^*)^T = I$ is satisfied, where "I" represents an (n+1) row by (n+1) column unit matrix.

In other words, the unit matrix is expressed as follows:

$$I = \begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix} \quad (17)$$

The following expression is satisfied.

$$\begin{pmatrix} \chi_{1,1} & \chi_{1,2} & \cdots & \chi_{1,n+1} \\ \chi_{2,1} & \chi_{2,2} & & \vdots \\ \vdots & & \ddots & \vdots \\ \chi_{n+1,1} & \chi_{n+1,2} & \cdots & \chi_{n+1,n+1} \end{pmatrix} \cdot \begin{pmatrix} \chi_{1,1}^* & \chi_{1,2}^* & \cdots & \chi_{n+1,1}^* \\ \chi_{1,2}^* & \chi_{2,2}^* & & \vdots \\ \vdots & & \ddots & \vdots \\ \chi_{1,n+1}^* & \chi_{2,n+1}^* & \cdots & \chi_{n+1,n+1}^* \end{pmatrix} = \quad (18)$$

$$\begin{pmatrix} 1_F & 0_F & \cdots & 0_F \\ 0_F & 1_F & & \vdots \\ \vdots & & \ddots & 0_F \\ 0_F & 0_F & \cdots & 1_F \end{pmatrix}$$

Here, (n+1)-dimensional vectors will be defined below.

$$\vec{\chi_i} = (\chi_{i,1}, \ldots, \chi_{i,n+1}) \quad (19)$$

$$\vec{\chi_j} = (\chi_{j,1}^*, \ldots, \chi_{j,n+1}^*) \quad (20)$$

The Inner Product of the (n+1)-Dimensional Vectors $\vec{\chi_i}$ and $\vec{\chi_j}^*$ satisfies the following expression from Expression (18).

$$\vec{\chi_i} \cdot \vec{\chi_j}^* = \delta(i,j) \quad (21)$$

$b_i$: $b_i$ represent (n+1)-dimensional basis vectors having (n+1) elements of the cyclic group $G_1$ as elements. The basis vectors $b_i$ are obtained by coordinate transformation of the basis vectors $a_i$ (i=1, ..., n+1) with the matrix X. That is, the basis vectors $b_i$ are obtained by the following calculation.

$$b_i = \Sigma_{j=1}^{n+1} \chi_{i,j} \cdot a_j \quad (22)$$

When the basis vectors $a_j$ (j=1, ..., n+1) are expressed by Expression (9), each element of the basis vectors $b_i$ is shown below.

$$b_i = (\chi_{i,1} \cdot \kappa_1 \cdot g_1, \chi_{i,2} \cdot \kappa_1 \cdot g_1, \ldots, \chi_{i,n+1} \cdot \kappa_1 \cdot g_1) \quad (23)$$

Each (n+1)-dimensional vector having (n+1) elements of the cyclic group $G_1$ as elements is expressed by a linear combination of (n+1)-dimensional basis vectors $b_i$ (i=1, ..., n+1). That is, the (n+1)-dimensional basis vectors $b_i$ span the vector space V, described earlier.

$b_i^*$: $b_i^*$ represent (n+1)-dimensional basis vectors having (n+1) elements of the cyclic group $G_2$ as elements. The basis vectors $b_i^*$ are obtained by coordinate transformation of the basis vectors $a_i^*$ (i=1, ..., n+1) with the matrix $X^*$. That is, the basis vectors $b_i^*$ are obtained by the following calculation.

$$b_i^* = \Sigma_{j=1}^{n+1} \chi_{i,j}^* \cdot a_j^* \quad (24)$$

When the basis vectors $a_j$ (j=1, ..., n+1) are expressed by Expression (10), each element of the basis vectors $b_i^*$ are shown below.

$$b_i^* = (\chi_{i,1}^* \cdot \kappa_2 \cdot g_2, \chi_{i,2}^* \cdot \kappa_2 \cdot g_2, \ldots, \chi_{i,n+1}^* \cdot \kappa_2 \cdot g_2) \quad (25)$$

Each (n+1)-dimensional vector having (n+1) elements of the cyclic group $G_2$ as elements is expressed by a linear combination of (n+1)-dimensional basis vectors $b_i^*$ (i=1, ..., n+1). That is, the (n+1)-dimensional basis vectors $b_i^*$ span the vector space $V^*$, described earlier.

The basis vectors $b_i$ and the basis vectors $b_i^*$ satisfy the following expression for the elements $\tau = \kappa_1 \cdot \kappa_2$ of the finite field $F_q$ other than $0_F$:

$$e(b_i, b_j^*) = g_T^{\tau \cdot \delta(i,j)} \quad (26)$$

The following expression is satisfied from Expressions (6), (21), (23), and (25).

$$e(b_i, b_j^*) = \prod_{L=1}^{n+1} \text{Pair}(\chi_{i,L} \cdot \kappa_1 \cdot g_1, \chi_{j,L}^* \cdot \kappa_2 \cdot g_2)$$
$$= \text{Pair}(\chi_{i,1} \cdot \kappa_1 \cdot g_1, \chi_{j,1}^* \cdot \kappa_2 \cdot g_2) \cdot \ldots \cdot$$
$$(\chi_{i,n} \cdot \kappa_1 \cdot g_1, \chi_{j,n}^* \cdot \kappa_2 \cdot g_2) \times$$
$$\text{Pair}(\chi_{j,n+1} \cdot \kappa_1 \cdot g_1, \chi_{j,n+1}^* \cdot \kappa_2 \cdot g_2)$$
$$= \text{Pair}(g_1, g_2)^{\kappa_1 \cdot \kappa_2 \cdot \chi_{i,1} \cdot \chi_{j,1}^*} \cdot \ldots \cdot \text{Pair}(g_1, g_2)^{\kappa_1 \cdot \kappa_2 \cdot \chi_{i,2} \cdot \chi_{j,2}^*} \times$$
$$\text{Pair}(g_1, g_2)^{\kappa_1 \cdot \kappa_2 \cdot \chi_{i,n+1} \cdot \chi_{j,n+1}^*}$$
$$= \text{Pair}(g_1, g_2)^{\kappa_1 \cdot \kappa_2 (\chi_{i,1} \cdot \chi_{j,1}^* + \chi_{i,2} \cdot \chi_{j,2}^* + \ldots + \chi_{i,n+1} \cdot \chi_{j,n+1}^*)}$$
$$= \text{Pair}(g_1, g_2)^{\kappa_1 \cdot \kappa_2 \cdot \vec{\chi_i} \cdot \vec{\chi_j}^*}$$
$$= \text{Pair}(g_1, g_2)^{\tau \cdot \delta(i,j)}$$
$$= g_T^{\tau \cdot \delta(i,j)}$$

Especially when $\tau = \kappa_1 \cdot \kappa_2 = 1_F$ (for example, $\kappa_1 = \kappa_2 = 1_F$), the following expression is satisfied.

$$e(b_i, b_j^*) = g_T^{\delta(i,j)} \tag{27}$$

In that case, the basis vectors $b_i$ and the basis vectors $b_i^*$ are the dual normal orthogonal basis of a dual pairing vector space (the vector space V and the vector space V*).

As long as Expression (26) is satisfied, the basis vectors $a_i$ and $a_i^*$ other than those shown in Expressions (9) and (10) as examples, and the basis vectors $b_i$ and $b_i^*$ other than those shown in Expressions (22) and (24) as examples may be used.

B: B represents an (n+1) row by (n+1) column matrix having the basis vectors $b_i$ (i=1, ..., n+1) as elements.

B=X·A is satisfied. When the basis vectors $b_i$ are expressed by Expression (23), for example, the matrix B is as follows:

$$B = \begin{pmatrix} b_1 \\ b_2 \\ \vdots \\ b_{n+1} \end{pmatrix} \tag{28}$$
$$= \begin{pmatrix} \chi_{1,1} \cdot \kappa_1 \cdot g_1 & \chi_{1,2} \cdot \kappa_1 \cdot g_1 & \cdots & \chi_{1,n+1} \cdot \kappa_1 \cdot g_1 \\ \chi_{2,1} \cdot \kappa_1 \cdot g_1 & \chi_{2,2} \cdot \kappa_1 \cdot g_1 & & \vdots \\ \vdots & & \ddots & \chi_{n,n+1} \cdot \kappa_1 \cdot g_1 \\ \chi_{n+1,1} \cdot \kappa_1 \cdot g_1 & \cdots & \chi_{n+1,n} \cdot \kappa_1 \cdot g_1 & \chi_{n+1,n+1} \cdot \kappa_1 \cdot g_1 \end{pmatrix}$$

B*: B* represents an (n+1) row by (n+1) column matrix having the basis vectors $b_i^*$ (i=1, ..., n+1) as elements.

B*=X*·A* is satisfied. When the basis vectors $b_i^*$ (i=1, ..., n+1) are expressed by Expression (25), for example, the matrix B* is as follows:

$$B = \begin{pmatrix} b_1^* \\ b_2^* \\ \vdots \\ b_{n+1}^* \end{pmatrix} \tag{29}$$
$$= \begin{pmatrix} \chi_{1,1}^* \cdot \kappa_2 \cdot g_2 & \chi_{1,2}^* \cdot \kappa_2 \cdot g_2 & \cdots & \chi_{1,n+1}^* \cdot \kappa_2 \cdot g_2 \\ \chi_{2,1}^* \cdot \kappa_2 \cdot g_2 & \chi_{2,2}^* \cdot \kappa_2 \cdot g_2 & & \vdots \\ \vdots & & \ddots & \chi_{n,n+1}^* \cdot \kappa_2 \cdot g_2 \\ \chi_{n+1,1}^* \cdot \kappa_2 \cdot g_2 & \cdots & \chi_{n+1,n}^* \cdot \kappa_2 \cdot g_2 & \chi_{n+1,n+1}^* \cdot \kappa_2 \cdot g_2 \end{pmatrix}$$

$\vec{w}$: $\vec{w}$ represents an n-dimensional vector having elements of the finite field $F_q$ as elements.

$$\vec{w} = (w_1, \ldots, w_n) \in F_q^n \tag{30}$$

$w_\mu$: $w_\mu$ represents the μ-th (μ=1, ..., n) element of the n-dimensional vector.

$\vec{v}$: $\vec{v}$ represents an n-dimensional vector having elements of the finite field $F_q$ as elements.

$$\vec{v} = (v_1, \ldots, v_n) \in F_q^n \tag{31}$$

$v_\mu$: $v_\mu$ represents the μ-th (μ=1, ..., n) element of the n-dimensional vector.

Collision-resistant function: The collision-resistant function represents a function h that satisfies the following condition with respect to a sufficiently larger security parameter k, or a function regarded as the function h.

$$Pr[A(h)=(x,y)|h(x)=h(y) \wedge x \neq y] < \epsilon(k) \tag{32}$$

Here, Pr[•] is the probability of the event [•]; A(h) is a probability polynomial time algorithm for calculating x and y (x≠y) that satisfy h(x)=h(y) for the function h; and ε(k) is a polynomial equation of the security parameter k. An example collision-resistant function is a hash function, such as the cryptographic hash function disclosed in the reference literature 1.

Injective function: The injective function represents a function that each element of its codomain is mapped from each one element of its domain, or a function regarded as such. An example of the injection function is a hash function, such as the key derivation function (KDF) disclosed in the reference literature 1.

Quasi random function: The quasi random function represents a function belonging to a subset $\phi_\zeta$ of a set $\Phi_\zeta$, or a function regarded as such, where any probabilistic polynomial time algorithm cannot distinguish the subset $\phi_\zeta$ from the set $\Phi_\zeta$; and the set $\Phi_\zeta$ is a set of all functions that map an element of a set $\{0,1\}^*$ to an element of the set $\{0,1\}^\zeta$. An example of the quasi random function is a hash function such as that described above.

$H_1$: $H_1$ represents a collision-resistant function that outputs two elements $(\psi_1, \psi_2) \in F_q \times F_q$ of the finite field $F_q$ in response to input two binary sequences $(\omega_1, \omega_2) \in \{0,1\}^k \times \{0,1\}^*$.

$$H_1: \{0,1\}^k \times \{0,1\}^* \rightarrow F_q \times F_q \tag{33}$$

An example of the function $H_1$ is a function that outputs two elements $(\psi_1, \psi_2) \in F_q \times F_q$ of the finite field $F_q$ in response to the connected bits $\omega_1 \| \omega_2$ of input $\omega_1$ and $\omega_2$. This function may include a hash function such as the cryptographic hash function, a binary-sequence-to-integer conversion function (octet string/integer conversion), and a binary-sequence-to-finite-field-element conversion function (octet string and integer/finite field conversion), which are disclosed in the reference literature 1. Preferably, the function $H_1$ is a quasi random function.

$H_2$: $H_2$ represents a collision-resistant function that outputs an element $\psi \in F_q$ of the finite field $F_q$ in response to an input element of the cyclic group $G_T$ and an input binary sequence $(\xi, \omega_2) \in G_T \times \{0,1\}^*$.

$$H_2: G_T \times \{0,1\}^* \rightarrow F_q \tag{34}$$

An example of the function $H_2$ is a function that accepts an element $\xi \in G_T$ of the cyclic group $G_T$ and a binary sequence $\omega_2 \in \{0,1\}^*$, inputs the element $\xi \in G_T$ of the cyclic group $G_T$ to a finite-field-element-to-binary-sequence conversion function (octet string and integer/finite field conversion) disclosed in the reference literature 1 to obtain a binary sequence, applies a hash function such the cryptographic hash function disclosed in the reference literature 1 to the connected bits of the obtained binary sequence and the binary sequence $\omega_2 \in \{0,1\}^*$, performs the binary-sequence-to-finite-field-element conversion function (octet string and integer/finite field conversion), and outputs one element $\psi \in F_q$ of the finite field $F_q$. For ensuring the higher safety, it is preferable that the function $H_2$ is the quasi-random function.

R: R represents an injective function that outputs one binary sequence $\omega \in \{0, 1\}^k$ in response to an input element $\xi \in G_T$ of the cyclic group $G_T$.

$$R: G_T \to \{0,1\}^* \quad (35)$$

An example of the injective function R is a function that receives an element $\xi \in G_T$ of the cyclic group $G_T$, performs calculations with the finite-field-element-to-binary-sequence conversion function (octet string and integer/finite field conversion) and then with a hash function such as the KDF (key derivation function) disclosed in the reference literature 1, and outputs one binary sequence $\omega \in \{0, 1\}^k$. For ensuring the higher safety, it is preferable that the function R is the collision-resistant function, and it is more preferable that the function R is the quasi random function.

Enc: Enc represents a symmetric key encryption function that indicates encryption processing of a symmetric key cryptosystem. Examples of symmetric key cryptosystems are Camellia and AES.

$Enc_k(M)$: $Enc_k(M)$ represents a ciphertext obtained by encrypting a plaintext M by the symmetric key encryption function Enc with a symmetric key K.

Dec: Dec represents a symmetric key decryption function that indicates decryption processing of the symmetric key cryptosystem.

$Dec_k(C)$: $Dec_k(C)$ represents a decryption result obtained by decrypting a ciphertext C by the symmetric key decryption function Dec with the symmetric key K.

Inner Product Predicate Encryption

The basic scheme of inner product predicate encryption will be described below.

Predicate Encryption

In the predicate encryption (sometimes called as function encryption), a ciphertext can be decrypted when a combination of attribute information and predicate information makes a predetermined logical formula true. One of the attribute information and predicate information is embedded in the ciphertext and the other is embedded in key information. The conventional predicate encryption is, for example, disclosed in reference literature 9, Jonathan Katz, Amit Sahai and Brent Waters, "Predicate Encryption Supporting Disjunctions, Polynomial Equations, and Inner Products", one of four papers from Eurocrypt 2008 invited by the Journal of Cryptology.

Inner Product Predicate Encryption

In the inner product predicate encryption, a ciphertext can be decrypted when the inner product of the attribute information and the predicate information which are vectors is zero. In inner product predicate encryption, an inner product of zero is equivalent to the logical formula of true.

Relationship Between Logical Formula and Polynomial

In the inner product predicate encryption, the logical formula formed of a logical OR(s) and/or a logical AND(s) is expressed by a polynomial.

The logical OR $(x=\eta_1) \vee (x=\eta_2)$ of a proposition 1 indicating that x is $\eta_1$ and a proposition 2 indicating that x is $\eta_2$ is expressed by the following polynomial.

$$(x-\eta_1) \cdot (x-\eta_2) \quad (36)$$

Then, the relationships between truth values and the function values of Expression (36) are shown in the following table.

TABLE 1

| Proposition 1 ($x = \eta_1$) | Proposition 2 ($x = \eta_2$) | Logical OR ($x = \eta_1) \vee (x = \eta_2$) | Function value ($x = \eta_1) \cdot (x = \eta_2$) |
|---|---|---|---|
| True | True | True | 0 |
| True | False | True | 0 |
| False | True | True | 0 |
| False | False | False | Other than 0 |

As understood from Table 1, when the logical OR $(x=\eta_1) \vee (x=\eta_2)$ is true, the function value of Expression (36) is zero; and when the logical OR $(x=\eta_1) \vee (x=\eta_2)$ is false, the function value of Expression (36) is a value other than zero. In other words, the logical OR $(x=\eta_1) \vee (x=\eta_2)$ of true is equivalent to the function value of zero in Expression (36). Therefore, the logical OR can be expressed by Expression (36).

The logical AND $(x=\eta_1) \wedge (x=\eta_2)$ of the proposition 1 indicating that x is $\eta_1$ and the proposition 2 indicating that x is $\eta_2$ is expressed by the following polynomial $$\iota_1 \cdot (x-\eta_1) + \iota_2 \cdot (x-\eta_2) \quad (37)$$

where $\iota_1$ and $\iota_2$ are random numbers. Then, the relationships between truth values and the function values of Expression (37) are shown in the following table.

TABLE 2

| Proposition 1 ($x = \eta_1$) | Proposition 2 ($x = \eta_2$) | Logical AND ($x = \eta_1) \wedge (x = \eta_2$) | Function value $\iota_1 \cdot (x - \eta_1) + \iota_2 \cdot (x - \eta_2)$ |
|---|---|---|---|
| True | True | True | 0 |
| True | False | False | Other than 0 |
| False | True | False | Other than 0 |
| False | False | False | Other than 0 |

As understood from Table 2, when the logical AND $(x=\eta_1) \wedge (x=\eta_2)$ is true, the function value of Expression (37) is zero; and when the logical AND $(x=\eta_1) \wedge (x=\eta_2)$ is false, the function value of Expression (37) is a value other than zero. In other words, a logical AND $(x=\eta_1) \wedge (x=\eta_2)$ of true is equivalent to a function value of zero in Expression (37). Therefore, the logical AND can be expressed by Expression (37).

As described above, by using Expressions (36) and (37), a logical formula formed of a logical OR(s) and/or a logical AND(s) can be expressed by a polynomial f(x). An example will be shown below.

Logical formula: $\{(x=\eta_1) \vee (x=\eta_2) \vee (x=\eta_3)\} \wedge (x=\eta_4) \wedge (x=\eta_5)$ Polynomial: $f(x) = \iota_1 \cdot \{(x-\eta_1) \cdot (x-\eta_2) \cdot (x-\eta_3)\} + \iota_2 \cdot (x-=\eta_4) + \iota_3 \cdot (x-=\eta_5)$ In Expression (36), one indeterminate element x is used to express the logical OR. A plurality of indeterminate elements can also be used to express a logical OR. For example, when two indeterminate elements $x_0$ and $x_1$ are used, the logical OR $(x_0=\eta_0) \vee (x_1=\eta_1)$ of the proposition 1 indicating that $x_0$ is $\eta_0$ and the proposition 2 indicating that $x_1$ is $\eta_1$ can be expressed by the following polynomial.

$$(x_0-\eta_0) \cdot (x_1-\eta_1)$$

Three or more indeterminate elements can also be used to express a logical OR by a polynomial.

In Expression (37), one indeterminate element x is used to express the logical AND. A plurality of indeterminate elements can also be used to express a logical AND. For example, the logical AND $(x_0=\eta_0) \wedge (x_1=\eta_1)$ of the proposition 1 indicating that $x_0$ is $\eta_0$ and the proposition 2 indicating that $x_1$ is $\eta_1$ can be expressed by the following polynomial.

$$\iota_0 \cdot (x_0 - \eta_0) + \iota_1 \cdot (x_1 - \eta_1)$$

Three or more indeterminate elements can also be used to express a logical AND by a polynomial.

A logical formula including a logical OR(s) and/or a logical AND(s) is expressed with $H$ ($H \geq 1$) types of indeterminate elements $x_0, \ldots, x_{H-1}$ as the polynomial $f(x_0, \ldots, x_{H-1})$. It is assumed that a proposition for each of the indeterminate elements $x_0, \ldots, x_{H-1}$ is "$x_h$ is $\eta_h$," where $\eta_h$ (h=0, \ldots, H-1) is a constant determined for each proposition. Then, in the polynomial $f(x_0, \ldots, x_{H-1})$ indicating the logical formula, the proposition indicating that an indeterminate element $x_h$ is a constant $\eta_h$ is expressed by the polynomial indicating the difference between the indeterminate element $x_h$ and the constant $\eta_h$; the logical OR of propositions is expressed by the product of the polynomials indicating the propositions; and the logical AND of propositions or the logical ORs of propositions is expressed by a linear combination of the polynomials indicating the propositions or the logical ORs of propositions. For example, five indeterminate elements $x_0, \ldots, x_4$ are used to express a logical formula $$\{(x_0 = \eta_0) \vee (x_1 = \eta_1) \vee (x_2 = \eta_2)\} \wedge (x_3 = \eta_3) \wedge (x_4 = \eta_4)$$

by the following polynomial $$f(x_0, \ldots, x_4) = \iota_0 \cdot \{(x_0 - \eta_0) \cdot (x_1 - \eta_1) \cdot (x_2 - \eta_2)\} + \iota_1 \cdot (x_3 - \eta_3) + \iota_2 \cdot (x_4 - \eta_4)$$

Relationship Between Polynomial and Inner Product

The polynomial $f(x_0, \ldots, x_{H-1})$ indicating a logical formula can be expressed by the inner product of two n-dimensional vectors. More specifically, the polynomial $f(x_0, \ldots, x_{H-1})$ is equal to the inner product of a vector $$\vec{v} = (v_1, \ldots, v_n)$$

which has the indeterminate elements of the terms of the polynomial $f(x_0, \ldots, x_{H-1})$ as elements, and a vector $$\vec{w} = (w_1, \ldots, w_n)$$

which has the coefficients of the terms of the polynomial $f(x_0, \ldots, x_{H-1})$ as elements.

$$f(x_0, \ldots, x_{H-1}) = \vec{w} \cdot \vec{v}$$

In other words, whether the polynomial $f(x_0, \ldots, x_{H-1})$ indicating a logical formula is zero is equivalent to whether the inner product of the vector $\vec{v}$ having the indeterminate elements of the terms of the polynomial $f(x_0, \ldots, x_{H-1})$ as elements and the vector $\vec{w}$ having the coefficients of the terms of the polynomial $f(x_0, \ldots, x_{H-1})$ as elements is zero.

$$f(x_0, \ldots, x_{H-1}) = 0 \Leftrightarrow \vec{w} \cdot \vec{v} = 0$$

For example, a polynomial $f(x) = \theta_0 \cdot x^0 + \theta_1 \cdot x + \ldots + \theta_{n-1} \cdot x^{n-1}$ expressed with one indeterminate element x can be expressed by the inner product of two n-dimensional vectors as follows.

$$\vec{w} = (w_1, \ldots, w_n) = (\theta_0, \ldots, \theta_{n-1}) \quad (39)$$

$$\vec{v} = (v_1, \ldots, v_n) = (x^0, \ldots, x^{n-1}) \quad (40)$$

$$f(x) = \vec{w} \cdot \vec{v} \quad (41)$$

In other words, whether the polynomial $f(x)$ indicating a logical formula is zero is equivalent to whether the inner product in Expression (41) is zero.

$$f(x) = 0 \Leftrightarrow \vec{w} \cdot \vec{v} = 0 \quad (42)$$

When a vector having the indeterminate elements of the terms of the polynomial $f(x_0, \ldots, x_{H-1})$ as elements is expressed by $$\vec{w} = (w_1, \ldots, w_n)$$

and a vector having the coefficients of the terms of the polynomial $f(x_0, \ldots, x_{H-1})$ as elements is expressed by $$\vec{v} = (v_1, \ldots, v_n)$$

whether the polynomial $f(x_0, \ldots, x_{H-1})$ indicating a logical formula is zero is equivalent to whether the inner product of the vector $\vec{w}$ and the vector $\vec{v}$ is zero.

For example, when the following expressions are used instead of Expressions (39) and (40), $$\vec{w} = (w_1, \ldots, w_n) = (x^0, \ldots, x^{n-1}) \quad (43)$$

$$\vec{v} = (v_1, \ldots, v_n) = (\theta_0, \ldots, \theta_{n-1}) \quad (44)$$

whether the polynomial $f(x)$ indicating a logical formula is zero is equivalent to whether the inner product in Expression (41) is zero.

In the inner product predicate encryption, one of the vectors $\vec{v} = (v_0, \ldots, v_{n-1})$ and $\vec{w} = (w_0, \ldots, w_{n-1})$ is used as the attribute information and the other is used as the predicate information. One of the attribute information and predicate information is embedded in ciphertext and the other is embedded in key information. For example, an n-dimensional vector $(\theta_0, \ldots, \theta_{n-1})$ is used as the predicate information, another n-dimensional vector $(x^0, \ldots, x^{n-1})$ is used as the attribute information, one of the attribute information and predicate information is embedded in ciphertext, and the other is embedded in key information. It is assumed in the following description that an n-dimensional vector embedded in key information is $\vec{w} = (w_1, \ldots, w_n)$ and another n-dimensional vector embedded in ciphertext is $\vec{v} = (v_1, \ldots, v_n)$. For example, Predicate information: $\vec{w} = (w_1, \ldots, w_n) = (\theta_0, \ldots, \theta_{n-1})$ Attribute information: $\vec{v} = (v_1, \ldots, v_n) = (x^0, \ldots, x^{n-1})$ Alternatively, Predicate information: $\vec{v} = (v_1, \ldots, v_n) = (\theta_0, \ldots, \theta_{n-1})$ Attribute information: $\vec{w} = (w_1, \ldots, w_n) = (x^0, \ldots, x^{n-1})$ Basic Scheme of Inner Product Predicate Encryption An example of basic scheme of a key encapsulation mechanism (KEM) using the inner product predicate encryption will be described below. This scheme includes Setup($1^k$), GenKey(MSK, $\vec{w}$), Enc(PA, $\vec{v}$), and Dec(SKw, $C_2$).

Setting up Setup($1^k$)

Input: Security parameter k

Output: Master key information MSK, public parameter PK

In an example of Setup($1^k$), the security parameter k is used as n, the (n+1) row by (n+1) column matrix A having the (n+1)-dimensional basis vectors $a_i$ (i=1, \ldots, n+1) as elements, the (n+1) row by (n+1) column matrix A* having the basis vectors $a_i^*$ (i=1, \ldots, n+1) as elements, and the (n+1) row by (n+1) column matrixes X and X* used for coordinate transformation are selected. Then, the (n+1)-dimensional basis vectors $b_i$ (i=1, \ldots, n+1) are calculated through coordinate transformation by Expression (22), and the (n+1)-dimensional basis vectors $b_i^*$ (i=1, \ldots, n+1) are calculated through coordinate transformation by Expression (24). Then, the (n+1) row by (n+1) column matrix B* having the basis vectors $b_i^*$ (i=1, ..., n+1) as elements is output as the master key information MSK; and the vector spaces V and V*, the (n+1) row by (n+1) column matrix B having the basis vectors $b_i$ (i=1, ..., n+1) as elements, the security parameter k, the finite field $F_q$, the elliptic curve E, the cyclic groups $G_1$, $G_2$, and $G_T$, the generators $g_1$, $g_2$, and $g_T$, the bilinear function e, and others are output as the public parameter PK.

Key information generation GenKey(MSK, $\vec{w}$)

Input: Master key information MSK, vector $\vec{w}$

Output: Key information D* corresponding to vector $\vec{w}$

In an example of GenKey(MSK, $\vec{w}$), an element $\alpha \in F_q$ is selected from the finite field $F_q$. Then, the matrix B*, which is the master key information MSK, is used to generate and output the key information D* corresponding to the vector $\vec{w}$ in the following way.

$$D^* = \alpha \cdot (\Sigma_{\mu=1}^n w_\mu \cdot b_\mu^*) + b_{n+1}^* \in G_2^{n+1} \quad (45)$$

If it is difficult to solve a discrete logarithmic problem on the cyclic group $G_2$, it is difficult to separate and extract the components of $w_\mu \cdot b_\mu^*$ and $b_{n+1}^*$ from the key information D*.

Encryption Enc(PA, $\vec{v}$)

Input: Public parameter PK, vector $\vec{v}$

Output: Ciphertext $C_2$, symmetric key K

In an example of Enc(PA, $\vec{v}$), the symmetric key K and a random number $\upsilon_1$ which is an element of the finite field $F_q$, are generated. Then, the public parameter PK, such as the matrix B, an element $\upsilon_2$ corresponding to a value that includes the symmetric key K, in the finite field $F_q$, the vector $\vec{v}$, and the random number $\upsilon_1$ are used to generate ciphertext $C_2$ in the following way.

$$C_2 = \upsilon_1 \cdot (\Sigma_{\mu=1}^n v_\mu \cdot b_\mu) + \upsilon_2 \cdot b_{n+1} \in G_1^{n+1} \quad (46)$$

The ciphertext $C_2$ and the symmetric key K are output. An example of the symmetric key K is $g_T^{\tau \cdot \upsilon 2} \in G_T$, where $\upsilon 2$ means $\upsilon_2$. An example of $\tau$ is $1_F$, as described above. If it is difficult to solve a discrete logarithmic problem on the cyclic group $G_1$, it is difficult to separate and extract the components of $v_\mu \cdot b_\mu$ and $\upsilon_2 \cdot b_{n+1}$ from the ciphertext $C_2$.

Decryption and key sharing Dec(SKw, $C_2$)

Input: Key information $D_1^*$ corresponding to vector $\vec{w}$, ciphertext $C_2$ Output: Symmetric key K In an example of Dec(SKw, $C_2$), the ciphertext $C_2$ and the key information $D_1^*$ are input to the bilinear function e of Expression (2).

Then, from the characteristics of Expressions (3) and (26), the following is satisfied.

$$e(C_2, D^*) = e\left(\upsilon_1 \cdot \left(\sum_{\mu=1}^n v_\mu \cdot b_\mu\right) + \upsilon_2 \cdot b_{n+1}, \alpha \cdot \left(\sum_{\mu=1}^n w_\mu \cdot b_\mu^*\right) + b_{n+1}^*\right) \quad (47)$$
$$= e(\upsilon_1, v_1 \cdot b_1, \alpha \cdot w_1 \cdot b_1^*) \cdot \ldots \cdot e(\upsilon_1, v_n \cdot b_n, \alpha, w_n, b_n^*) \times e(\upsilon_2 \cdot b_{n+1} \cdot b_{n+1}^*)$$
$$= e(b_1, b_1^*)^{\upsilon_1 \cdot v_1 \cdot \alpha \cdot w_1} \cdot \ldots \cdot e(b_n, b_n^*)^{\upsilon_1 \cdot v_n \cdot \alpha \cdot w_n} \cdot e(b_{n+1}, b_{n+1}^*)^{\upsilon_2}$$
$$= g_T^{\tau \cdot \upsilon_1 \cdot v_1 \cdot \alpha \cdot w_1} \cdot \ldots \cdot g_T^{\tau \cdot \upsilon_1 \cdot v_n \cdot \alpha \cdot w_n} \cdot g_T^{\tau \cdot \upsilon_2}$$
$$= g_T^{\tau \cdot \upsilon_1 \cdot \alpha \cdot \vec{v} \cdot \vec{w}} \cdot g_T^{\tau \cdot \upsilon_2}$$

When the inner product $\vec{w} \cdot \vec{v}$ is zero, Expression (47) can be deformed to the following form.

$$e(C_2, D^*) = g_T^{\tau \cdot \upsilon_1 \cdot \alpha \cdot 0} \cdot g_T^{\tau \cdot \upsilon_2} \quad (48)$$
$$= g_T^{\tau \cdot \upsilon_2}$$

From this result, the symmetric key K is generated and output. An example of the symmetric key K is $g_T^{\tau \cdot \upsilon 2} \in G_T$.

Security Against CCA

The scheme is CCA-secure if the following relation is satisfied on the supposition given below:

$$Pr[bit=bit'] < (½) - FNK(k) \quad (49)$$

where FNK(k) is a function of k. If [3] follows [2], the scheme is secure against CCA2. If [2] follows [3], the scheme is secure against CCA1. CCA2 is stronger than CCA1.

[1] The attacker is given a public parameter PK.

[2] The attacker passes two pieces of plaintext $M_0$ and $M_1$, which are two bit strings, to an encryption oracle having the public parameter PK. The encryption oracle selects bit$\in\{0, 1\}$ at random, encrypts either piece of plaintext $M_{bit}$, and gives the ciphertext C to the attacker.

[3] The attacker can pass ciphertext $C(\sigma)$ ($C(\sigma) \neq C$) to a decryption oracle having key information D* and receive a decrypted result of the ciphertext $C(\sigma)$ from the decryption oracle.

[4] The attacker outputs bit'$\in\{0, 1\}$.

Security against CCA in basic scheme of inner product predicate encryption

The basic scheme of the inner product predicate encryption described above is not CCA-secure. This will be described by showing a simple example. In the simple example, $\tau=1_F$; the symmetric key K is K=MAP $(g_T^{\upsilon 2})$; and the ciphertext obtained by the symmetric key encryption of the plaintext M with the symmetric key K is $C_1$=K (+) M. MAP $(g_T^{\upsilon 2})$ represents mapping of $g_T^{\upsilon 2} \in G_T$ to a bit string. In this example, the attacker can take the following strategy (hereafter called as assumed strategy).

[1] The attacker is given a public parameter PK.

[2] The attacker passes a vector $\vec{v}$ and two pieces of plaintext $M_0$ and $M_1$ to an encryption oracle having the public parameter PK. The encryption oracle selects bit$\in\{0, 1\}$ at random, generates the ciphertext $$C_1 = K(+)M_{bit} \quad (50)$$

obtained by encrypting either piece of plaintext $M_{bit}$ with the symmetric key K=$g_T^{\upsilon 2}$, generates ciphertext $$C_2 = \upsilon_1 \cdot (\Sigma_{\mu=1}^n v_\mu \cdot b_\mu) + \upsilon_2 \cdot b_{n+1} \in G_1^{n+1} \quad (51)$$

of the symmetric key K=$g_T^{\upsilon 2}$, and gives the ciphertext ($C_1$, $C_2$) to the attacker.

[3] The attacker passes the ciphertext $$(C_1(+)\Delta M, C_2) \quad (52)$$

to a decryption oracle having the key information D* and receives the decrypted results of the ciphertext $C_1(1)$ and $C_1(2)$ from the decryption oracle.

Here, if bit=0, then $C_1$=K (+) $M_0$, and the decrypted result of $C_1$ (+) $\Delta M$ is $M_0$ (+) $\Delta M$. If bit=1, then $C_1$=K (+) $M_1$, and the decrypted result of $C_1$ (+) $\Delta M$ is $M_1$ (+) $\Delta M$.

[4] When the decrypted result of $C_1$ (+) $\Delta M$ is $M_0$ (+) $\Delta M$, the attacker outputs bit'=0. When the decrypted result is $M_1$ (+) $\Delta M$, the attacker outputs bit'=1.

Then, Pr[bit=bit']=1, and Expression (49) is not satisfied.

Inner Product Predicate Encryption in Embodiments

As described above, the basic scheme of the inner product predicate encryption is not CCA-secure. If the CHK transformation method or BK transformation method is used to make the basic scheme of inner product predicate encryption CCA-secure, a two-dimensional space used just for improving the level of CCA-security becomes necessary in the ciphertext space, and the number of dimensions of the vector spaces V and V* must be n+3. In the embodiments, the CCA security is improved without providing a space used just for improving the level of CCA security.

Improved Scheme of Inner Product Predicate Encryption

An improved scheme of the inner product predicate encryption in the embodiments will be overviewed below.

Encryption Processing

An encryption apparatus for performing encryption processing executes the following processing.

(ENC-1) A symmetric key encryption unit puts plaintext M and a symmetric key K both of which are read from the storage into a symmetric key encryption function to calculate ciphertext $C_1$ and outputs the ciphertext $C_1$.

(ENC-2) A function operation unit puts a value containing a value corresponding to the symmetric key K and a value corresponding to the ciphertext $C_1$ into the collision-resistant function H to calculate the function value of the function H and outputs the function value of the function H.

(ENC-3) A vector operation unit calculates the ciphertext $$C_2 = r \cdot (\Sigma_{\mu=1}^{n} v_\mu \cdot b_\mu) + \rho \cdot b_{n+1} \in G_1^{n+1} \tag{53}$$

by using the element r of the finite field $F_q$, corresponding to the function value of the function H, the element $\rho$ of the finite field $F_q$, corresponding to the symmetric key K, the elements $v_\mu$ ($\mu=1, \ldots, n, n \geq 1$) of the n-dimensional vector $\vec{v}$ ($v_1, \ldots, v_n$) composed of the elements of the finite field $F_q$, and the n+1 dimensional basis vectors $b_1 \in G_1^{n+1}$, and outputs the ciphertext $C_2$.

Decryption Processing

A decryption apparatus for performing decryption processing executes the following processing.

(DEC-1) A value containing the ciphertext $C_1$ and the ciphertext $C_2 \in G_1^{n+1}$ is input to an input unit.

(DEC-2) A bilinear function operation unit puts the ciphertext $C_2 \in G_1^{n+1}$ and key information $$D_1^* = \alpha \cdot (\Sigma_{\mu=1}^{n} w_\mu \cdot b_\mu^*) + b_{n+1}^* \tag{54}$$

into the bilinear function e to calculate the function value $$S^\sim = e(C_2, D_1^*) \in G_T \tag{55}$$

and outputs the function value $S^\sim$.

(DEC-3) A function operation unit puts the value corresponding to the function value $S^\sim$ and the ciphertext $C_1$ into the collision-resistant function H to calculate the function value of the function H and outputs the function value of the function H. If the key information $D_1^*$ is correct, the value corresponding to the function value $S^\sim$ is equal to the value corresponding to the symmetric key K, which is input to the collision-resistant function H in (ENC-2) of the encryption processing.

(DEC-4) A decision unit decides whether the ciphertext $C_2$, the element $r^\sim$ of the finite field $F_q$, corresponding to the function value of the function H, the element $\rho^\sim$ of the finite field $F_q$, the elements $v_\mu$ of the n-dimensional vector $\vec{v}$, and the basis vectors $b_i \in G_1^{n+1}$ ($i=1, \ldots, n+1$) satisfy the following relation, and outputs the decision.

$$C_2 = r^\sim \cdot (\Sigma_{\mu=1}^{n} v_\mu \cdot b_\mu) + \rho^\sim \cdot b_{n+1} \in G_1^{n+1} \tag{56}$$

(DEC-5) If Expression (56) is satisfied, the decrypted result of the ciphertext $C_1$ is output. If Expression (56) is not satisfied, an error message ($\perp$) is output.

Security Against CCA in Improved Method of Inner Product Predicate Encryption

A case in which the assumed strategy described above is applied to the improved scheme will be described.

[1] The attacker is given the public parameter PK.

[2] The attacker passes the vector $\vec{v}$ and the two pieces of plaintext $M_0$ and $M_1$ to the encryption oracle having the public parameter PK. The encryption oracle selects bit $\in \{0, 1\}$ at random, encrypts either piece of plaintext $M_{bit}$ with a symmetric key $K = g_T^{v^2}$, and generates the ciphertext $$C_1 = K(+)M_{bit} \tag{57}$$

(ENC-1). The encryption oracle further puts the value containing the value corresponding to the symmetric key K and the value corresponding to the ciphertext $C_1$ into the collision-resistant function H to calculate the function value of the function H (ENC-2). Then, the encryption oracle generates the ciphertext $$C_2 = r \cdot (\Sigma_{\mu=1}^{n} v_\mu \cdot b_\mu) + \rho b_{n+1} \in G_1^{n+1} \tag{58}$$

of the symmetric key $K = g_T^{v^2}$ by using the element r of the finite field $F_q$, corresponding to the function value of the function H, the element $\rho$ of the finite field $F_q$, corresponding to the symmetric key K, the elements $v_\mu$ ($\mu=1, \ldots, n, n \geq 1$) of the n-dimensional vector $\vec{v} = (v_1, \ldots, v_n)$ composed of elements of the finite field $F_q$, and the n+1 dimensional basis vectors $b_i \in G_1^{n+1}$ (ENC-3), and gives the ciphertext ($C_1, C_2$) to the attacker.

[3] Since the attacker does not know the symmetric key K, the attacker cannot generate $C_2' = r' \cdot (\Sigma_{\mu=1}^{n} v_\mu \cdot b_\mu) + \rho \cdot b_{n+1} \in G_1^{n+1}$ corresponding to an element r' of the finite field $F_q$, corresponding to the function value obtained by putting the value containing ciphertext $C_1$ (+) $\Delta M$ and the value corresponding to the symmetric key K into the collision-resistant function H. Therefore, the attacker passes the following combination of $C_1$ (+) $\Delta M$ and the ciphertext $C_2$ corresponding to the ciphertext $C_1$ to a decryption oracle.

$$(C_1(+)\Delta M, C_2) \tag{59}$$

The decryption oracle to which the ciphertext of Expression (59) has been input (DEC-1) generates the function value $S^\sim$ of Expression (55) (DEC-2), calculates the function value of the collision-resistant function H by putting the ciphertext $C_1$ (+) $\Delta M$ and the value corresponding to the function value $S^\sim$ into the function H, and outputs the function value of the function H (DEC-3). The decryption oracle judges whether the second ciphertext $C_2$, an element $r^\sim_{\Delta M}$ of the finite field $F_q$, corresponding to the function value of the function H, the element $\rho^\sim$ of the finite field $F_q$, the elements $v_\mu$ of the n-dimensional vector $v^\sim$, and the basis vectors $b_i \in G_1^{n+1}$ ($i=1, \ldots, n+1$) satisfy the following relation.

$$C_2 = r^\sim_{\Delta M} (\Sigma_{\mu=1}^{n} v_\mu \cdot b_\mu) + \rho^\sim \cdot b_{n+1} \in G_1^{n+1} \tag{60}$$

(DEC-4). Here, since $r^\sim_{\Delta M} \neq r^\sim$, Expression (60) is not satisfied, and the decryption oracle outputs the error message ($\perp$).

[4] Since the attacker cannot obtain the decrypted result of $C_1$ (+) $\Delta M$, the attacker is not able to output bit'=0 when the decrypted result is $M_0$ (+) $\Delta M$ or to output bit'=1 when the decrypted result is $M_1$ (+) $\Delta M$. Accordingly, the assumed strategy of the attacker will end in failure.

First Embodiment

A first embodiment of the improved scheme will be described below.

Overview

An overview of the first embodiment will be given next.

Encryption Processing

An encryption apparatus for performing encryption processing executes the following processing.

(ENC-11) A symmetric key encryption unit puts the plaintext M and the symmetric key K both of which are read from a storage into the symmetric key encryption function to calculate the ciphertext $C_1$ and outputs the ciphertext $C_1$.

(ENC-21) A function operation unit puts the symmetric key K and the ciphertext $C_1$ into the collision-resistant function H to calculate the elements r and ρ of the finite field $F_q$ and outputs the elements r and ρ. The symmetric key K in (ENC-21) corresponds to the value corresponding to the symmetric key K mentioned earlier in (ENC-2).

(ENC-31) A group operation unit calculates the function value $S = g_T^{\tau \cdot \rho} \in G_T$ by using the element ρ and outputs the function value S.

(ENC-32) An exclusive-OR operation unit calculates the ciphertext $C_3$ that is the exclusive OR value of the symmetric key K and the function value R(S) which is the binary sequence obtained by putting the function value S into the injective function R, and outputs the ciphertext $C_3$.

(ENC-33) A vector operation unit calculates $C_2 = r \cdot (\Sigma_{\mu=1}^{n} v_\mu \cdot b_\mu) + \rho \cdot b_{n+1} \in G_1^{n+1}$ by using the elements $v_\mu$ (μ = 1, ..., n) of the n-dimensional vector $\vec{v}$ composed of the elements of the finite field $F_q$ and the elements r and ρ, and outputs the ciphertext $C_2$.

Decryption Processing

A decryption apparatus for performing decryption processing executes the following processing.

(DEC-11) A value containing the ciphertext $C_1$, the ciphertext $C_2$, and the ciphertext $C_3$ is input to an input unit.

(DEC-21) A bilinear function operation unit puts the ciphertext $C_2 \in G_1^{n+1}$ and the key information $D_1^* = \alpha \cdot (\Sigma_{\mu=1}^{n} w_\mu \cdot b_\mu^*) + b_{n+1}^*$ into the bilinear function e to calculate the function value $S^{\sim} = e(C_2, D_1^*) \in G_T$ and outputs the function value $S^{\sim}$.

If the inner product satisfies $\vec{w} \cdot \vec{v} = 0$, the characteristics of Expressions (3) and (26) lead to the following expression.

$$S^{\sim} = e(C_2, D_1^*) = e\left(r \cdot \left(\sum_{\mu=1}^{n} v_\mu \cdot b_\mu\right) + \rho \cdot b_{n+1}, \alpha \cdot \left(\sum_{\mu=1}^{n} w_\mu \cdot b_\mu^*\right) + b_{n+1}^*\right) \quad (61)$$
$$= e(r \cdot v_1 \cdot b_1, \alpha \cdot w_1 \cdot b_1^*) \cdot \ldots \cdot e(r \cdot v_n \cdot b_n, \alpha \cdot w_n \cdot b_n^*) \times$$
$$\quad e(\rho \cdot b_{n+1}, b_{n+1}^*)$$
$$= e(b_1, b_1^*)^{r \cdot v_1 \cdot \alpha \cdot w_1} \cdot \ldots \cdot e(b_n, b_n^*)^{r \cdot v_n \cdot \alpha \cdot w_n} \cdot e(b_{n+1}, b_{n+1}^*)^\rho$$
$$= g_T^{\tau \cdot r \cdot v_1 \cdot \alpha \cdot w_1} \cdot \ldots \cdot g_T^{\tau \cdot r \cdot v_n \cdot \alpha \cdot w_n} \cdot g_T^{\tau \cdot \rho}$$
$$= g_T^{\tau \cdot r \cdot \alpha \cdot \vec{v} \cdot \vec{w}} \cdot g_T^{\tau \cdot \rho}$$
$$= g_T^{\tau \cdot \rho}$$
$$= S$$

(DEC-31) An exclusive-OR operation unit calculates the exclusive OR value $K^{\sim}$ of the ciphertext $C_3$ and the function value $R(S^{\sim})$ which is the binary sequence obtained by putting the function value $S^{\sim}$ into the injective function R, and outputs the exclusive OR value $K^{\sim}$. If Expression (61) is satisfied, the following relation is satisfied.

$$K^{\sim} = R(S^{\sim})(+)C_3 \quad (62)$$
$$= R(S)(+)C_3$$
$$= R(S)(+)R(S)(+)K$$
$$= K$$

(DEC-32) A function operation unit puts the exclusive OR value $K^{\sim}$ and the ciphertext $C_1$ into the collision-resistant function H to calculate the elements $r^{\sim}$ and $\rho^{\sim}$ of the finite field $F_q$ and outputs the elements $r^{\sim}$ and $\rho^{\sim}$. The elements $r^{\sim}$ and $\rho^{\sim}$ in (DEC-31) correspond to the value containing the element $r^{\sim}$ mentioned earlier in (DEC-3).

(DEC-41) A vector operation unit calculates the function value $C_2^{\sim} = r^{\sim} \cdot (\Sigma_{\mu=1}^{n} v_\mu \cdot b_\mu) + \rho^{\sim} \cdot b_{n+1} \in G_1^{n+1}$ by using the elements $v_\mu$ (μ = 1, ..., n) of the n-dimensional vector $\vec{v}$ and the elements $r^{\sim}$ and $\rho^{\sim}$, and outputs the function value $C_2^{\sim}$.

(DEC-42) A comparison unit judges whether the function value $C_2^{\sim}$ equals the ciphertext $C_2$ and outputs the judgment. This judgment corresponds to the judgment in (DEC-4).

(DEC-51) If the judgment output from the comparison unit indicates that the function value $C_2^{\sim}$ equals the ciphertext $C_2$, a symmetric key decryption unit uses the exclusive OR value $K^{\sim}$ as the symmetric key, puts the exclusive OR value $K^{\sim}$ and the ciphertext $C_1$ into the symmetric key decryption function to calculate the decrypted value $M^{\sim}$, and outputs the decrypted value $M^{\sim}$. If the judgment output from the comparison unit indicates that the function value $C_2^{\sim}$ does not equal the ciphertext $C_2$, an error message (⊥) is output.

Security Against CCA in First Embodiment

A case in which the assumed strategy described above is applied to the scheme of the first embodiment will be described. In this example, $\tau = 1_F$, and the ciphertext obtained by symmetric key encryption of the plaintext M with the symmetric key K is $C_1 = K (+) M$.

[1] The attacker is given the public parameter PK.

[2] The attacker passes the vector $\vec{v}$ and two pieces of plaintext $M_0$ and $M_1$ to the encryption oracle having the public parameter PK. The encryption oracle selects bit ∈ {0, 1} at random, encrypts either piece of plaintext $M_{bit}$ with the symmetric key $K = g_T^{\upsilon 2}$, and generates ciphertext $$C_1 = K(+)M_{bit} \quad (63)$$

(ENC-11). The encryption oracle further puts the symmetric key K and the ciphertext $C_1$ into the collision-resistant function H to calculate the elements r and ρ of the finite field $F_q$ (ENC-21), calculates the function value $S = g_T^{\tau \cdot \rho} \in G_T$ (ENC-31), calculates the ciphertext $C_3$ by obtaining an exclusive OR of the function value R(S) and the symmetric key K (ENC-32), calculates $C_2 = r \cdot (\Sigma_{\mu=1}^{n} v_\mu \cdot b_\mu) + \rho \cdot b_{n+1} \in G_1^{n+1}$ (ENC-33), and gives the ciphertext ($C_1$, $C_2$, $C_3$) to the attacker.

[3] Since the attacker does not know the symmetric key K, the attacker cannot generate $C_2' = r' \cdot (\Sigma_{\mu=1}^{n} v_\mu \cdot b_\mu) + \rho' \cdot b_{n+1} \in G_1^{n+1}$ corresponding to the elements r' and ρ' of the finite field $F_q$, obtained by putting the symmetric key K and ciphertext $C_1$ (+) ΔM into the collision-resistant function H. Therefore, the attacker passes the following combination of $C_1$ (+) ΔM, the ciphertext $C_2$ corresponding to the ciphertext $C_1$, and the ciphertext $C_3$ to a decryption oracle.

$$(C_1(+)\Delta M, C_2, C_3) \quad (64)$$

The decryption oracle to which the ciphertext of Expression (64) has been input (DEC-11) generates the function value $S^{\sim} = e(C_2, D_1^*) \in G_T$ (DEC-21), calculates the exclusive OR value $K^{\sim}$ of the ciphertext $C_3$ and the function value $R(S^{\sim})$ which is the binary sequence obtained by putting the function value $S^{\sim}$ into the injective function R, and calculates the elements $r^{\sim}_{\Delta M}$ and $\rho^{\sim}_{\Delta M}$ of the finite field $F_q$ by putting the exclusive OR value $K^{\sim}$ and ciphertext $C_1$ (+) ΔM into the collision-resistant function H (DEC-32). The decryption oracle calculates the following function value $C_2^{\sim}$ by using the elements $v_\mu$ of $\vec{v}$, the element $r^{\sim}_{\Delta M}$, the basis vectors $b_i \in G_1^{n+1}$ (i = 1, ..., n+1), and the element $\rho^{\sim}_{\Delta M}$ (DEC-41).

$$C_2^{\sim} = r^{\sim}_{\Delta M} \cdot (\Sigma_{\mu=1}^{n} v_\mu \cdot b_\mu) + \rho^{\sim}_{\Delta M} \cdot b_{n+1} \in G_1^{n+1} \quad (65)$$

Then, the decryption oracle judges whether the function value $C_2^\sim$ equals the ciphertext $C_2^\sim$. Here, since $r^\sim_{\Delta M} \neq r^\sim$ and $\rho^\sim_{\Delta M} \neq \rho^\sim$, Expression (65) does not satisfy this relation, and the decryption oracle outputs an error message ($\bot$).

[4] Since the attacker cannot obtain the decrypted result of $C_1$ (+) $\Delta M$, the attacker is not able to output bit'=0 when the decrypted result is $M_0$ (+) $\Delta M$ or to output bit'=1 when the result is $M_1$ (+) $\Delta M$. Accordingly, the strategy of the attacker will end in failure.

Details

The first embodiment will be described next in detail. While $\tau=1_F$ is satisfied in this example, this will not limit the present invention, and $\tau$ may be an element of the finite field $F_q$ other than $0_F$ or $1_F$.

Overall Structure

FIG. 1 is a view illustrating the structure of a cryptographic system 1 of the first embodiment.

As shown in FIG. 1, the cryptographic system 1 of this embodiment includes an encryption apparatus 110, a decryption apparatus 120, and a key generation apparatus 130, which are connected through a network 140 so that they can communicate with one another.

Encryption Apparatus

Figure 2:
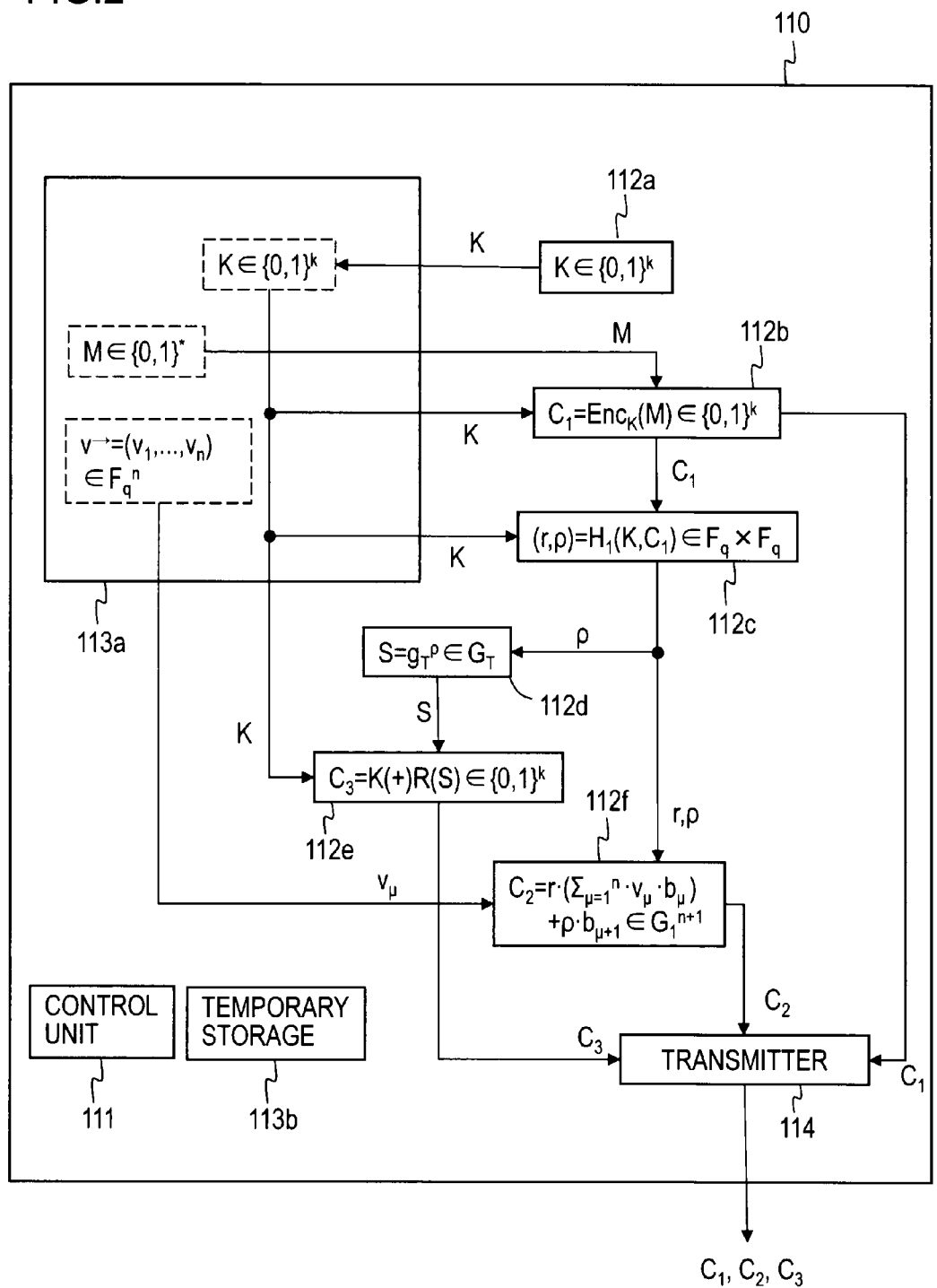
FIG. 2 is a view illustrating the structure of an encryption apparatus in FIG. 1.

FIG. 2 is a view illustrating the structure of the encryption apparatus 110 in FIG. 1. Arrows in FIG. 2 indicate the flow of data, but the arrows, indicating data input to and output from a control unit 111 and a temporary storage 113b, are omitted.

As shown in FIG. 2, the encryption apparatus 110 of this embodiment includes the control unit 111, a random number generator 112a, a symmetric key encryption unit 112b, a function operation unit 112c, a group operation unit 112d, an exclusive-OR operation unit 112e, a vector operation unit 112f, a storage 113a, the temporary storage 113b, and a transmitter 114.

The encryption apparatus 110 is, for example, a special apparatus that includes a special program and a known or specialized computer provided with a central processing unit (CPU), a random access memory (RAM), a read-only memory (ROM), or the like. The control unit 111, the random number generator 112a, the symmetric key encryption unit 112b, the function operation unit 112c, the group operation unit 112d, the exclusive-OR operation unit 112e, and the vector operation unit 112f are processing units implemented by the CPU executing the special program. At least some of the processing units may be a specialized integrated circuit: For example, the random number generator 112a may be a known random number generation integrated circuit. The storage 113a and the temporary storage 113b are, for example, an auxiliary storage such as a RAM, a register, a cache memory, an element in a chip, or a hard disk, or a storage area formed by combining at least some of these devices. The transmitter 114 is a communication device such as a modem or a local area network (LAN) card, for example.

The encryption apparatus 110 executes processing under the control of the control unit 111. Each piece of data output from each processing unit is stored in the temporary storage 113b or the storage 113a, the data stored in the temporary storage 113b or the storage 113a is read, input to a processing unit, and used for processing thereof, when necessary, while these data flow descriptions are simplified below.

Decryption Apparatus

Figure 3:
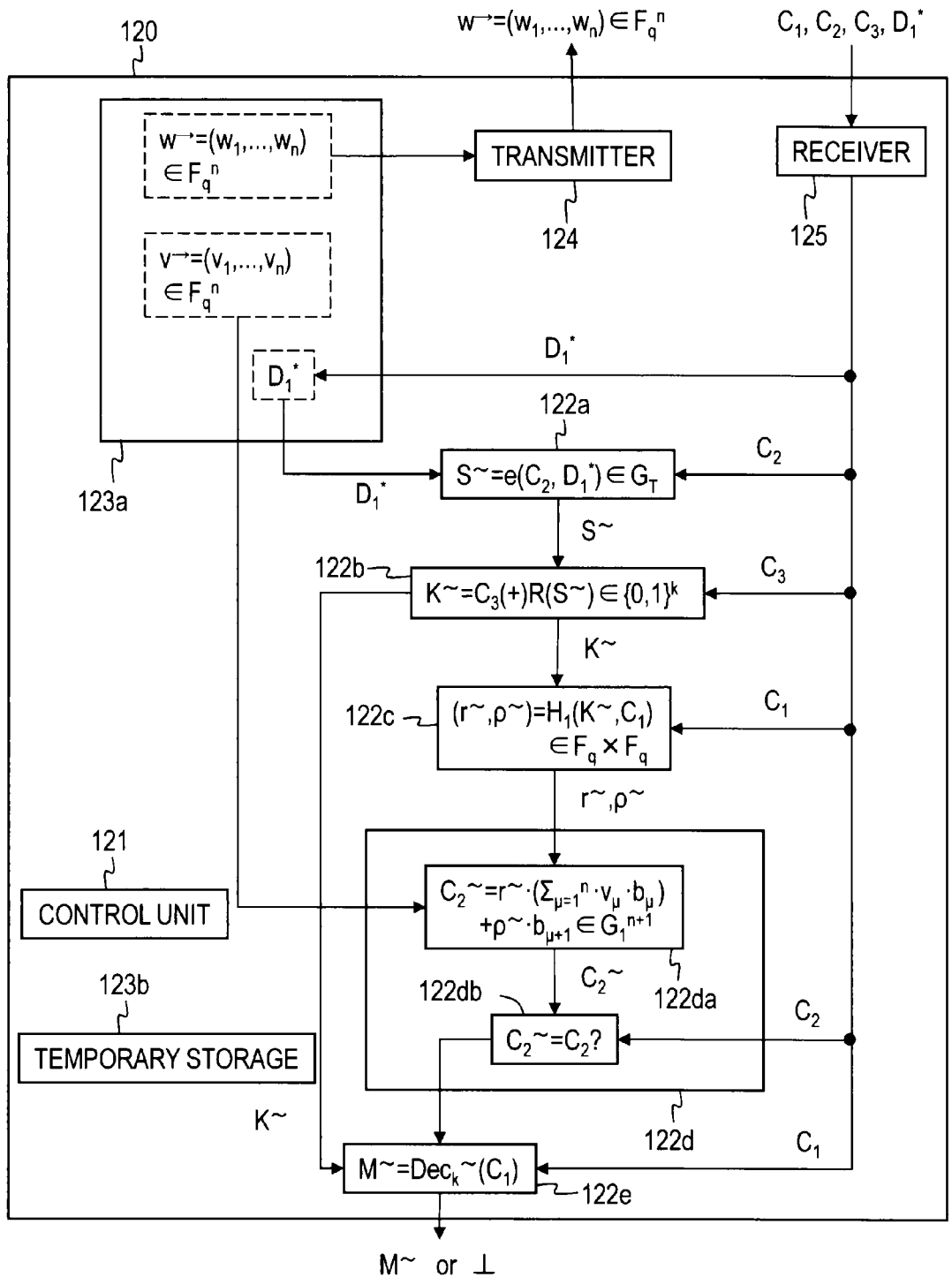
FIG. 3 is a view illustrating the structure of a decryption apparatus in FIG. 1.

FIG. 3 is a view illustrating the structure of the decryption apparatus 120 in FIG. 1. Arrows in FIG. 3 indicate the flow of data, but the arrows, indicating data input to and output from a control unit 121 and a temporary storage 123b, are omitted.

As shown in FIG. 3, the decryption apparatus 120 of this embodiment includes the control unit 121, a bilinear function operation unit 122a, an exclusive-OR operation unit 122b, a function operation unit 122c, a decision unit 122d, a symmetric key decryption unit 122e, a storage 123a, the temporary storage 123b, a transmitter 124, and a receiver 125 (corresponding to the input unit). The decision unit 122d includes a vector operation unit 122da and a comparison unit 122db.

The decryption apparatus 120 is, for example, a special apparatus that includes a special program and a known or specialized computer provided with a CPU, a RAM, a ROM, or the like. The control unit 121, the bilinear function operation unit 122a, the exclusive-OR operation unit 122b, the function operation unit 122c, the decision unit 122d, and the symmetric key decryption unit 122e are processing units implemented by the CPU executing the special program, for example. At least some of the processing units may be a specialized integrated circuit: For example, the bilinear function operation unit 122a may be a known pairing computation integrated circuit. The storage 123a and the temporary storage 123b are, for example, an auxiliary storage such as a RAM, a register, a cache memory, an element in a chip, or a hard disk, or a storage area formed by combining at least some of these devices. The transmitter 124 and the receiver 125 are a communication device such as a modem or a LAN card, for example.

The decryption apparatus 120 executes processing under the control of the control unit 121. Each piece of data output from each processing unit is stored in the temporary storage 123b or the storage 123a, the data stored in the temporary storage 123b or the storage 123a is read, input to a processing unit, and used for processing thereof, when necessary, while these data flow descriptions are simplified below.

Key Generation Apparatus

Figure 4:
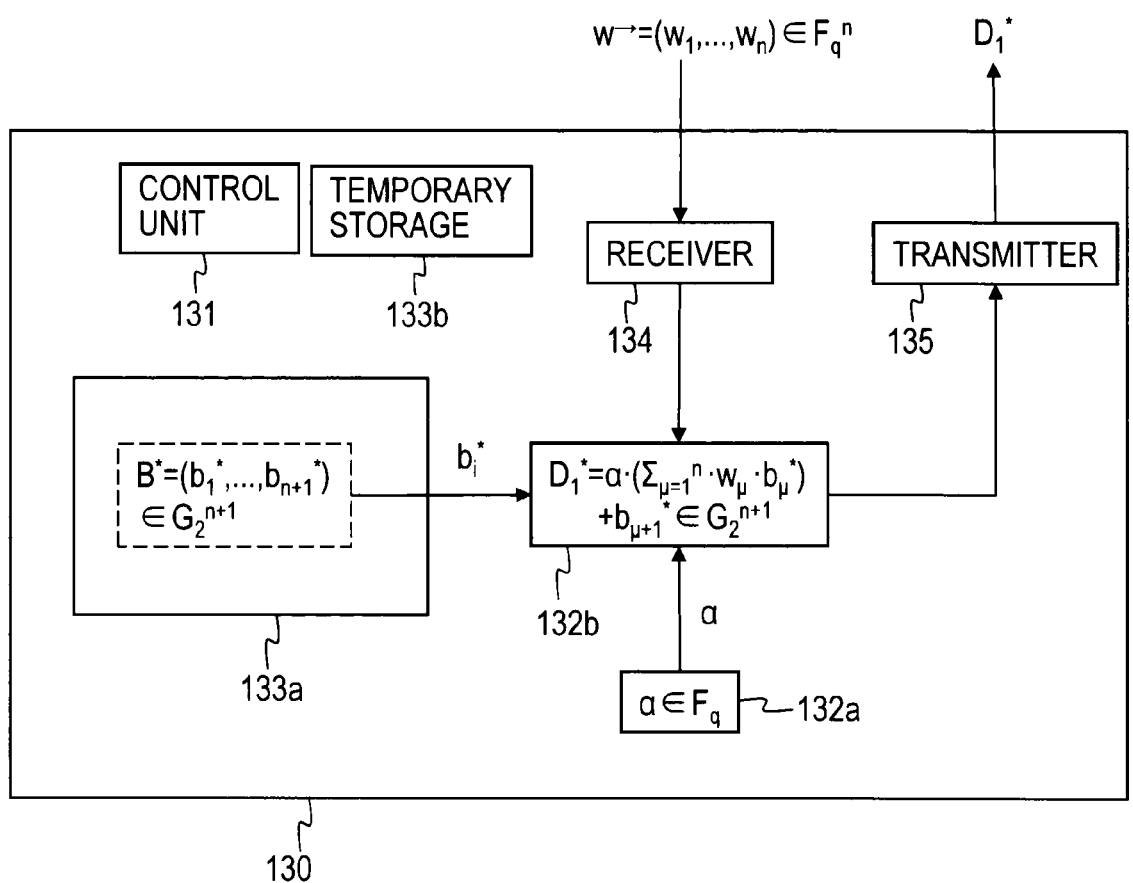
FIG. 4 is a view illustrating the structure of a key generation apparatus in FIG. 1.

FIG. 4 is a view illustrating the structure of the key generation apparatus 130 in FIG. 1. Arrows in FIG. 4 indicate the flow of data, but the arrows, indicating data input to and output from a control unit 131 and a temporary storage 133b, are omitted.

As shown in FIG. 4, the key generation apparatus 130 of this embodiment includes the control unit 131, a random number generator 132a, a vector operation unit 132b, a storage 133a, a temporary storage 133b, a receiver 134, and a transmitter 135.

The key generation apparatus 130 is, for example, a special apparatus that includes a special program and a known or specialized computer provided with a CPU, a RAM, a ROM, or the like. The control unit 131, the random number generator 132a, and the vector operation unit 132b are processing units implemented by the CPU executing the special program, for example. At least some of the processing units may be a specialized integrated circuit: The storage 133a and the temporary storage 133b are, for example, an auxiliary storage such as a RAM, a register, a cache memory, an element in an integrated circuit, or a hard disk, or a storage area formed by combining at least some of these devices. The transmitter 134 and the receiver 135 are a communication device such as a modem or a LAN card, for example.

The key generation apparatus 130 executes processing under the control of the control unit 131. The flow of data will be described just briefly below. Each piece of data output from each processing unit is stored in the temporary storage 133b or the storage 133a, the data stored in the temporary storage 133b or the storage 133a is read, input to a processing unit, and used for processing thereof, when necessary, while these data flow descriptions are simplified below.

Preparatory Settings

Preparatory settings for executing the processing in this embodiment will be described next.

A public parameter PK is specified in the encryption apparatus 110, the decryption apparatus 120, and the key generation apparatus 130. The public parameter PK includes the vector spaces V and V*, the (n+1) row by (n+1) column matrix B having the basis vectors $b_i$ (i=1, ..., n+1) as its elements, the security parameter k, the finite field $F_q$, the elliptic curve E, the cyclic groups $G_1$, $G_2$, and $G_T$, the generators $g_1$, $g_2$, and $g_T$, the bilinear function e, and the integer n greater than or equal to 1. The collision-resistant function $H_1$ shown in Expression (33) and the injective function R shown in Expression (35) are specified in the encryption apparatus 110 and the decryption apparatus 120.

The (n+1) row by (n+1) column matrix B*, which is the master key information MSK, is stored securely in the storage 133a of the key generation apparatus 130. The matrix B* is secret information and is kept secret.

The n-dimensional vector $\vec{v}=(v_1, \ldots, v_n)$ composed of the elements of the finite field $F_q$, shown in Expression (31), is stored in the storage 113a of the encryption apparatus 110, and the n-dimensional vector $\vec{v}=(v_1, \ldots, v_n)$ and the n-dimensional vector $\vec{w}=(w_1, \ldots, w_n)$ composed of the elements of the finite field $F_q$, shown in Expression (30), are stored in the storage 123a of the decryption apparatus 120. These vectors satisfy following relation.

$$\vec{w} \cdot \vec{v} = 0 \quad (66)$$

The predicate information and the attribute information may be $\vec{w}=(w_1, \ldots, w_n)$ and $\vec{v}=(v_1, \ldots, v_n)$, respectively. Alternatively, the predicate information and the attribute information may be $\vec{v}=(v_1, \ldots, v_n)$ and $\vec{w}=(w_1, \ldots, w_n)$, respectively.

The storage 113a of the encryption apparatus 110 stores the plaintext $M \in \{0, 1\}^*$ to be encrypted.

Encryption Processing

Figure 5:
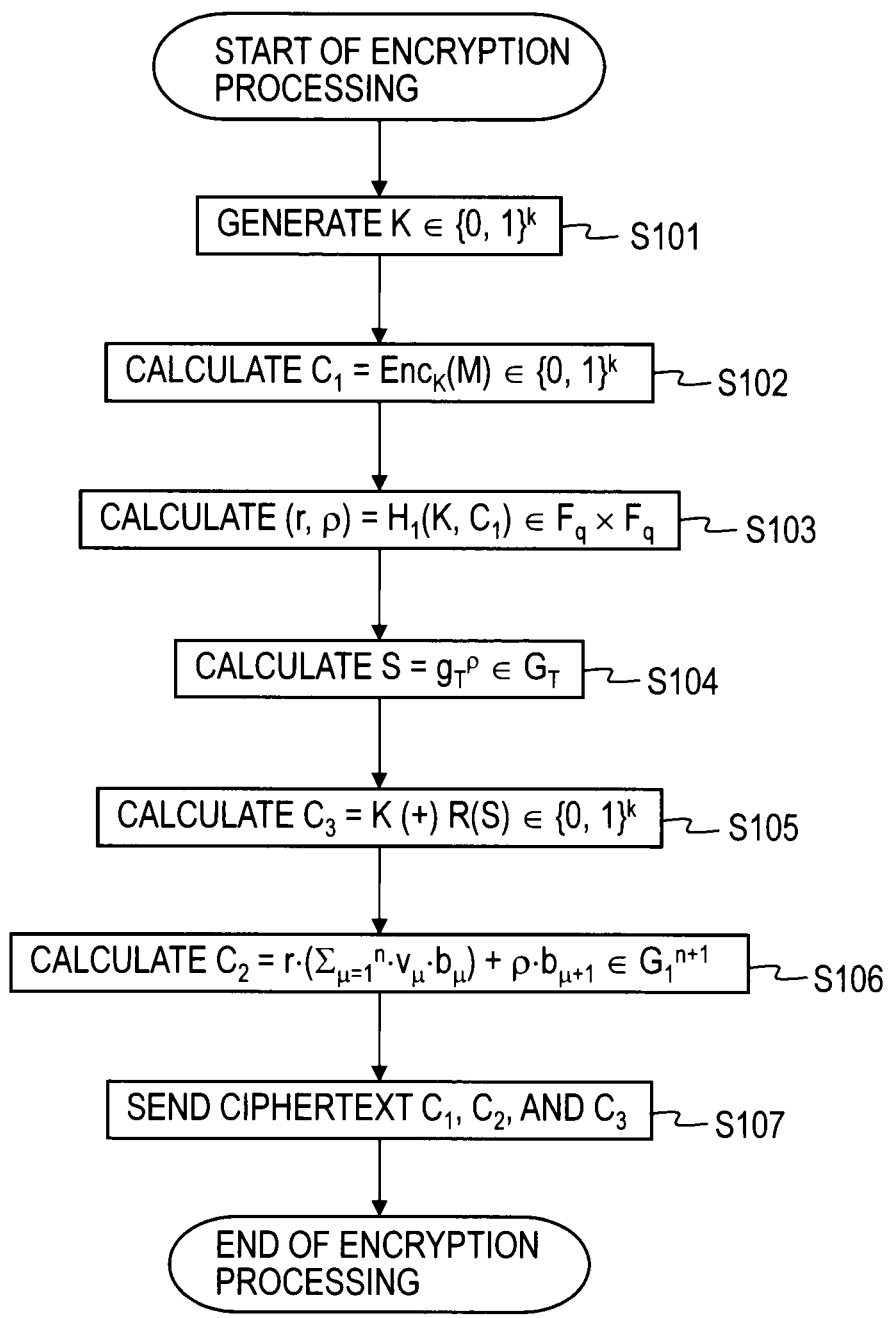
FIG. 5 is a view illustrating encryption processing according to the first embodiment.

FIG. 5 is a view illustrating encryption processing in the first embodiment. The encryption processing in this embodiment will be described next.

The random number generator 112a in the encryption apparatus 110 (FIG. 2) generates the k-bit binary-sequence random number, and that is stored in the storage 113a as the following symmetric key (step S101).

$$K \in \{0,1\}^k \quad (67)$$

The plaintext M and symmetric key K read from the storage are input to the symmetric key encryption unit 112b. The symmetric key encryption unit 112b puts them into the symmetric key encryption function Enc to obtain the following ciphertext $C_1$, and outputs the ciphertext $C_1$ (step S102).

$$C_1 = Enc_k(M) \in \{0,1\}^k \quad (68)$$

The ciphertext $C_1$ and the symmetric key K are input to the function operation unit 112c. The function operation unit 112c puts the symmetric key K and ciphertext $C_1$ into the collision-resistant function $H_1$ to obtain the following elements r and ρ of the finite field $F_q$, and outputs the elements r and ρ (step S103).

$$(r, \rho) = H_1(K, C_1) \in F_q \times F_q \quad (69)$$

The element ρ of the finite field $F_q$ is input to the group operation unit 112d. The group operation unit 112d calculates the following function value S by using the element ρ, and outputs the function value S (step S104).

$$S = g_T^\rho \in G_T \quad (70)$$

The function value S and the symmetric key K are input to the exclusive-OR operation unit 112e. The exclusive-OR operation unit 112e uses the symmetric key K and the function value $$R(S) \in \{0,1\}^k \quad (71)$$

which is the k-bit binary sequence obtained by putting the function value S into the injective function R, to obtain an exclusive-OR value of them as the ciphertext $$C_3 = R(S)(+)K \in \{0,1\}^k \quad (72)$$

and outputs the ciphertext $C_3$ (step S105).

The elements r and ρ of the finite field $F_q$ and the n-dimensional vector $\vec{v}=(v_1, \ldots, v_n)$ are input to the vector operation unit 112f. The vector operation unit 112f calculates ciphertext $$C_2 = r \cdot (\Sigma_{\mu=1}^n v_\mu \cdot b_\mu) + \rho \cdot b_{n+1} \in G_1^{n+1} \quad (73)$$

by using the elements $v_\mu$ (μ=1, ..., n) of the n-dimensional vector $\vec{v}$ and the elements r and ρ, and outputs the ciphertext $C_2$ (step S106).

The ciphertext $C_1$, ciphertext $C_2$, and ciphertext $C_3$ are input to the transmitter 114. The transmitter 114 sends a value containing them through the network 140 to the decryption apparatus 120 (step S107).

Key Information Generation Processing

Key information generation processing is performed especially when the key information $D_1^*$ is not stored in the storage 123a of the decryption apparatus 120. When the key information $D_1^*$ is stored in the storage 123a of the decryption apparatus 120, this processing may be omitted.

Figure 6:
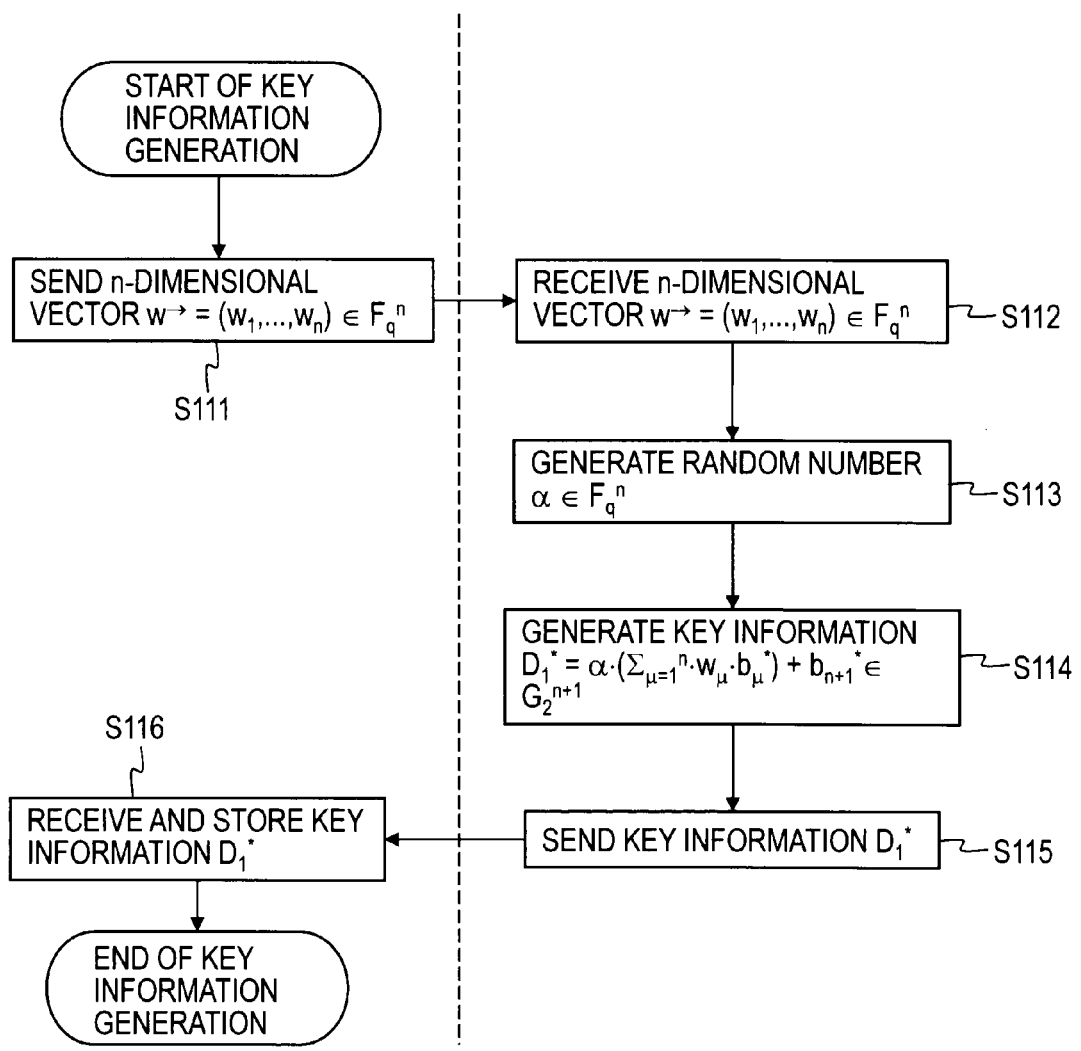
FIG. 6 is a view illustrating key information generation processing in the first embodiment.

FIG. 6 is a view illustrating the key information generation processing in the first embodiment. The key information generation processing in this embodiment will be described next.

The n-dimensional vector $\vec{w}=(w_1, \ldots, w_n)$ stored in the decryption apparatus 120 (FIG. 3) is read and input to the transmitter 124. The transmitter 124 sends the n-dimensional vector $\vec{w}=(w_1, \ldots, w_n)$ through the network 140 to the key generation apparatus 130 (step S111).

The sent n-dimensional vector $\vec{w}=(w_1, \ldots, w_n)$ is received by the receiver 134 of the key generation apparatus 130 (FIG. 4) (step S112). This causes the random number generator 132a of the key generation apparatus 130 to generate a random number α which is an element of the finite field $F_q$ and to output the random number α (step S113).

$$\alpha \in F_q \quad (74)$$

The n-dimensional vector $\vec{w}=(w_1, \ldots, w_n)$, the random number α, and the matrix B* are input to the vector operation unit 132b. By using them, the vector operation unit 132b generates the following key information $D_1^*$, and outputs the key information $D_1^*$ (step S114).

$$D_1^* = \alpha \cdot (\Sigma_{\mu=1}^n w_\mu \cdot b_\mu^*) + b_{n+1}^* \in G_1^{n+1} \quad (75)$$

The key information $D_1^*$ is input to the transmitter 135. The transmitter 135 sends the key information $D_1^*$ through the network 140 to the decryption apparatus 120 (step S115).

The sent key information $D_1^*$ is received by the receiver 125 of the decryption apparatus 120 (FIG. 3) and stored in the storage 123a (step S116).

Decryption Processing

Figure 7:
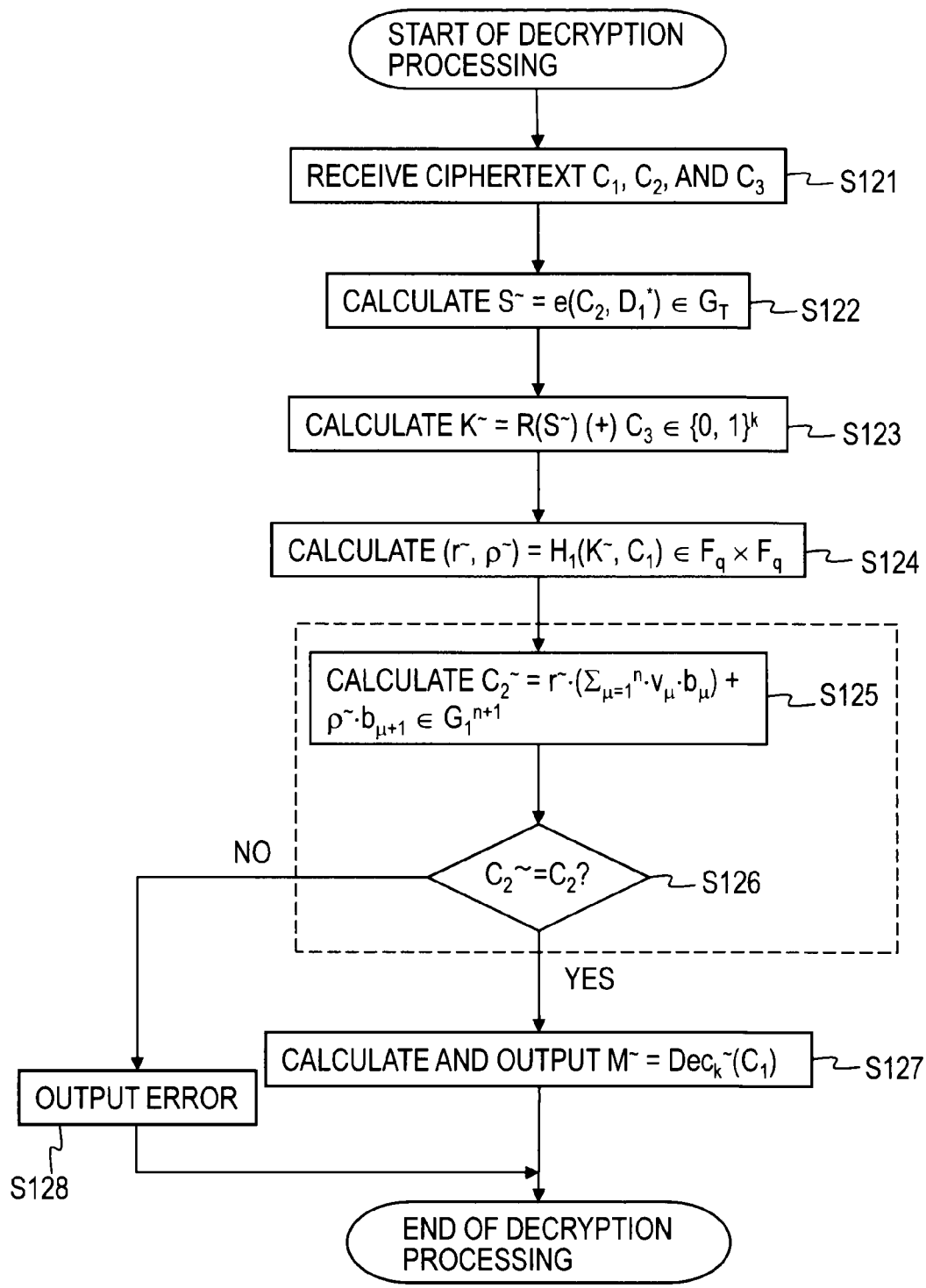
FIG. 7 is a view illustrating decryption processing according to the first embodiment.

FIG. 7 is a view illustrating decryption processing in the first embodiment. The decryption processing in this embodiment will be described next.

The receiver 125 of the decryption apparatus 120 (FIG. 3) receives the value containing the ciphertext $C_1$, the ciphertext $C_2 \in G_1^{n+1}$, and the ciphertext $C_3$ (step S121).

The ciphertext $C_2 \in G_1^{n+1}$ and the key information $D_1^*$ are input to the bilinear function operation unit 122a. The bilinear function operation unit 122a puts the ciphertext $C_2 \in G_1^{n+1}$ and the key information $D_1^*$ into the bilinear function e to calculate the following function value $S^\sim$, and outputs the function value $S^\sim$ (step S122).

$$S^\sim = e(C_2, D_1^*) \in G_T \quad (76)$$

The function value $S^\sim$ and the ciphertext $C_3$ are input to the exclusive-OR operation unit 122b. The exclusive-OR operation unit 122b calculates the following exclusive OR value $K^\sim$ of the ciphertext $C_3$ and the function value $R(S^\sim)$ which is the binary sequence obtained by putting the function value $S^\sim$ into the injective function R, and outputs the exclusive OR value $K^\sim$ (step S123).

$$K^\sim = R(S^\sim)(+)C_3 \quad (77)$$

The exclusive OR value $K^\sim$ and the ciphertext $C_1$ are input to the function operation unit 122c. The function operation unit 122c puts the exclusive OR value $K^\sim$ and the ciphertext $C_1$ into the collision-resistant function $H_1$, calculates the following elements $r^\sim$ and $\rho^\sim$, and outputs the elements $r^\sim$ and $\rho^\sim$ (step S124).

$$(r^\sim, \rho^\sim) = H_1(K^\sim, C_1) \in F_q \times F_q \quad (78)$$

The elements $v_\mu$ ($\mu=1, \ldots, n$) of the n-dimensional vector $\vec{v}$ and the elements $r^\sim$ and $\rho^\sim$ are input to the vector operation unit 122da of the decision unit 122d. By using them, the vector operation unit 122da calculates the following function value $C_2^\sim$, and outputs the function value $C_2^\sim$ (step S125).

$$C_2^\sim = r^\sim \cdot (\Sigma_{\mu=1}^n v_\mu \cdot b_\mu) + \rho^\sim \cdot b_{n+1} \in G_1^{n+1} \quad (79)$$

The function value $C_2^\sim$ and the ciphertext $C_2$ are input to the comparison unit 122 db of the decision unit 122d. The comparison unit 122 db judges whether the function value $C_2^\sim$ equals the ciphertext $C_2$ and outputs the judgment (step S126).

If the judgment output from the comparison unit 122 db indicates that the function value $C_2^\sim$ equals the ciphertext $C_2$, the exclusive OR value $K^\sim$ and the ciphertext $C_1$ are input to the symmetric key decryption unit 122e, and the symmetric key decryption unit 122e puts the exclusive OR value $K^\sim$ and the ciphertext $C_1$ into the symmetric key decryption function to obtain the following decrypted value $M^\sim$, and outputs the decrypted value $M^\sim$ (step S127).

$$M^\sim = Dec_{K^\sim}(C_1) \quad (80)$$

If the judgment output from the comparison unit 122 db indicates that the function value $C_2^\sim$ differs from the ciphertext $C_2$, the symmetric key decryption unit 122e outputs an error message ($\perp$) (step S128).

Second Embodiment

A second embodiment of the improved scheme described above will be described next.

Overview

An overview of the second embodiment will be given first.

Encryption Processing

An encryption apparatus for performing encryption processing executes the following processing.

(ENC-111) A selection unit selects an element $\rho$ of the finite field $F_q$ and outputs the element $\rho$.

(ENC-112) A group operation unit calculates the function value $S = g_T^{\tau \cdot \rho} \in G_T$ by using the element $\rho$ and outputs the function value S.

(ENC-113) A symmetric key encryption unit uses, as a symmetric key K, the function value R(S) obtained by putting the function value S into the injective function R, puts the symmetric key K and plaintext M into the symmetric key encryption function to obtain the ciphertext $C_1$, and outputs the ciphertext $C_1$.

(ENC-211) A function operation unit puts the function value S and the ciphertext $C_1$ into the collision-resistant function H to obtain the element r of the finite field $F_q$ and outputs the element r.

(ENC-311) A vector operation unit calculates the ciphertext $C_2 = r \cdot (\Sigma_{\mu=1}^n v_\mu \cdot b_\mu) + \rho \cdot b_{n+1} \in G_1^{n+1}$ by using the elements r and $\rho$ and the elements $v_\mu$ ($\mu=1, \ldots, n$) of the n-dimensional vector $\vec{v}$ composed of the elements of the finite field $F_q$, and outputs the ciphertext $C_2$.

Decryption Processing

In a decryption apparatus for performing decryption processing, the following processing is executed.

(DEC-101) A value containing the ciphertext $C_1$ and the ciphertext $C_2 \in G_1^{n+1}$ is input to an input unit.

(DEC-201) A bilinear function operation unit puts the ciphertext $C_2 \in G_1^{n+1}$ and the key information $D_1^* = \alpha \cdot (\Sigma_{\mu=1}^n w_\mu \cdot b_\mu^*) + b_{n+1}^*$ into the bilinear function e to obtain the function value $S^\sim = e(C_2, D_1^*) \in G_T$ and outputs the function value $S^\sim$. If the inner product $\vec{w} \cdot \vec{v} = 0$, $S^\sim = S$ is satisfied because of the characteristics of Expressions (3) and (26).

(DEC-301) A function operation unit puts the function value $S^\sim$ and the ciphertext $C_1$ into the collision-resistant function H to calculate the element $r^\sim$ of the finite field $F_q$ and outputs the element $r^\sim$. If $S^\sim = S$ is satisfied and if the ciphertext $C_1$ has been generated authentically, $r^\sim = r$ is satisfied.

(DEC-401) A vector operation unit calculates the function value $\lambda = C_2 - r^\sim \cdot (\Sigma_{\mu=1}^n v_\mu \cdot b_\mu) \in G_1^{n+1}$ by using the ciphertext $C_2$, the element $r^\sim$, and the elements $v_\mu$ ($\mu=1, \ldots, n$) of the n-dimensional vector $\vec{v}$, and outputs the function value $\lambda$. If $r^\sim = r$ is satisfied, $\lambda = \rho \cdot b_{n+1} \in G_1^{n+1}$ is satisfied.

(DEC-402) The bilinear function operation unit calculates the function value $e(\lambda, D_2^*)$ by putting the function value $\lambda$ and the auxiliary key information $D_2^* = \Sigma_{\mu=1}^n \beta_\mu \cdot b_\mu^*$ into the bilinear function e, and outputs the function value $e(\lambda, D_2^*)$. If $\lambda = \rho \cdot b_{n+1} \in G_1^{n+1}$ is satisfied, $e(\lambda, D_2^*) = 1 \in G_T$ is satisfied because of the characteristic of Expression (3).

(DEC-403) A comparison unit judges whether the function value $e(\lambda, D_2^*)$ satisfies $e(\lambda, D_2^*) = 1 \in G_T$ and outputs the judgment. In this embodiment, whether Expression (56) is satisfied is determined by judging whether the function value $e(\lambda, D_2^*)$ satisfies $e(\lambda, D_2^*) = 1 \in G_T$. This judgment corresponds to the judgment in (DEC-4).

(DEC-501) If the judgment output from the comparison unit indicates that $e(\lambda, D_2^*) = 1 \in G_T$ is satisfied, a symmetric key decryption unit uses, as the symmetric key $K^\sim$, the function value R(S) obtained by putting the function value $S^\sim$ into the injective function R, puts the symmetric key $K^\sim$ and the first ciphertext $C_1$ into the symmetric key decryption function to obtain the decrypted value $M^\sim$, and outputs the decrypted value $M^\sim$. If the judgment output from the comparison unit indicates that $e(\lambda, D_2^*) = 1 \in G_T$ is not satisfied, an error message ($\perp$) is output.

Security Against CCA in Second Embodiment

A case in which the assumed strategy described above is applied to the scheme of the second embodiment will be described. In this example, $\tau = 1_F$, and the ciphertext obtained by symmetric key encryption of the plaintext M with the symmetric key K is $C_1 = K (+) M$.

[1] An attacker is given the public parameter PK.

[2] The attacker passes the vector $\vec{v}$ and two pieces of plaintext $M_0$ and $M_1$ to the encryption oracle having the public parameter PK. The encryption oracle selects an element $\rho$ of the finite field $F_q$ (ENC-111), calculates the function value $S=g_T^{\tau \cdot \rho} \in G_T$ (ENC-112), uses a function value R(S) as the symmetric key K (ENC-113), and generates the following ciphertext (ENC-113).

$$C_1 = K(+)M_{bit} \tag{81}$$

The encryption oracle further puts the function value S and the ciphertext $C_1$ into the collision-resistant function H to obtain the element r of the finite field $F_q$ (ENC-211). Then, the encryption oracle generates the ciphertext $C_2 = r \cdot (\Sigma_{\mu=1}^{n} v_\mu \cdot b_\mu) + \rho \cdot b_{n+1} \in G_1^{n+1}$ by using the elements r and ρ and the elements $v_\mu$ (μ=1, ..., n) of the n-dimensional vector $\vec{v}$ composed of the elements of the finite field $F_q$ (ENC-311) and gives the two pieces of ciphertext ($C_1$, $C_2$) to the attacker.

[3] Since the attacker does not know the symmetric key K=R(S) and/or the function value S (value corresponding to the symmetric key K), the attacker cannot generate $C_2' = r' \cdot (\Sigma_{\mu=1}^{n} v_\mu \cdot b_\mu) + \rho \cdot b_{n+1} \in G_1^{n+1}$ corresponding to the element r' of the finite field $F_q$, obtained by putting the function value S and the ciphertext $C_1$ (+) ΔM into the collision-resistant function H. Therefore, the attacker passes the following combination of $C_1$ (+) ΔM and ciphertext $C_2$ corresponding to the ciphertext $C_1$, to a decryption oracle.

$$(C_1(+)\Delta M, C_2) \tag{82}$$

The decryption oracle to which the ciphertext of Expression (82) has been input (DEC-101) calculates the function value $S^\sim = e(C_2, D_1^*) \in G_T$ (DEC-201), calculates the element $r^\sim_{\Delta M}$ of the finite field $F_q$ by putting the function value $S^\sim$ and the ciphertext $C_1$ (+) ΔM into the collision-resistant function H (DEC-301), and obtains the function value $\lambda_{\Delta M} = C_2 - r^\sim_{\Delta M} \cdot (\Sigma_{\mu=1}^{n} v_\mu \cdot b_\mu) \in G_1^{n+1}$ (DEC-401). Because $r^\sim_{\Delta M} \neq r$ is satisfied, $\lambda_{\Delta M} = (r - r^\sim_{\Delta M}) \cdot (\Sigma_{\mu=1}^{n} v_\mu \cdot b_\mu) + \rho \cdot b_{n+1} \neq \rho \cdot b_{n+1}$ is satisfied. The decryption oracle calculates a function value $e(\lambda_{\Delta M}, D2^*)$ (DEC-402) and judges whether a function value $e(\lambda, D_2^*)$ satisfies $e(\lambda, D_2^*) = 1 \in G_T$ (DEC-403). Here, since $\lambda_{\Delta M} \neq \rho \cdot b_{n+1}$ is satisfied, $e(\lambda, D_2^*) = 1 \in G_T$ is not satisfied (DEC-403). Therefore, the decryption oracle outputs an error message (⊥).

[4] Since the attacker cannot obtain the decrypted result of $C_1$ (+) ΔM, the attacker is not able to output bit'=0 when the decrypted result is $M_0$ (+) ΔM or to output bit'=1 when the decrypted result is $M_1$ (+) ΔM. Accordingly, the strategy of the attacker will end in failure.

Details

The second embodiment will be described next in detail. While $\tau = 1_F$ is satisfied in this example, this will not limit the present invention, and τ may be an element of the finite field $F_q$ other than $0_F$ or $1_F$. Each component of the second embodiment identical to that of the first embodiment will be described by using the same reference numeral as used in the first embodiment.

Overall Structure

Figure 8:
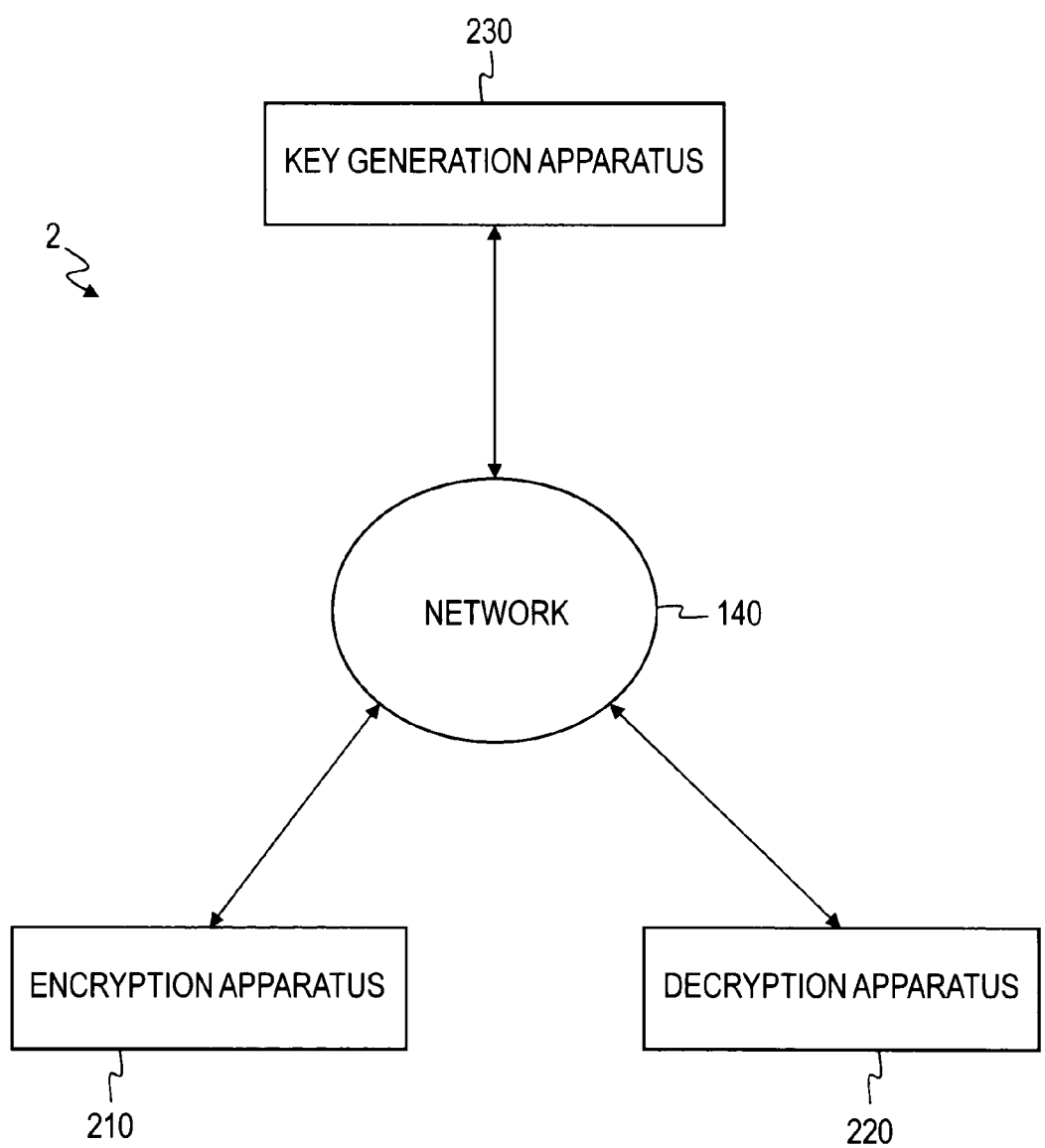
FIG. 8 is a view illustrating the structure of a cryptographic system according to a second embodiment.

FIG. 8 is a view illustrating the structure of a cryptographic system of the second embodiment.

As shown in FIG. 8, the cryptographic system 2 of this embodiment includes an encryption apparatus 210, a decryption apparatus 220, and a key generation apparatus 230, which are connected through a network 140 so that they can communicate with one another.

Encryption Apparatus

Figure 9:
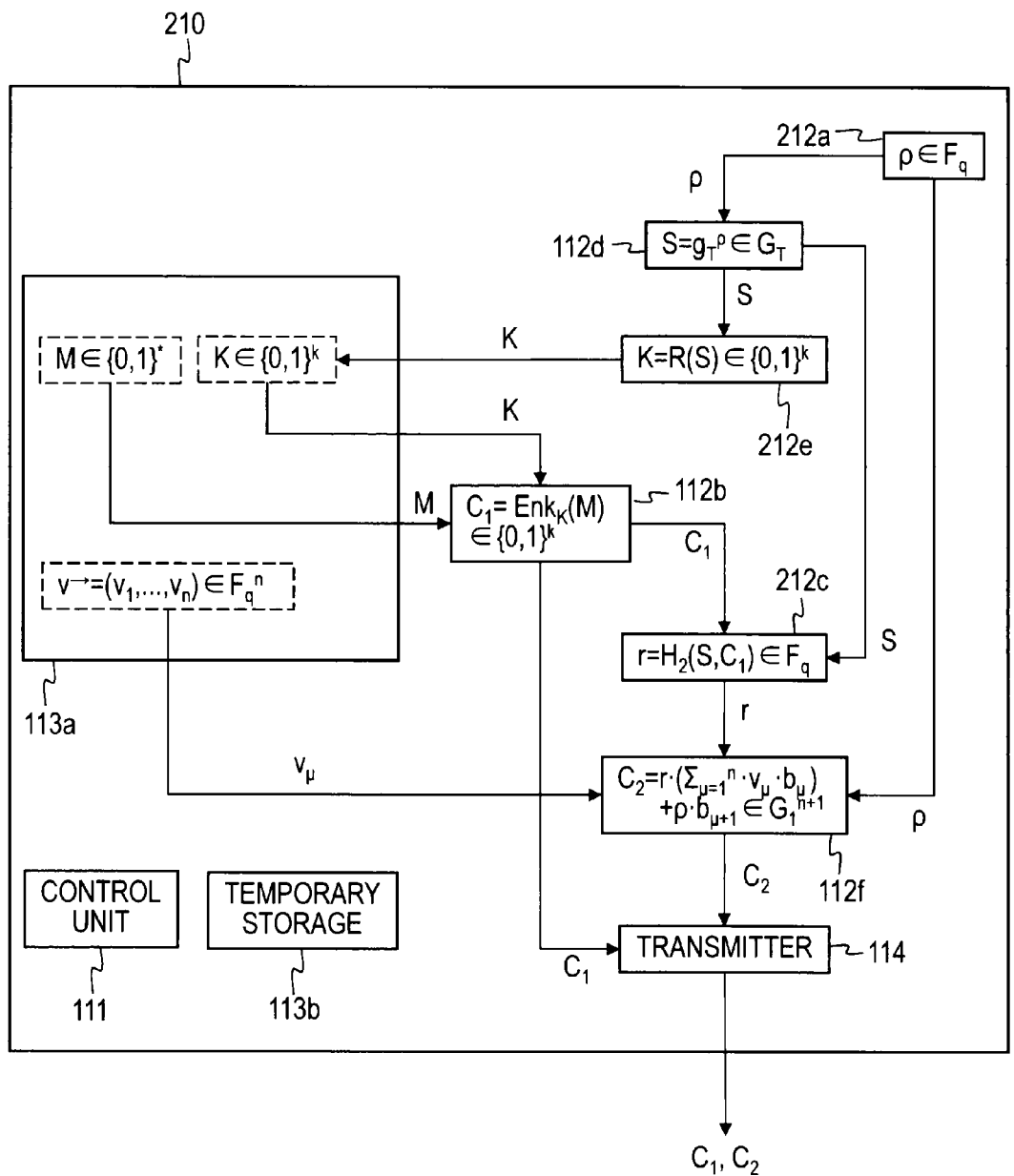
FIG. 9 is a view illustrating the structure of an encryption apparatus in FIG. 8.

FIG. 9 is a view illustrating the structure of the encryption apparatus 210 in FIG. 8. Arrows in FIG. 9 indicate the flow of data, but the arrows, indicating data input to and output from a control unit 111 and a temporary storage 113b, are omitted.

As shown in FIG. 9, the encryption apparatus 210 of this embodiment includes the control unit 111, a selection unit 212a, a group operation unit 112d, a function operation unit 212c, a symmetric key generation unit 212e, a symmetric key encryption unit 112b, a vector operation unit 112f, a storage 113a, the temporary storage 113b, and a transmitter 114.

The encryption apparatus 210 is, for example, a special apparatus that includes a special program and a known or specialized computer provided with a CPU, a RAM, a ROM, or the like. The control unit 111, a random number generator 212a (corresponding to the selection unit), the group operation unit 112d, the function operation unit 212c, the symmetric key generation unit 212e, the symmetric key encryption unit 112b, and the vector operation unit 112f are processing units implemented by the CPU executing the special program, for example. At least some of the processing units may be a specialized integrated circuit: For example, the random number generator 212a may be a known random number generation integrated circuit.

The encryption apparatus 210 executes processing under the control of the control unit 111. Each piece of data output from each processing unit is stored in the temporary storage 113b or the storage 113a, the data stored in the temporary storage 113b or the storage 113a is input to a processing unit and used for processing thereof, when necessary, while these data flow descriptions are simplified below.

Decryption Apparatus

Figure 10:
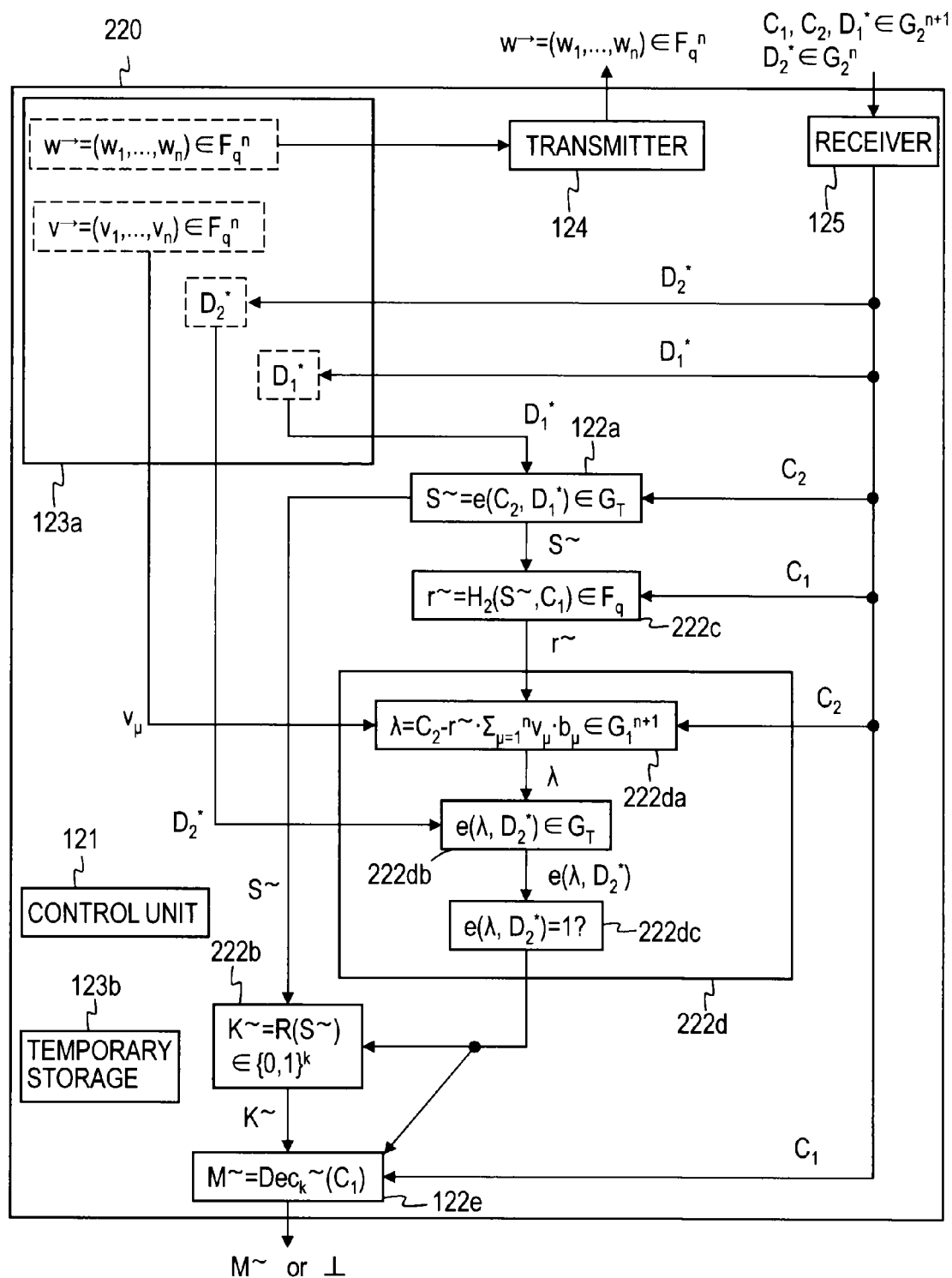
FIG. 10 is a view illustrating the structure of a decryption apparatus in FIG. 8.

FIG. 10 is a view illustrating the structure of the decryption apparatus 220 in FIG. 8. Arrows in FIG. 10 indicate the flow of data, but the arrows, indicating data input to and output from a control unit 121 and a temporary storage 123b, are omitted.

As shown in FIG. 10, the decryption apparatus 220 in this embodiment includes the control unit 121, a bilinear function operation unit 122a, function operation units 222b and 222c, a decision unit 222d, a symmetric key decryption unit 122e, a storage 123a, the temporary storage 123b, a transmitter 124, and a receiver 125 (corresponding to the input unit). The decision unit 222d includes a vector operation unit 222da, a bilinear function operation unit 222db, and a comparison unit 222dc.

The decryption apparatus 220 is, for example, a special apparatus that includes a special program and a known or specialized computer provided with a CPU, a RAM, a ROM, or the like. The control unit 121, the bilinear function operation unit 122a, the function operation units 222b and 222c, the decision unit 222d, and the symmetric key decryption unit 122e are processing units implemented by the CPU executing the special program, for example. At least some of the processing units may be a specialized integrated circuit.

The decryption apparatus 220 executes processing under the control of the control unit 121. Each piece of data output from each processing unit is stored in the temporary storage 123b or the storage 123a, the data stored in the temporary storage 123b or the storage 123a is read, input to a processing unit, and used for processing thereof, when necessary, while these data flow descriptions are simplified below.

Key Generation Apparatus

Figure 11:
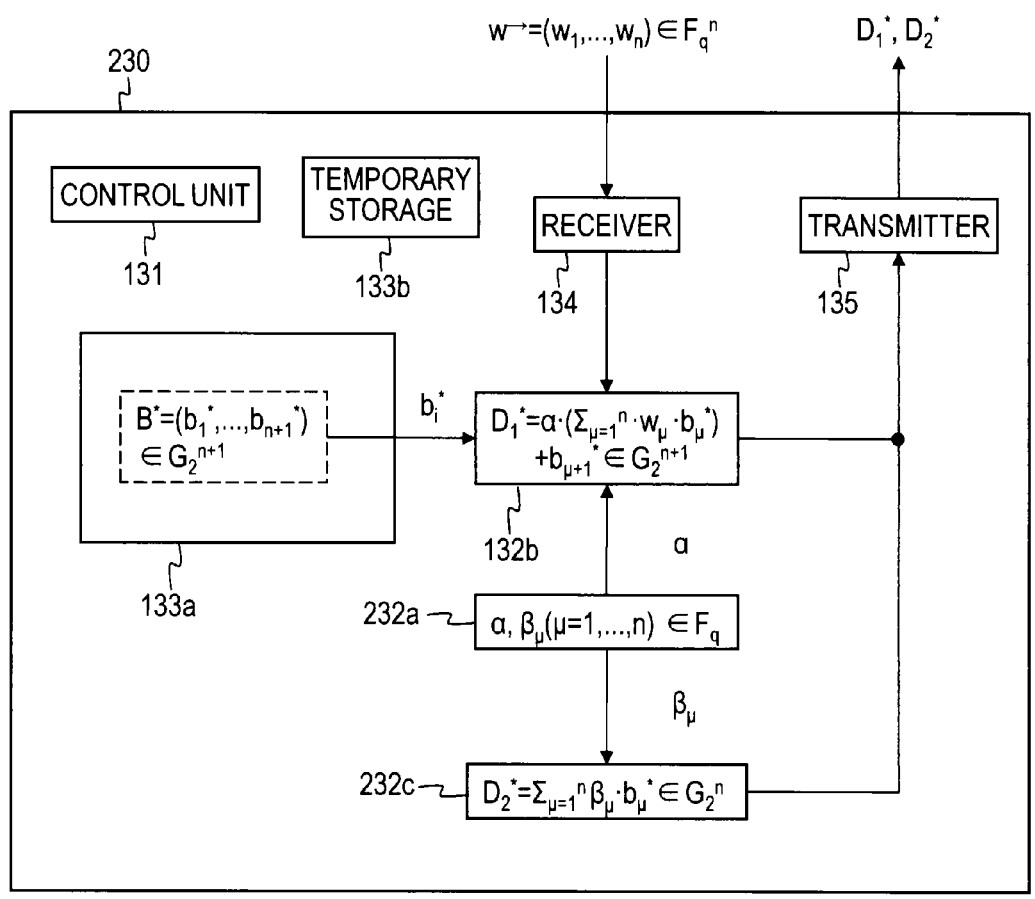
FIG. 11 is a view illustrating the structure of a key generation apparatus in FIG. 8.

FIG. 11 is a view illustrating the structure of the key generation apparatus 230 in FIG. 8. Arrows in FIG. 11 indicate the flow of data, but the arrows, indicating data input to and output from a control unit 131 and a temporary storage 133b, are omitted.

As shown in FIG. 11, the key generation apparatus 230 of this embodiment includes the control unit 131, a random number generator 232a, vector operation units 132b and 232c, a storage 133a, the temporary storage 133b, a receiver 134, and a transmitter 135.

The key generation apparatus 230 is, for example, a special apparatus that includes a special program and a known or specialized computer provided with a CPU, a RAM, a ROM, or the like. The control unit 131, the random number generator 232a, and the vector operation units 132b and 232c are processing units implemented by the CPU executing the special program, for example. At least some of the processing units may be a specialized integrated circuit.

The key generation apparatus 230 executes processing under the control of the control unit 131. Each piece of data output from each processing unit is stored in the temporary storage 133b or the storage 133a, the data stored in the temporary storage 133b or the storage 133a is read, input to a processing unit, and used for processing thereof, when necessary, while these data flow descriptions are simplified below.

Preparatory Settings

In the preparatory settings of the second embodiment, the public parameter PK, as in the first embodiment, is specified in the encryption apparatus 210, the decryption apparatus 220, and the key generation apparatus 230. The collision-resistant function $H_2$ shown in Expression (34) is specified in the encryption apparatus 210 and the decryption apparatus 220.

The (n+1) row by (n+1) column matrix B*, which is the master key information MSK, is stored securely in the storage 133a of the key generation apparatus 230. The matrix B* is secret information and is kept secret.

The n-dimensional vector $\vec{v} = (v_1, \ldots, v_n)$ composed of elements of the finite field $F_q$, shown in Expression (31), is stored in the storage 113a of the encryption apparatus 110, and the n-dimensional vector $\vec{v} = (v_1, \ldots, v_n)$ and the n-dimensional vector $\vec{w} = (w_1, \ldots, w_n)$ composed of the elements of the finite field $F_q$, shown in Expression (30), are stored in the storage 123a of the decryption apparatus 120. These vectors satisfy Expression (66). The predicate information and the attribute information may be $\vec{w} = (w_1, \ldots, w_n)$ and $\vec{v} = (v_1, \ldots, v_n)$, respectively. Alternatively, the predicate information and the attribute information may be $\vec{v} = (v_1, \ldots, v_n)$ and $\vec{w} = (w_1, \ldots, w_n)$, respectively.

The storage 113a of the encryption apparatus 210 stores the plaintext $M \in \{0, 1\}^*$ to be encrypted.

Encryption Processing

Figure 12:
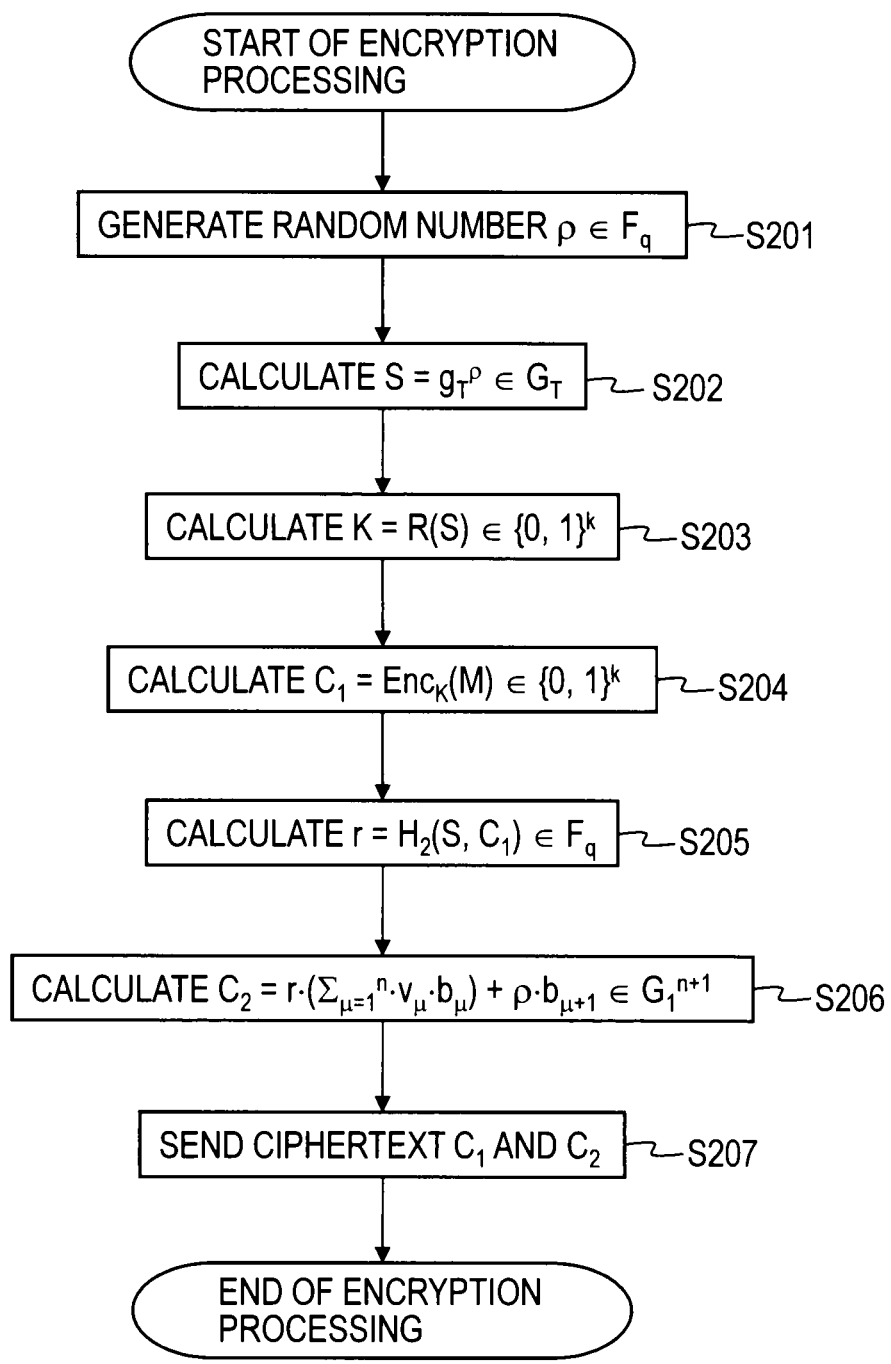
FIG. 12 is a view illustrating encryption processing according to the second embodiment.

FIG. 12 is a view illustrating encryption processing in the second embodiment. The encryption processing in this embodiment will be described next.

The random number generator 212a of the encryption apparatus 210 (FIG. 9) first selects an element $$\rho \in F_q \tag{83}$$

of the finite field $F_q$ at random, and outputs the element $\rho$ (step S201).

The element $\rho$ is input to the group operation unit 112d. By using the element $\rho$, the group operation unit 112d calculates the following function value S, and outputs the function value S (step S202).

$$S \cdot g_T^\rho \in G_T \tag{84}$$

The function value S is input to the symmetric key generation unit 212e. The symmetric key generation unit 212e puts the function value S into the injective function R to calculate the following symmetric key K, and stores the symmetric key K in the storage 113a (step S203).

$$K = R(S) \in \{0, 1\}^k \tag{85}$$

The symmetric key K and plaintext M are input to the symmetric key encryption unit 112b. The symmetric key encryption unit 112b puts the symmetric key K and the plaintext M into a symmetric key encryption function Enc to calculate the following ciphertext $C_1$, and outputs the ciphertext $C_1$ (step S204).

$$C_1 = Enc_k(M) \in \{0, 1\}^k \tag{86}$$

The ciphertext $C_1$ and the function value S are input to the function operation unit 212c. The function operation unit 212c puts the function value S and the first ciphertext $C_1$ into the collision-resistant function $H_2$ to calculate the following element r of the finite field $F_q$, and outputs the element r (step S205).

$$r = H_2(S, C_1) \in F_q \tag{87}$$

The elements r and $\rho$ and the elements $v_1$ ($\mu=1, \ldots, n$) of the n-dimensional vector $\vec{v}$ are input to the vector operation unit 112f. The vector operation unit 112f calculates the following ciphertext $C_2$ by using the elements $v_\mu$ ($\mu=1, \ldots, n$) of the n-dimensional vector $\vec{v}$ and the elements r and $\rho$, and outputs the ciphertext $C_2$ (step S206).

$$C_2 = r \cdot (\Sigma_{\mu=1}^n v_\mu \cdot b_\mu) + \rho \cdot b_{n+1} \in G_1^{n+1} \tag{88}$$

The ciphertext $C_1$ and the ciphertext $C_2$ are input to the transmitter 114. The transmitter 114 sends a value containing them through the network 140 to the decryption apparatus 120 (step S207).

Key Information Generation Processing

Key information generation processing is performed especially when neither key information $D_1^*$ nor auxiliary key information $D_2^*$ is stored in the storage 123a of the decryption apparatus 220. When the key information $D_1^*$ and the auxiliary key information $D_2^*$ are stored in the storage 123a of the decryption apparatus 220, this processing may be omitted.

Figure 13:
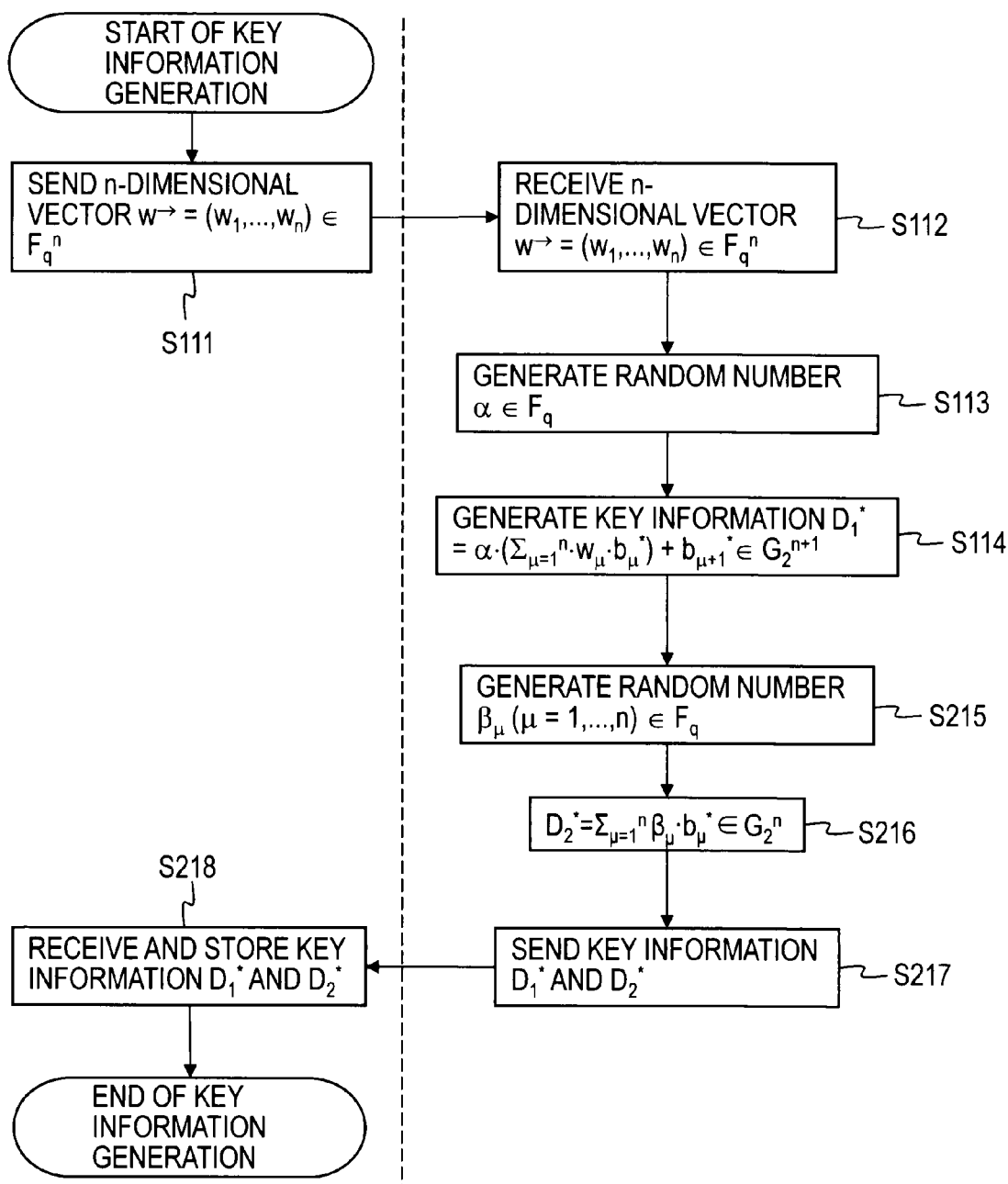
FIG. 13 is a view illustrating key information generation processing in the second embodiment.

FIG. 13 is a view illustrating the key information generation processing in the second embodiment. The key information generation processing in this embodiment will be described next.

The n-dimensional vector $\vec{w} = (w_1, \ldots, w_n)$ stored in the decryption apparatus 220 (FIG. 10) is read and input to the transmitter 124. The transmitter 124 sends the n-dimensional vector $\vec{w} = (w_1, \ldots, w_n)$ through the network 140 to the key generation apparatus 230 (step S111).

The sent n-dimensional vector $\vec{w} = (w_1, \ldots, w_n)$ is received by the receiver 134 of the key generation apparatus 230 (FIG. 11) (step S112). This causes the random number generator 232a and the vector operation unit 132b of the key generation apparatus 230 to generate the key information $D_1^*$ shown in Expression (75) by performing processing in steps S113 and S114 of the first embodiment and to output the key information $D_1^*$.

The random number generator 232a generates a random number $$\beta_\mu (\mu=1, \ldots, n) \in F_q \tag{89}$$

of an element of the finite field $F_q$ and outputs the random number $\beta_\mu$ (step S215).

The random number $\beta_\mu$ and the matrix B* are input to the vector operation unit 232c. By using them, the vector operation unit 232b generates the following auxiliary key information $D_2^*$, and outputs the auxiliary key information $D_2^*$ (step S216).

$$D_2^* = \Sigma_{\mu=1}^n \beta_\mu \cdot b_\mu^* \in G_2^n \tag{90}$$

The key information $D_1^*$ and the auxiliary key information $D_2^*$ are input to the transmitter 135. The transmitter 135 sends the key information $D_1^*$ and the auxiliary key information $D_2^*$ through the network 140 to the decryption apparatus 220 (step S217).

The key information $D_1^*$ and the auxiliary key information $D_2^*$ sent are received by the receiver 125 of the decryption apparatus 220 (FIG. 10) and stored in the storage 123a (step S218).

Decryption Processing

Figure 14:
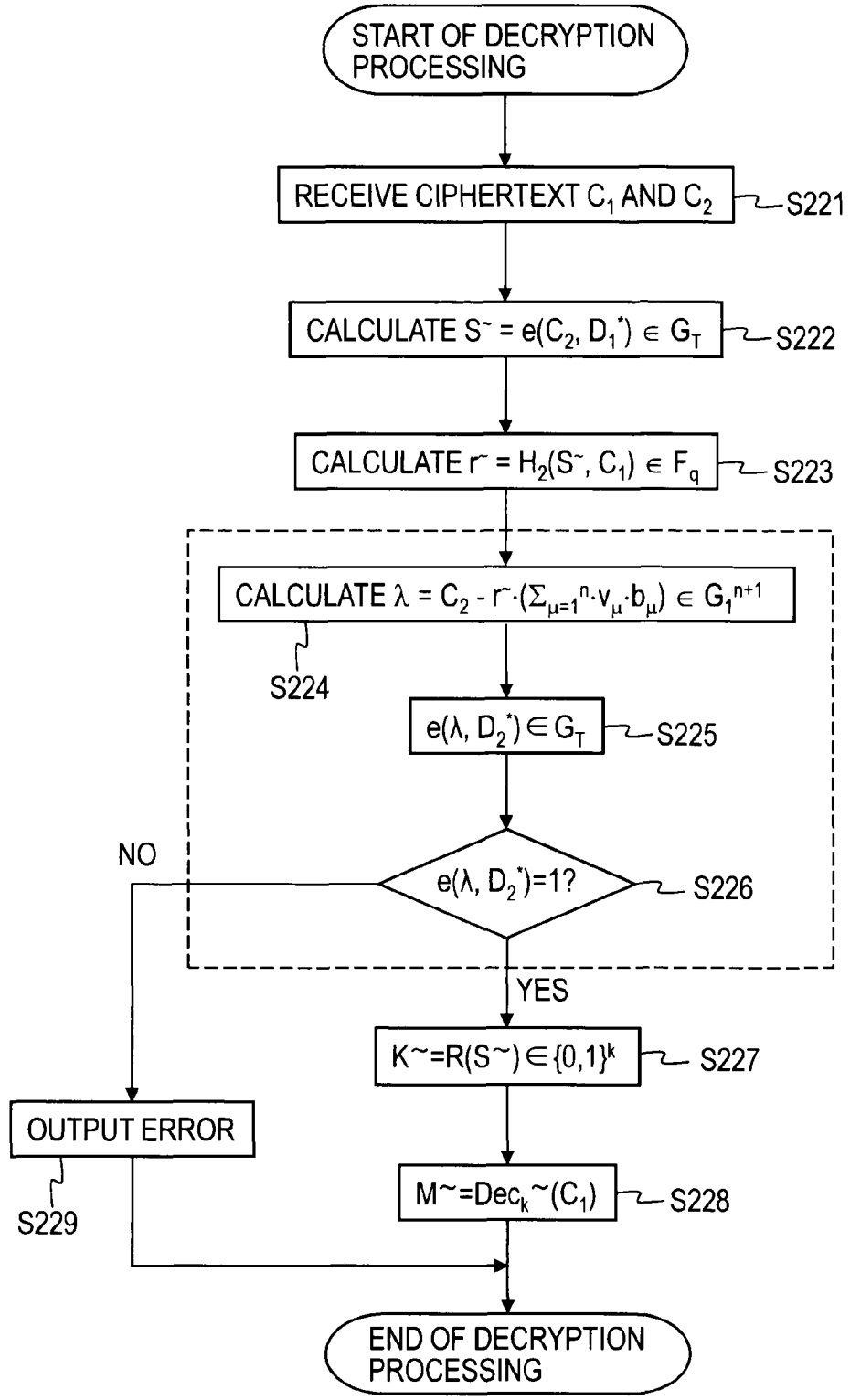
FIG. 14 is a view illustrating decryption processing according to the second embodiment.

FIG. 14 is a view illustrating decryption processing in the second embodiment. The decryption processing in this embodiment will be described next.

The receiver 125 of the decryption apparatus 220 (FIG. 10) receives the value containing ciphertext $C_1$ and ciphertext $C_2 \in G_1^{n+1}$ (step S221).

The ciphertext $C_2 \in G_1^{n+1}$ and the key information $D_1^*$ are input to the bilinear function operation unit 122a. The bilinear function operation unit 122a puts the ciphertext $C_2 \in G_1^{n+1}$ and the key information $D_1^*$ into a bilinear function e to calculate the following function value $S^\sim$, and outputs the function value $S^\sim$ (step S222).

$$S^\sim = e(C_2, D_1^*) \in G_T \qquad (91)$$

The function value $S^\sim$ and the ciphertext $C_1$ are input to the function operation unit 222c. The function operation unit 222c calculates the following element $r^\sim$ of the finite field $F_q$ by putting the function value $S^\sim$ and the first ciphertext $C_1$ into the collision-resistant function $H_2$ and outputs the element $r^\sim$ (step S223).

$$r^\sim = H_2(S^\sim, C_1) \in F_q \qquad (92)$$

The ciphertext $C_2$, the element $r^\sim$, and the elements $v_\mu$ ($\mu = 1, \ldots, n$) of the n-dimensional vector $\vec{v}$ are input to the vector operation unit 222da of the decision unit 222d. By using the ciphertext $C_2$, the element $r^\sim$, and the elements $v_\mu$ ($\mu=1, \ldots, n$) of the n-dimensional vector $\vec{v}$, the vector operation unit 222da calculates the following function value $\lambda$, and outputs the function value $\lambda$ (step S224).

$$\lambda = C_2 - r^\sim \cdot (\Sigma_{\mu=1}^n v_\mu \cdot b_\mu) \in G_1^{n+1} \qquad (93)$$

The function value $\lambda$ and the auxiliary key information $D_2^*$ is input to the bilinear function operation unit 222db of the decision unit 222d. The bilinear function operation unit 222db puts the function value $\lambda$ and the auxiliary key information $D_2^*$ into the bilinear function e to calculate the following function value $e(\lambda, D_2^*)$, and outputs the function value $e(\lambda, D_2^*)$ (step S225).

$$e(\lambda, D_2^*) \in G_T \qquad (94)$$

The function value $e(\lambda, D_2^*)$ is input to the comparison unit 222dc of the decision unit 222d. The comparison unit 222dc judges whether the function value $e(\lambda, D_2^*)$ satisfies the following relation, and outputs the judgment (step S226).

$$e(\lambda, D_2^*) = 1 \in G_T \qquad (95)$$

If the judgment output from the comparison unit 222dc indicates that $e(\lambda, D_2^*) = 1 \in G_T$ is satisfied, the function value $S^\sim$ is input to the function operation unit 222b. The function operation unit 222b puts the function value $S^\sim$ into the injective function R to obtain the following symmetric key $K^\sim$, and outputs the symmetric key $K^\sim$ (step S227).

$$K^\sim = R(S^\sim) \qquad (96)$$

The symmetric key $K^\sim$ and the ciphertext $C_1$ are input to the symmetric key decryption unit 222b, and the symmetric key decryption unit 222b puts the symmetric key $K^\sim$ and the ciphertext $C_1$ into the symmetric key decryption function Dec to calculate the following decrypted value $M^\sim$, and outputs the decrypted value $M^\sim$ (step S228).

$$M^\sim = Dec_{K^\sim}(C_1) \qquad (97)$$

If the judgment output from the comparison unit 222dc indicates that $e(\lambda, D_2^*) = 1 \in G_T$ is not satisfied, the symmetric key decryption unit 122e outputs an error message ($\bot$) (step S229).

Modifications and Others

The present invention is not limited to the embodiments described above. For example, although the symmetric key K in step S101 of the first embodiment is a binary-sequence random number, the symmetric key K may be a value selected from a plurality of predetermined binary sequences in accordance with a rule determined. Although $\alpha$ in step S113 of the first embodiment is a random number which is the element of the finite field $F_q$, $\alpha$ may be selected from the elements of the finite field $F_q$ in accordance with a rule determined. Values generated from the other random numbers can be modified similarly.

The function values obtained by Expression (69) are used directly as r and $\rho$ in the first embodiment. Function values obtained by putting the function values obtained by Expression (69) into an additional function may be used as r and $\rho$. In that case, function values obtained by putting the function values obtained by Expression (78) into the additional function are used as $r^\sim$ and $\rho^\sim$. The function value obtained by Expression (87) is used directly as r in the second embodiment. A function value obtained by putting the function value obtained by Expression (87) into an additional function may be used as r. In that case, a function value obtained by putting the function value obtained by Expression (92) into the additional function is used as $r^\sim$.

In the decryption processing in the first and second embodiments, an error message is output when the judgment condition in step S126 or S226 is not satisfied. When the judgment condition is not satisfied, the decryption apparatus may output a random number unrelated to the decrypted result or may output nothing.

The various types of processing described above need not always be executed in the order in which it has been described and may be performed in parallel or independently in accordance with the processing capabilities of the units executing the processing or when needed. For example, the processing in steps S105 and S106 in the first embodiment may be executed in parallel, and the processing in step S105 may be executed after the processing in step S106.

Each operation defined on the finite field $F_q$ may be replaced with an operation defined on a finite ring $Z_q$ of order q. An example of replacing each operation defined on the finite field $F_q$ with an operation defined on the finite ring $Z_q$ is a method of permitting q other than a prime number or a power thereof. It is of course possible that modifications can be added within the scope of the present invention.

When the above described structure is implemented by a computer, the processing details of the functions that should be provided by each apparatus are described in a program. When the program is executed by a computer, the processing functions described above are implemented on the computer.

The program containing the processing details can be recorded in a computer-readable storage medium. The computer-readable storage medium can be any type of medium, such as a magnetic storage device, an optical disc, a magneto-optical storage medium, and a semiconductor memory.

The program is distributed by selling, transferring, or lending a portable recording medium such as a DVD or a CD-ROM with the program recorded on it, for example. The program may also be distributed by storing the program in a storage unit of a server computer and transferring the program from the server computer to another computer through the network.

A computer that executes this type of program first stores the program recorded on the portable recording medium or the program transferred from the server computer in its storage unit. Then, the computer reads the program stored in its storage unit and executes processing in accordance with the read program. In a different program execution form, the computer may read the program directly from the portable recording medium and execute processing in accordance with the program, or the computer may execute processing in accordance with the program each time the computer receives the program transferred from the server computer. Alternatively, the processing may be executed by a so-called application service provider (ASP) service, in which the processing function is implemented just by giving a program execution instruction and obtaining the results without transferring the program from the server computer to the computer.

DESCRIPTION OF REFERENCE NUMERALS 1, 2: Cryptographic systems
110, 210: Encryption apparatuses
120, 220: Decryption apparatuses

What is claimed is:
1. An encryption apparatus comprising:
 a symmetric key encryption unit adapted to calculate a ciphertext $C_1$ by putting a plaintext M and a symmetric key K into a symmetric key encryption function and to output the ciphertext $C_1$;
 a function operation unit adapted to calculate a function value of a collision-resistant function H by putting a value containing a value corresponding to the symmetric key K and a value corresponding to the ciphertext $C_1$ into the function H; and
 a vector operation unit adapted to calculate a second ciphertext $C_2 = r \cdot (\Sigma_{\mu=1}^{n} v_\mu \cdot b_\mu) + \rho \cdot b_{n+1} \in G_1^{n+1}$ by using a value r corresponding to the function value of the function H, a value $\rho$ corresponding to the symmetric key K, elements $v_\mu$ ($\mu=1, \ldots, n$) ($n \geq 1$) of an n-dimensional vector $\vec{v} = (v_1, \ldots, v_n)$, and n+1 dimensional basis vectors $b_i \in G_1^{n+1}$ (i=1, \ldots, n+1) composed of n+1 elements of a cyclic group $G_1$ and to output the second ciphertext $C_2$.
2. The encryption apparatus according to claim 1, wherein the symmetric key K is a binary sequence; and
 the function operation unit is adapted to calculate the values r and $\rho$ by putting the symmetric key K and the ciphertext $C_1$ into the collision-resistant function H;
 the encryption apparatus further comprising:
 a group operation unit adapted to calculate a function value $S = g_T^{\tau \cdot \rho} \in G_T$ by using the value $\rho$, where $g_T$ is a generator of a cyclic group $G_T$ and $\tau$ is a constant other than an additive identity element; and
 an exclusive-OR operation unit adapted to calculate a third ciphertext $C_3$ and to output the third ciphertext $C_3$, the third ciphertext $C_3$ being an exclusive OR of a function value R(S) and the symmetric key K, the function value R(S) being a binary sequence obtained by putting the function value S into an injective function R.
3. The encryption apparatus according to claim 1, further comprising:
 a selection unit adapted to select the value $\rho$;
 a group operation unit adapted to calculate a function value $S = g_T^{\tau \cdot \rho} \in G_T$ by using the value $\rho$, where $g_T$ is a generator of a cyclic group $G_T$ and $\tau$ is a constant other than an additive identity element; and
 a symmetric key generation unit adapted to calculate a function value R(S) as the symmetric key K by putting the function value S into an injective function R, wherein the function operation unit is adapted to calculate the value r by putting the function value S and the ciphertext $C_1$ into the collision-resistant function H.
4. The encryption apparatus according to claim 2, wherein the injective function R is a quasi random function.
5. The encryption apparatus according to claim 3, wherein the injective function R is a quasi random function.
6. The encryption apparatus according to claim 1, wherein the collision-resistant function H is a quasi random function.
7. The encryption apparatus according to claim 2, wherein the collision-resistant function H is a quasi random function.
8. The encryption apparatus according to claim 3, wherein the collision-resistant function H is a quasi random function.
9. The encryption apparatus according to claim 2, wherein the cyclic group $G_1$ and the cyclic group $G_T$ are sets in which a non-degenerate bilinear function e is defined, the non-degenerate bilinear function e outputting a single element of the cyclic group $G_T$ in response to input of n+1 elements $\gamma_L$ (L=1, \ldots, n+1) of the cyclic group $G_1$ and n+1 elements $\gamma_L^*$ (L=1, \ldots, n+1) of a cyclic group $G_2$.
10. The encryption apparatus according to claim 9, wherein the values r and $\rho$ and the constant $\tau$ are elements of a finite field $F_q$; and
 the order of each of the cyclic groups $G_1$ and $G_2$ equals the order q ($q \geq 1$) of the finite field $F_q$.
11. The encryption apparatus according to claim 9 or 10, wherein the bilinear function e outputs an element $e = \Pi_{i=1}^{n+1} \text{Pair}(\gamma_L, \gamma_L^*)$ of the cyclic group $G_T$ in response to the input of the n+1 elements $\gamma_L$ (L=1, \ldots, n+1) of the cyclic group $G_1$ and the n+1 elements $\gamma_L^*$ (L=1, \ldots, n+1) of the cyclic group $G_2$, where Pair is a non-degenerate bilinear function that translates a combination of a single element of the cyclic group $G_1$ and a single element of the cyclic group $G_2$ to a single element of the cyclic group $G_T$.
12. The encryption apparatus according to claim 3, wherein the cyclic group $G_1$ and the cyclic group $G_T$ are sets in which a non-degenerate bilinear function e is defined, the non-degenerate bilinear function e outputting a single element of the cyclic group $G_T$ in response to input of n+1 elements $\gamma_L$ (L=1, \ldots, n+1) of the cyclic group $G_1$ and n+1 elements $\gamma_L^*$ (L=1, \ldots, n+1) of a cyclic group $G_2$.
13. The encryption apparatus according to claim 12, wherein the values r and $\rho$ and the constant $\tau$ are elements of a finite field $F_q$; and
 the order of each of the cyclic groups $G_1$ and $G_2$ equals the order q ($q \geq 1$) of the finite field $F_q$.
14. The encryption apparatus according to claim 12 or 13, wherein the bilinear function e outputs an element $e = \Pi_{i=1}^{n+1} \text{Pair}(\gamma_L, \gamma_L^*)$ of the cyclic group $G_T$ in response to the input of the n+1 elements $\gamma_L$ (L=1, \ldots, n+1) of the cyclic group $G_1$ and the n+1 elements $\gamma_L^*$ (L=1, \ldots, n+1) of the cyclic group $G_2$, where Pair is a non-degenerate bilinear function that translates a combination of a single element of the cyclic group $G_1$ and a single element of the cyclic group $G_2$ to a single element of the cyclic group $G_T$.
15. A non-transitory computer-readable recording medium having stored thereon a program causing a computer to function as an encryption apparatus according to any one of claims 1 to 3.
16. A decryption apparatus comprising:
 an input unit to which a value containing a ciphertext $C_1$ and a second ciphertext $C_2 \in G_1^{n+1}$ is input;

a bilinear function operation unit adapted to calculate a function value $S^{\sim}=e(C_2, D_1^*) \in G_T$ by putting the second ciphertext $C_2 \in G_1^{n+1}$ and key information $D_1^* \in G_2^{n+1}$ into a bilinear function e;

a function operation unit adapted to calculate a function value of a collision-resistant function H by putting a value corresponding to the function value $S^{\sim}$ and the ciphertext $C_1$ into the function H; and a decision unit adapted to judge whether the second ciphertext $C_2$, a value $\rho^{\sim}$, a value $r^{\sim}$ corresponding to the function value of the function H, elements $v_\mu$ ($\mu=1, \ldots, n$) of an n-dimensional vector $v^{\rightarrow}=(v_1, \ldots, v_n)$, and basis vectors $b_i \in G_1^{n+1}$ ($i=1, \ldots, n+1$) satisfy $C_2 = r^{\sim} \cdot (\tau_{\mu=1}^n v_\mu \cdot b_\mu) + \rho^{\sim} \cdot b_{n+1} \in G_1^{n+1}$ and to output a result of judgment, wherein the bilinear function e is a non-degenerate bilinear function which outputs a single element of a cyclic group $G_T$ in response to input of n+1 elements $\gamma_L$ ($L=1, \ldots, n+1$) ($n \geq 1$) of a cyclic group $G_1$ and n+1 elements $\gamma_L^*$ ($L=1, \ldots, n+1$) of a cyclic group $G_2$; each of the basis vectors $b_i \in G_1^{n+1}$ ($i=1, \ldots, n+1$) is an n+1 dimensional basis vector composed of n+1 elements of the cyclic group $G_1$; each $b_i^* \in G_2^{n+1}$ ($i=1, \ldots, n+1$) is an n+1 dimensional basis vector composed of n+1 elements of the cyclic group $G_2$; a function value obtained by putting the elements of the basis vectors $b_i \in G_1^{n+1}$ ($i=1, \ldots, n+1$) and the elements of the basis vectors $b_j^* \in G_2^{n+1}$ ($j=1, \ldots, n+1$) into the bilinear function e is expressed as $g_T^{\tau \cdot \delta(i,j)} \in G_T$ by using Kronecker's delta function $\delta(i,j)$; $\tau$ is a constant other than an additive identity element; $g_T$ is a generator of the cyclic group $G_T$; $w^{\rightarrow}=(w_1, \ldots, w_n)$ is an n-dimensional vector; $w_\mu$ ($\mu=1, \ldots, n$) are elements of the n-dimensional vector $w^{\rightarrow}=(w_1, \ldots, w_n)$; $\alpha$ is a selected value; and the key information $D_1^* \in G_2^{n+1}$ is $D1^* = \alpha \cdot (\Sigma_{\mu=1}^n w_\mu \cdot b_\mu^*) + b_{n+1}^* \in G_2^{n+1}$.

17. The decryption apparatus according to claim 16, wherein the value containing the ciphertext $C_1$ and the second ciphertext $C_2 \in G_1^{n+1}$, input to the input unit, further contains a third ciphertext $C_3$ which is a binary sequence;

the decryption apparatus further comprising an exclusive-OR operation unit adapted to calculate an exclusive OR value $K^{\sim}$ of the third ciphertext $C_3$ and a function value $R(S^{\sim})$ which is a binary sequence obtained by putting the function value $S^{\sim}$ into an injective function R;

the function operation unit is adapted to calculate the values $r^{\sim}$ and $\rho^{\sim}$ by putting the exclusive OR value $K^{\sim}$ and the ciphertext $C_1$ into the collision-resistant function H; and the decision unit includes:

a vector operation unit adapted to calculate a function value $C_2^{\sim} = r^{\sim} \cdot (\Sigma_{\mu=1}^n v_\mu \cdot b_\mu) + \rho^{\sim} \cdot b_{n+1} \in G_1^{n+1}$ by using the elements $v_\mu$ ($\mu=1, \ldots, n$) of the n-dimensional vector v' and the values $r^{\sim}$ and $\rho^{\sim}$; and a comparison unit adapted to judge whether the function value $C_2^{\sim}$ equals the second ciphertext $C_2$;

the decryption apparatus further comprising a symmetric key decryption unit adapted to use the exclusive OR value $K^{\sim}$ as a symmetric key, to calculate a decrypted value $M^{\sim}$ by putting the exclusive OR value $K^{\sim}$ and the ciphertext $C_1$ into a symmetric key decryption function, and to output the decrypted value $M^{\sim}$, when judgment by the comparison unit indicates that the function value $C_2^{\sim}$ equals the second ciphertext $C_2$.

18. The decryption apparatus according to claim 16, wherein the function operation unit is adapted to calculate the value $r^{\sim}$ by putting the function value $S^{\sim}$ and the ciphertext $C_1$ into the collision-resistant function H; and the decision unit includes:

a vector operation unit adapted to calculate a function value $\lambda = C_2 - r^{\sim} \cdot \Sigma_{\mu=1}^n v_\mu \cdot b_\mu \in G_1^{n+1}$ by using the second ciphertext $C_2$, the value $r^{\sim}$, and the elements $v_\mu$ ($\mu=1, \ldots, n$) of the n-dimensional vector $v^{\rightarrow}$;

a second bilinear function operation unit adapted to calculate a function value $e(\lambda, D_2^*)$ by putting the function value X and auxiliary key information $D_2^* = \Sigma_{\mu=1}^n \beta_\mu \cdot b_\mu^*$ concerning a value $\beta_\mu$ ($\mu=1, \ldots, n$) into the bilinear function e; and a comparison unit adapted to judge whether the function value $e(\lambda, D_2^*)$ satisfies $e(\lambda, D_2^*) = 1 \in G_T$;

the decryption apparatus further comprising a symmetric key decryption unit which is adapted to use a function value $R(S^{\sim})$ obtained by putting the function value $S^{\sim}$ into an injective function R as a symmetric key $K^{\sim}$ if judgment by the comparison unit indicates that $e(X, D_2^*) = 1 \in G_T$ is satisfied, to calculate a decrypted value $M^{\sim}$ by putting the symmetric key $K^{\sim}$ and the ciphertext $C_1$ into a symmetric key decryption function, and to output the decrypted value $M^{\sim}$.

19. The decryption apparatus according to claim 17 or 18, wherein the injective function R is a quasi random function.

20. The decryption apparatus according any one of claims 16 to 18, wherein the collision-resistant function H is a quasi random function.

21. The decryption apparatus according to any one of claims 16 to 18, wherein the basis vector $b_i$ satisfies $b_i = \Sigma_{j=1}^{n+1} \chi_{i,j} \cdot a_j$, where $\chi_{i,j}$ indicates the element of an (n+1) row by (n+1) column matrix X in the i-th row and the j-th column, and $a_i \in G_1^{n+1}$ ($i=1, \ldots, n+1$) indicates an n+1 dimensional basis vector having $\kappa_1 \cdot g_1$ as the i-th element and having the identity elements of the cyclic group $G_1$ as the remaining n elements, $g_1$ being a generator of the cyclic group $G_1$ and $\kappa_1$ being a constant other than an additive identity element; and the basis vector $b_i^*$ satisfies $b_i^* = \Sigma_{j=1}^{n+1} \chi_{i,j}^* \cdot a_j^*$ where $\chi_{i,j}^*$ indicates the element of an (n+1) row by (n+1) column matrix $X^*$ in the i-th row and the j-th column, and $a_i^* \in G_2^{n+1}$ ($i=1, \ldots, n+1$) indicates an n+1 dimensional basis vector having $\kappa_2 \cdot g_2$ as the i-th element and having the identity elements of the cyclic group $G_2$ as the remaining n elements, $g_2$ being a generator of the cyclic group $G_2$ and $\kappa_2$ being a constant other than the additive identity element.

22. The decryption apparatus according to any one of claims 16 to 18, wherein the values $r^{\sim}$ and the constant $\tau$, and the value a are elements of a finite field $F_q$; and the order of each of the cyclic groups $G_1$ and $G_2$ equals the order q ($q \geq 1$) of the finite field $F_q$.

23. The decryption apparatus according to any one of claims 16 to 18, wherein the bilinear function e outputs an element $e = \Pi_{L=1}^{n+1} Pair(\gamma_L, \gamma_L^*)$ of the cyclic group $G_T$ in response to the input of the n+1 elements $\gamma_L$ ($L=1, \ldots, n+1$) of the cyclic group $G_1$ and the n+1 elements $\gamma_L^*$ ($L=1, \ldots, n+1$) of the cyclic group $G_2$, where Pair is a non-degenerate bilinear function that translates a combination of a single element of the cyclic group $G_1$ and a single element of the cyclic group $G_2$ to a single element of the cyclic group $G_T$.

24. A non-transitory computer-readable recording medium having stored thereon a program causing a computer to function as a decryption apparatus according to any one of claims 16 to 18.

25. A security method executed by an encryption apparatus and a decryption apparatus, the security method comprising:

(A) a step of calculating, in the encryption apparatus, a ciphertext $C_1$ by putting a plaintext M and a symmetric key K into a symmetric key encryption function and outputting the ciphertext $C_1$;

(B) a step of calculating, in the encryption apparatus, a first function value of a collision-resistant function H by putting a value containing a value corresponding to the symmetric key K and a value corresponding to the ciphertext $C_1$ into the function H;

(C) a step of calculating, in the encryption apparatus, a second ciphertext $C_2 = r \cdot (\Sigma_{\mu=1}^{n} v_\mu \cdot b_\mu) + \rho \cdot b_{n+1} \in G_1^{n+1}$ by using a value r corresponding to the first function value of the function H, a value $\rho$ corresponding to the symmetric key K, elements $v_\mu$ ($\mu=1, \ldots, n$, $n \geq 1$) of an n-dimensional vector $v^\rightarrow = (v_1, \ldots, v_n)$, and n+1 dimensional basis vectors $b_i \in G_1^{n+1}$ (i=1, \ldots, n+1) composed of n+1 elements of the cyclic group $G_1$ and outputting the second ciphertext $C_2$;

(D) a step of inputting a value containing the ciphertext $C_1$ and the second ciphertext $C_2 \in G_1^{n+1}$ to the decryption apparatus;

(E) a step of calculating, in the decryption apparatus, a function value $S^\sim = e(C_2, D_1^*) \in G_T$ by putting the second ciphertext $C_2 \in G_1^{n+1}$ and key information $D_1^*$ into a bilinear function e;

(F) a step of calculating, in the decryption apparatus, a second function value of the collision-resistant function H by putting a value corresponding to the function value $S^\sim$ and the ciphertext $C_1$ into the function H; and (G) a step of judging, in the decryption apparatus, whether the second ciphertext $C_2$, a value $\rho^\sim$, a value $r^\sim$ corresponding to the second function value of the function H, the elements $v_\mu$ of the n-dimensional vector $v^\rightarrow$, and the basis vectors $b_i \in G_1^{n+1}$ (i=1, \ldots, n+1) satisfy $C_2 = r^\sim \cdot (\Sigma_{\mu=1}^{n} v_\mu \cdot b_\mu) + \rho^\sim \cdot b_{n+1} \in G_1^{n+1}$, wherein the bilinear function e is a non-degenerate bilinear function which outputs a single element of a cyclic group $G_T$ in response to input of n+1 elements $\gamma_L$ (L=1, \ldots, n+1) ($n \geq 1$) of the cyclic group $G_1$ and n+1 elements $\gamma_L^*$ (L=1, \ldots, n+1) of a cyclic group $G_2$; each of the basis vectors $b_i \in G_1^{n+1}$ (i=1, \ldots, n+1) is an n+1 dimensional basis vector composed of the n+1 elements of the cyclic group $G_1$; each of basis vectors $b_i^* \in G_2^{n+1}$ (i=1, \ldots, n+1) is an n+1 dimensional basis vector composed of n+1 elements of the cyclic group $G_2$; a function value obtained by putting the elements of the basis vectors $b_i \in G_1^{n+1}$ (i=1, \ldots, n+1) and the elements of the basis vectors $b_j^* \in G_2^{n+1}$ (j=1, \ldots, n+1) into the bilinear function e is expressed as $g_T^{\tau \cdot \delta(i,j)} \in G_T$ by using Kronecker's delta function $\delta(i,j)$; $\tau$ is a constant other than an additive identity element; $g_T$ is a generator of the cyclic group $G_T$; $\alpha$ is a selected value; $w^\rightarrow = (w_1, \ldots, w_n)$ is an n-dimensional vector; $w_\mu$ ($\mu=1, \ldots, n$) are elements of the n-dimensional vector $w^\rightarrow = (w_1, \ldots, w_n)$; and the key information $D_1^*$ is $D1^* = \alpha \cdot (\Sigma_{\mu=1}^{n} w_\mu \cdot b_\mu^*) + b_{n+1}^* \in G_2^{n+1}$.

26. The security method according to claim 25, wherein the step (B) includes a step of calculating the values r and $\rho$ by putting the symmetric key K and the ciphertext $C_1$ into the collision-resistant function H;

the step (C) includes:
a step of calculating, in the decryption apparatus, a function value $S = g_T^{\tau \cdot \rho} \in G_T$ by using the value $\rho$;
a step of calculating, in the decryption apparatus, a third ciphertext $C_3$ and outputting the third ciphertext $C_3$, the third ciphertext $C_3$ being an exclusive OR value of a function value R(S) and the symmetric key K, the function value R(S) being a binary sequence obtained by putting the function value S into an injective function R; and
a step of calculating, in the decryption apparatus, the second ciphertext $C_2$ by using the elements $v_\mu$ ($\mu=1, \ldots, n$) of the n-dimensional vector $v^\rightarrow$ and the values r and $\rho$ and outputting the second ciphertext $C_2$;

the step (D) includes a step of inputting, in the decryption apparatus, a value containing the ciphertext $C_1$, the second ciphertext $C_2 \in G_1^{n+1}$, and the third ciphertext $C_3$ to the decryption apparatus;

the step (F) includes:
a step of calculating, in the decryption apparatus, an exclusive OR $K^\sim$ value of the third ciphertext $C_3$ and a function value $R(S^\sim)$ which is a binary sequence obtained by putting the function value $S^\sim$ into the injective function R; and
a step of calculating, in the decryption apparatus, the values $r^\sim$ and $\rho^\sim$ by putting the exclusive OR value $K^\sim$ and the ciphertext $C_1$ into the collision-resistant function H; and the step (G) includes:
a step of calculating, in the decryption apparatus, a function value $C_2^\sim = r^\sim \cdot (\Sigma_{\mu=1}^{n} v_\mu \cdot b_\mu) + \rho^\sim \cdot b_{n+1} \in G_1^{n+1}$ by using the elements $v_\mu$ ($\mu=1, \ldots, n$) of the n-dimensional vector $v^\rightarrow$ and the values $r^\sim$ and $\rho^\sim$; and
a step of judging, in the decryption apparatus, whether the function value $C_2^\sim$ equals the second ciphertext $C_2$, if the function value $C_2^\sim$ equals the second ciphertext $C_2$, using the exclusive OR value $K^\sim$ as a symmetric key, calculating a decrypted value $M^\sim$ by putting the exclusive OR value $K^\sim$ and the ciphertext $C_1$ into a symmetric key decryption function, and outputting the decrypted value $M^\sim$.

27. The security method according to claim 25, wherein the step (A) includes:
a step of selecting the value $\rho$ in the encryption apparatus;
a step of calculating, in the encryption apparatus, a function value $S = g_T^{\tau \cdot \rho} \in G_T$ by using the value $\rho$; and
a step of using, in the encryption apparatus, a function value R(S) obtained by putting the function value S into an injective function R, as a symmetric key K, calculating the ciphertext $C_1$ by putting the symmetric key K and the plaintext M into the symmetric key encryption function, and outputting the ciphertext $C_1$;

the step (B) includes a step of calculating, in the encryption apparatus, the value r by putting the function value S and the ciphertext $C_1$ into the collision-resistant function H;

the step (C) includes a step of calculating, in the encryption apparatus, the second ciphertext by using the elements $v_\mu$ ($\mu=1, \ldots, n$) of the n-dimensional vector $v^\rightarrow$ and the values r and $\rho$ and outputting the second ciphertext $C_2$;

the step (F) includes a step of calculating, in the decryption apparatus, the value $r^\sim$ by putting the function value $S^\sim$ and the ciphertext $C_1$ into the collision-resistant function H; and the step (G) includes:
a step of calculating, in the decryption apparatus, a function value $\lambda = C_2^\sim = r^\sim \cdot (\Sigma_{\mu=1}^{n} v_\delta \cdot b_\mu) \in G_1^{n+1}$ by using the second ciphertext $C_2$, the value $r^\sim$, and the elements $v_\mu$ ($\mu=1, \ldots, n$) of the n-dimensional vector $v^\rightarrow$;
a step of calculating, in the decryption apparatus, a function value $e(\lambda, D_2^*)$ by putting the function value $\lambda$ and auxiliary key information $D_2^*$ into the bilinear function e; and a step of judging, in the decryption apparatus, whether the function value $e(\lambda, D_2^*)$ satisfies $e(\lambda, D_2^*) = 1 \in G_T$, if $e(\lambda, D_2^*) = 1 \in G_T$ is satisfied, using a function value $R(S^\sim)$ obtained by putting the function value $S^\sim$ into an injective function R, as a symmetric key $K^\sim$, calculating a decrypted value $M^\sim$ by putting the symmetric key $K^\sim$ and the ciphertext $C_1$ into a symmetric key decryption function, and outputting the decrypted value M.

28. An encryption method comprising:
(A) a step of calculating, in a first means of an encryption apparatus, a ciphertext $C_1$ by putting a plaintext M and a symmetric key K into a symmetric key encryption function and outputting the ciphertext $C_1$;
(B) a step of calculating, in a second means of the encryption apparatus, a function value of a collision-resistant function H by putting a value containing a value corresponding to the symmetric key K and a value corresponding to the ciphertext $C_1$ into the function H; and
(C) a step of calculating, in a third means of the encryption apparatus, a second ciphertext $C_2 = r \cdot (\Sigma_{\mu=1}^{n} v_\mu \cdot b_\mu) + \rho \cdot b_{n+1} \in G_1^{n+1}$ by using a value r corresponding to the function value of the function H, a value $\rho$ corresponding to the symmetric key K, elements $v_\mu$ ($\mu=1, \ldots, n$) ($n \geq 1$) of an n-dimensional vector $v^\rightarrow = (v_1, \ldots, v_n)$, and n+1 dimensional basis vectors $b_i \in G_1^{n+1}$ (i=1, \ldots, n+1) composed of n+1 elements of a cyclic group $G_1$ and outputting the second ciphertext $C_2$.

29. The encryption method according to claim 28, wherein the symmetric key K is a binary sequence; and
the step (B) includes a step of calculating, in a fourth means of the encryption apparatus, the values r and $\rho$ by putting the symmetric key K and the ciphertext $C_1$ into the collision-resistant function H;
the encryption method further comprising:
a step of calculating, in a fifth means of the encryption apparatus, a function value $S = g_T^{\tau \cdot \rho} \in G_T$ by using the value $\rho$, where $g_T$ is a generator of the cyclic group $G_T$ and $\tau$ is a constant other than an additive identity element; and
a step of calculating, in a sixth means of the encryption apparatus, a third ciphertext $C_3$ and outputting the third ciphertext $C_3$, the third ciphertext $C_3$ being as an exclusive OR value of a function value R(S) and the symmetric key K, the third ciphertext $C_3$ being a binary sequence obtained by putting the function value S into an injective function R.

30. The encryption method according to claim 28, further comprising:
a step of selecting the value $\rho$ in a seventh means of the encryption apparatus;
a step of calculating, in an eighth means of the encryption apparatus, a function value $S = g_T^{\tau \cdot \rho} \in G_T$ by using the value $\rho$, where $g_T$ is a generator of a cyclic group $G_T$ and $\tau$ is a constant other than an additive identity element; and
a step of calculating, in a ninth means of the encryption apparatus, a function value R(S) as the symmetric key K by putting the function value S into an injective function R, wherein
the step (B) includes a step of calculating, in a tenth means of the encryption apparatus, the value r by putting the function value S and the ciphertext $C_1$ into the collision-resistant function H.

31. A decryption method comprising:
(A) a step of inputting a value containing a ciphertext $C_1$ and a second ciphertext $C_2 \in G_1^{n+1}$ to a decryption apparatus;
(B) a step of calculating, in a first means of the decryption apparatus, a function value $S^\sim = e(C_2, D_1^*) \in G_T$ by putting the second ciphertext $C_2 \in G_1^{n+1}$ and key information $D_1^* \in G_2^{n+1}$ into a bilinear function e;
(C) a step of calculating, in a second means of the decryption apparatus, a function value of a collision-resistant function H by putting a value corresponding to the function value $S^\sim$ and the ciphertext $C_1$ into the function H; and
(D) a step of judging, in a third means of the decryption apparatus, whether the second ciphertext $C_2$, a value $r^\sim$ corresponding to the function value of the function H, a value $\rho^\sim$, elements $v_\mu$ ($\mu=1, \ldots, n$) of an n-dimensional vector $v^\rightarrow = (v_1, \ldots, v_n)$, and basis vectors $b_i \in G_1^{n+1}$ (i=1, \ldots, n+1) satisfy $C_2 = r^\sim \cdot (\Sigma_{\mu=1}^{n} v_\mu \cdot b_\mu) + \rho^\sim \cdot b_{n+1} \in G_1^{n+1}$ and outputting a result of judgment, wherein
the bilinear function e is a non-degenerate bilinear function which outputs a single element of a cyclic group $G_T$ in response to input of n+1 elements $\gamma_L$ (L=1, \ldots, n+1) ($n \geq 1$) of a cyclic group $G_1$ and n+1 elements $\gamma_L^*$ (L=1, \ldots, n+1) of a cyclic group $G_2$; each of the basis vectors $b_i \in G_1^{n+1}$ (i=1, \ldots, n+1) is an n+1 dimensional basis vector composed of n+1 elements of the cyclic group $G_1$; each of $b_i^* \in G_2^{n+1}$ (i=1, \ldots, n+1) is an n+1 dimensional basis vector composed of n+1 elements of the cyclic group $G_2$; a function value obtained by putting the elements of the basis vectors $b_i \in G_1^{n+1}$ (i=1, \ldots, n+1) and the elements of the basis vectors $b_j^* \in G_2^{n+1}$ (j=1, \ldots, n+1) into the bilinear function e is expressed as $g_T^{\tau \cdot \delta(i,j)} \in G_T$ by using Kronecker's delta function $\delta(i, j)$; $\tau$ is a constant other than an additive identity element; $g_T$ is a generator of the cyclic group $G_T$; $w^\rightarrow = (w_1, \ldots, w_n)$ is an n-dimensional vector; $w_\mu$ ($\mu=1, \ldots, n$) are elements of the n-dimensional vector $w^\rightarrow = (w_1, \ldots, w_n)$; $\alpha$ is a selected value; and the key information $D_1^* \in G_2^{n+1}$ is $D1^* = \alpha \cdot (\Sigma_{\mu=1}^{n} w_\mu \cdot b_\mu^*) + b_{n+1} \in G_2^{n+1}$.

32. The decryption method according to claim 31, wherein the value containing the ciphertext $C_1$ and the second ciphertext $C_2 \in G_1^{n+1}$, input in the step (A), further contains a third ciphertext $C_3$ which is a binary sequence;
the decryption method further comprising a step of calculating, in a fourth means of the decryption apparatus, an exclusive OR value $K^\sim$ of the third ciphertext $C_3$ and a function value $R(S^\sim)$ which is a binary sequence obtained by putting the function value $S^\sim$ into an injective function R;
the step (C) includes a step of calculating, in a fifth means of the decryption apparatus, the values $r^\sim$ and $\rho^\sim$ by putting the exclusive OR value $K^\sim$ and the ciphertext $C_1$ into the collision-resistant function H;
the step (D) includes:
(D-1) a step of calculating, in a sixth means of the decryption apparatus, a function value $C_2^\sim = r^\sim \cdot (\Sigma_{\mu=1}^{n} v_\mu \cdot b_\mu) + \rho^\sim \cdot b_{n+1} \in G_1^{n+1}$ by using the elements $v_\mu$ ($\mu=1, \ldots, n$) of the n-dimensional vector $v^\rightarrow$ and the values $r^\sim$ and $\rho^\sim$; and
(D-2) a step of judging, in a seventh means of the decryption apparatus, whether the function value $C_2^\sim$ equals the second ciphertext $C_2$;
the decryption method further comprising a step of using, in an eighth means of the decryption apparatus, the exclusive OR $K^\sim$ as a symmetric key, calculating a decrypted value $M^\sim$ by putting the exclusive OR value K~ and the ciphertext $C_1$ into a symmetric key decryption function, and outputting the decrypted value M~, when judgment in the step (D-2) indicates that the function value $C_2$~ equals the second ciphertext $C_2$.

33. The decryption method according to claim 31, wherein the step (C) includes a step of calculating, in a ninth means of the decryption apparatus, the value r' by putting the function value S~ and the ciphertext $C_1$ into the collision-resistant function H; and the step (D) includes:
- (D-1) a step of calculating, in a tenth means of the decryption apparatus, a function value $\lambda = C_2 - r\text{~} \cdot \Sigma_{\mu=1}^{n} v_\mu \cdot b_\mu \in G_1^{n+1}$ by using the second ciphertext $C_2$, the value r~, and the elements $v_\mu$ ($\mu=1, \ldots, n$) of the n-dimensional vector $\vec{v}$;
- (D-2) a step of calculating, in an eleventh means of the decryption apparatus, a function value $e(\lambda, D_2^*)$ by putting the function value $\lambda$ and auxiliary key information $D_2^* = \Sigma_{\mu=1}^{n} \beta_\mu \cdot b_\mu^*$ concerning a value $\beta_\mu$ ($\mu=1, \ldots, n$) into the bilinear function e; and
- (D-3) a step of judging, in a twelfth means of the decryption apparatus, whether the function value $e(\lambda, D_2^*)$ satisfies $e(\lambda, D_2^*) = 1 \in G_T$;

the decryption method further comprising a step of using, in a thirteenth means of the decryption apparatus, a function value R(S~) obtained by putting the function value S~ into an injective function R, as a symmetric key K~, calculating a decrypted value M~ by putting the symmetric key K~ and the ciphertext $C_1$ into a symmetric key decryption function, and outputting the decrypted value M~, when judgment in the step (D-3) indicates that $e(\lambda, D_2^*) = 1 \in G_T$ is satisfied.

\* \* \* \* \*